United States Patent
Matsuoka et al.

(10) Patent No.: US 11,532,839 B2
(45) Date of Patent: Dec. 20, 2022

(54) NON-AQUEOUS SECONDARY BATTERY

(71) Applicant: Asahi Kasei Kabushiki Kaisha, Tokyo (JP)

(72) Inventors: Naoki Matsuoka, Tokyo (JP); Hirokazu Kamine, Tokyo (JP); Masaki Takahashi, Tokyo (JP); Kazuyuki Fujiwara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 37 days.

(21) Appl. No.: 16/804,757

(22) Filed: Feb. 28, 2020

(65) Prior Publication Data
US 2020/0274198 A1    Aug. 27, 2020

Related U.S. Application Data

(63) Continuation of application No. 16/489,571, filed as application No. PCT/JP2018/010381 on Mar. 16, 2018, now Pat. No. 11,081,730.

(30) Foreign Application Priority Data

Mar. 17, 2017  (JP) .............................. JP2017-052256
Mar. 17, 2017  (JP) .............................. JP2017-052259
(Continued)

(51) Int. Cl.
*H01M 10/0567* (2010.01)
*H01M 4/13* (2010.01)
(Continued)

(52) U.S. Cl.
CPC ......... *H01M 10/0567* (2013.01); *H01M 4/13* (2013.01); *H01M 4/505* (2013.01);
(Continued)

(58) Field of Classification Search
None
See application file for complete search history.

(56) References Cited

U.S. PATENT DOCUMENTS 5,731,106 A    3/1998  Tsutsumi et al.
5,759,714 A    6/1998  Matsufuji et al.
(Continued)

FOREIGN PATENT DOCUMENTS

CN    101548425 A    9/2009
CN    103190027 A    7/2013
(Continued)

OTHER PUBLICATIONS

Machine translation of JP2015164126 (Year: 2015).*
(Continued)

*Primary Examiner* — Wyatt P McConnell
(74) *Attorney, Agent, or Firm* — Morgan, Lewis & Bockius LLP

(57) ABSTRACT

To provide a non-aqueous electrolyte solution, a non-aqueous secondary battery, a cell pack, and a hybrid power system, capable of improving desired battery performance in an acetonitrile electrolyte solution, the non-aqueous electrolyte solution contains a non-aqueous solvent, $PO_2F_2$ anions, and cyclic acid anhydride.

16 Claims, 6 Drawing Sheets

(30) Foreign Application Priority Data

| Mar. 17, 2017 | (JP) | JP2017-052260 |
|---|---|---|
| Mar. 17, 2017 | (JP) | JP2017-052398 |
| Mar. 17, 2017 | (JP) | JP2017-052399 |

(51) Int. Cl.

| H01M 4/505 | (2010.01) |
|---|---|
| H01M 4/525 | (2010.01) |
| H01M 4/58 | (2010.01) |
| H01M 10/0525 | (2010.01) |
| H01M 10/0568 | (2010.01) |
| H01M 10/0569 | (2010.01) |

(52) U.S. Cl.
 CPC ............. *H01M 4/525* (2013.01); *H01M 4/58* (2013.01); *H01M 10/0525* (2013.01); *H01M 10/0568* (2013.01); *H01M 10/0569* (2013.01)

(56) References Cited

U.S. PATENT DOCUMENTS

| 9,825,302 | B1 | 11/2017 | Shin et al. |
|---|---|---|---|
| 2001/0055719 | A1 | 12/2001 | Akashi et al. |
| 2005/0084765 | A1 | 4/2005 | Lee et al. |
| 2008/0102376 | A1 | 5/2008 | Kato et al. |
| 2010/0035146 | A1 | 2/2010 | Fujii et al. |
| 2010/0119956 | A1 | 5/2010 | Tokuda et al. |
| 2011/0229769 | A1 | 9/2011 | Ihara et al. |
| 2012/0308890 | A1 | 12/2012 | Okuda et al. |
| 2013/0052543 | A1 | 2/2013 | Ihara et al. |
| 2013/0078533 | A1 | 3/2013 | Kang et al. |
| 2013/0224535 | A1 | 8/2013 | Matsuoka et al. |
| 2013/0323608 | A1 | 12/2013 | Chang et al. |
| 2013/0337344 | A1 | 12/2013 | Mizuno et al. |
| 2014/0184159 | A1 | 7/2014 | Kachi |
| 2014/0255796 | A1 | 9/2014 | Matsuoka et al. |
| 2016/0036038 | A1 | 2/2016 | Kuriyama et al. |
| 2016/0141720 | A1 | 5/2016 | Onozaki et al. |
| 2016/0172707 | A1 | 6/2016 | Oh et al. |
| 2017/0033402 | A1 | 2/2017 | Kubota et al. |
| 2017/0077547 | A1 | 3/2017 | Takami et al. |
| 2017/0077549 | A1 | 3/2017 | Park et al. |
| 2017/0222268 | A1 | 8/2017 | Abe et al. |
| 2017/0229736 | A1 | 8/2017 | Shimanuki et al. |
| 2017/0317385 | A1 | 11/2017 | Zhang et al. |
| 2018/0062207 | A1 | 3/2018 | Matsuoka et al. |
| 2018/0062213 | A1 | 3/2018 | Matsuoka et al. |

FOREIGN PATENT DOCUMENTS

| CN | 104253283 | A | | 12/2014 |
|---|---|---|---|---|
| CN | 105580193 | A | | 5/2016 |
| EP | 0785586 | A1 | | 7/1997 |
| EP | 1905739 | A1 | | 4/2008 |
| EP | 2573853 | A1 | | 3/2013 |
| EP | 2863469 | A1 | | 4/2015 |
| JP | H04-206167 | A | | 7/1992 |
| JP | H07-085888 | A | | 3/1995 |
| JP | H10-208742 | A | | 8/1998 |
| JP | 2001-057236 | A | | 2/2001 |
| JP | 2004-259681 | A | | 9/2004 |
| JP | 2011-049153 | A | | 3/2011 |
| JP | 2013-197061 | A | | 9/2013 |
| JP | 2013-232326 | A | | 11/2013 |
| JP | 2014-194930 | A | | 10/2014 |
| JP | 2015-006505 | A | | 4/2015 |
| JP | 2015-065050 | A | | 4/2015 |
| JP | 2015-164126 | A | | 9/2015 |
| JP | 2015164126 | | * | 9/2015 |
| JP | 2016-085838 | A | | 5/2016 |
| JP | 2016-178125 | A | | 10/2016 |
| JP | 2016-531388 | A | | 10/2016 |
| JP | 2017-054822 | A | | 3/2017 |
| KR | 2013-0047801 | A | | 5/2013 |
| TW | 200845464 | A | | 11/2008 |
| WO | 2013/054795 | A1 | | 4/2013 |
| WO | 2013/142994 | A1 | | 10/2013 |
| WO | 2013/187487 | A1 | | 12/2013 |
| WO | 2015/163139 | A1 | | 10/2015 |
| WO | 2016/009994 | A1 | | 1/2016 |
| WO | 2016/021596 | A1 | | 2/2016 |
| WO | 2016/159108 | A1 | | 10/2016 |
| WO | 2016/159117 | A1 | | 10/2016 |
| WO | 2017/026181 | A1 | | 2/2017 |

OTHER PUBLICATIONS

European Search Repod issued in corresponding European Patent Application No. 20174709.4 dated Oct. 20, 2020.
European Search Repod issued in corresponding European Patent Application No. 18766636.7 dated Dec. 8, 2020.
International Search Report issued in corresponding International Patent Application No. PCT/JP2018/010381 dated Jun. 19, 2018.
Extended European Search Report issued in corresponding European Patent Application No. 21190745.6 dated Dec. 1, 2021.
Partial European Search Report issued in corresponding European Patent Application No. 20174709.4 dated Jul. 14, 2020.
Moumouzias et al., "Comparative study of LiBF4, LiAsF6, LiPF6, and LicClo4 as electrolytes in propylene carbonate-diethyl carbonate solutions for Li/LiMn2O4 cells," Journal of Power Sources, 122: 57-66 (2003).
Wang et al., "Effects of acetonitrile and 1,2-dimethoxyethane on the conductivity of electrolyte in Li-ion battery," Chinese Battery Industry, vol. 16, No. 6, pp. 354-358 (Dec. 2011) (see English abstract).

* cited by examiner

NON-AQUEOUS SECONDARY BATTERY

FIELD OF THE INVENTION

The present invention relates to a non-aqueous electrolyte solution, a non-aqueous secondary battery, a cell pack, and a hybrid power system.

BACKGROUND OF THE INVENTION

A non-aqueous secondary battery such as a lithium ion battery (LIB) is characterized in a light weight, high energy, and a long service life, and is widely used as a power source of various portable electronic devices. In recent years, applications of the non-aqueous secondary batteries are widened to an industrial field represented by a power tool such as an electric tool, an in-vehicle device in an electric bicycle, or the like. Furthermore, attention is also focused in the field of a power storage field such as a home energy storage system.

Patent Document 1 discusses a non-aqueous electrolyte solution of a lithium ion battery. In the technique of Patent Document 1, durability is evaluation by measuring a capacity after a predetermined cycle through a high-temperature cycle test or the like.

Patent Document 2 discusses a non-aqueous electrolyte solution for a lithium secondary battery, capable of improving an initial capacity and an output power characteristic at a room temperature and a low temperature. In the technique of Patent Document 2, the non-aqueous electrolyte solution contains an organic solvent, lithium salt, and a phosphorus compound.

Patent Document 3 discusses a battery technique capable of improving a service life and a rate characteristic by modifying a positive electrode material of the secondary battery.

CITATION LIST

Patent Documents

Patent Document 1: Japanese Unexamined Patent Application Publication No. 2014-194930
Patent Document 2: Japanese Translation of PCT International Application Publication No. 2016-531388
Patent Document 3: Japanese Unexamined Patent Application Publication No. 10-208742

SUMMARY OF THE INVENTION

However, it is known that an acetonitrile-based electrolyte solution is required to form a film on a surface of a negative electrode in order to suppress reductive electrolysis, and a film formation agent used in the prior art is insufficient.

From the discussion described above, it is known that, if a film that can withstand the acetonitrile electrolyte solution is not sufficiently formed, reductive decomposition proceeds at the time of initial charging or each test under a high-temperature environment to cause gas generation, capacity reduction, or the like.

Meanwhile, if a highly durable film is formed, insertion or dissociation of lithium ions to or from the negative electrode is inhibited, so that it is difficult to exhibit high ion conductivity which is the characteristic of the acetonitrile.

In this regard, in order to address the problems of the prior art, the present invention provides a non-aqueous electrolyte solution, a non-aqueous secondary battery, a cell pack, and a hybrid power system, particularly, capable of improving desired battery performance in an acetonitrile electrolyte solution.

According to the present invention, there is provided a non-aqueous electrolyte solution containing a non-aqueous solvent, $PO_2F_2$ anions, and cyclic acid anhydride.

In the present invention, it is preferable that a content of the $PO_2F_2$ anions is 0.001 mass % or more and 1 mass % or less with respect to the non-aqueous electrolyte solution.

In the present invention, it is preferable that the $PO_2F_2$ anions are obtained by dissociating $LiPO_2F_2$.

In the present invention, it is preferable that the cyclic acid anhydride includes at least one of succinic anhydride, maleic anhydride, and phthalic anhydride.

In the present invention, it is preferable that the cyclic acid anhydride includes at least succinic anhydride.

In the present invention, it is preferable that a content of the cyclic acid anhydride is 0.01 mass % or more and 1 mass % or less with respect to the non-aqueous electrolyte solution.

In the present invention, it is preferable that the non-aqueous solvent contains at least acetonitrile.

In the present invention, it is preferable that the non-aqueous electrolyte solution further contains $PF_6$ anions.

In the present invention, it is preferable that the $PF_6$ anions are obtained by dissociating $LiPF_6$.

In the present invention, it is preferable that the non-aqueous electrolyte solution further contains linear carbonate.

In the present invention, it is preferable that the linear carbonate is at least one selected from a group consisting of diethyl carbonate, ethyl methyl carbonate, and dimethyl carbonate.

In the present invention, it is preferable that the non-aqueous solvent contains acetonitrile, and a molar mixing ratio of the linear carbonate relative to the acetonitrile is 0.15 or higher and 2 or lower.

In the present invention, it is preferable that the non-aqueous solvent contains acetonitrile, and a molar mixing ratio of the linear carbonate relative to the acetonitrile is 0.25 or higher and 2 or lower.

In the present invention, it is preferable that the non-aqueous solvent contains acetonitrile, and a molar mixing ratio of the linear carbonate relative to the acetonitrile is 0.4 or higher and 2 or lower.

In the present invention, it is preferable that the non-aqueous electrolyte solution further contains imide salt.

In the present invention, it is preferable that the imide salt includes at least one selected from a group consisting of $LiN(SO_2F)_2$ and $LiN(SO_2CF_3)_2$.

In the present invention, it is preferable that a main component of the lithium salt is the imide salt, or the imide salt and the lithium salt other than the imide salt are contained as the main component in the same amount.

In the present invention, it is preferable that the imide salt is contained in a molarity relationship of "$LiPF_6 \leq$imide salt".

In the present invention, it is preferable that a content of the imide salt is 0.5 mol or more and 3.0 mol or less with respect to a non-aqueous solvent of 1 L.

In the present invention, it is preferable that the non-aqueous solvent contains acetonitrile, and a molar mixing ratio of $PF_6$ anions relative to the acetonitrile is 0.01 or higher and lower than 0.08.

In the present invention, it is preferable that the non-aqueous electrolyte solution further contains cyclic carbonate without saturated secondary carbon.

In the present invention, it is preferable that the cyclic carbonate without saturated secondary carbon includes at least one selected from a group consisting of ethylene carbonate and vinylene carbonate.

In the present invention, it is preferable that the cyclic carbonate without saturated secondary carbon is vinylene carbonate, and a content of vinylene carbonate of 4 volume % or less is contained in the non-aqueous electrolyte solution.

In the present invention, it is preferable that a −30° C. ionic conductivity of the non-aqueous electrolyte solution is 3 mS/cm or higher.

In the present invention, it is preferable that a 0° C. ionic conductivity of the non-aqueous electrolyte solution is 10 mS/cm or higher.

In the present invention, it is preferable that a 20° C. ionic conductivity of the non-aqueous electrolyte solution is 15 mS/cm or higher.

According to the present invention, there is provided a non-aqueous electrolyte solution containing a non-aqueous solvent and lithium salt, wherein activation energy in ion conduction is 15 kJ/mol or lower at a temperature of −20 to 0° C.

In the present invention, it is preferable that activation energy in the ion conduction is 15 kJ/mol or lower at a temperature of 0 to 20° C.

In the present invention, it is preferable that the non-aqueous electrolyte solution further contains a compound expressed as the following Formula (1).

[Chemical Formula 1]

$$-N= \quad \text{Formula (1)}$$

In the present invention, it is preferable that the compound is a nitrogen-containing cyclic compound.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and a non-aqueous electrolyte solution, wherein the non-aqueous electrolyte solution contains acetonitrile and $LiPO_2F_2$, and a value obtained by dividing a bulk resistance at a temperature of −30° C. by an internal resistance value in measurement of electrochemical impedance spectroscopy for the non-aqueous secondary battery is 0.05 to 0.7.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and the non-aqueous electrolyte solution described above, wherein the non-aqueous secondary battery contains a compound having at least one functional group selected from a group consisting of —N=, —$NH_4$, —N=O, —NH—NH—, and ($NO_3$)—, and a value obtained by dividing a bulk resistance at a temperature of −30° C. by an internal resistance value in measurement of electrochemical impedance spectroscopy for the non-aqueous secondary battery is 0.05 to 0.7.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and a non-aqueous electrolyte solution, wherein the negative-electrode active material layer contains at least one compound selected from a group consisting of imide salt and $(SO_4)^{2-}$, the imide salt is at least one selected from a group consisting of lithium salt and onium salt, and a bulk resistance at a temperature of 25° C. in measurement of electrochemical impedance spectroscopy for the non-aqueous secondary battery is 0.025 ohm or smaller.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and the non-aqueous electrolyte solution described above, wherein the non-aqueous secondary battery contains at least one compound selected from a group consisting of organic acid, salt thereof, acid anhydride, and $Li_2O$, the organic acid includes at least one of acetic acid, oxalic acid, and formic acid, and a value obtained by dividing a bulk resistance at a temperature of −30° C. by an internal resistance value in measurement of electrochemical impedance spectroscopy for the non-aqueous secondary battery is 0.05 to 0.7.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and a non-aqueous electrolyte solution, wherein the negative-electrode active material layer contains at least one compound selected from a group consisting of imide salt and $(SO_4)^{2-}$, the imide salt is at least one selected from a group consisting of lithium salt and onium salt, and a bulk resistance at a temperature of −30° C. in measurement of electrochemical impedance spectroscopy for the non-aqueous secondary battery is 0.07 ohm or smaller.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and the non-aqueous electrolyte solution described above, wherein the non-aqueous secondary battery contains a compound having at least one functional group selected from a group consisting of —N=, —$NH_4$, —N=O, —NH—NH—, and ($NO_3$)—, and the non-aqueous secondary battery has a capacity retention rate of 70% or higher, the capacity retention rate being calculated by dividing a 5 C discharge capacity by a 1 C discharge capacity after a storage test for 4 hours at 85° C.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and the non-aqueous electrolyte solution described above, wherein the non-aqueous secondary battery contains at least one compound selected from a group consisting of organic acid, salt thereof, acid anhydride, and $Li_2O$, the organic acid includes at least one acetic acid, oxalic acid, and formic acid, and the non-aqueous secondary battery has a capacity retention rate of 70% or higher, the capacity retention rate being calculated by dividing a 5 C discharge capacity by a 1 C discharge capacity after a storage test for 4 hours at 85° C.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and the non-aqueous electrolyte solution described above, wherein the non-aqueous secondary battery contains a compound having at least one functional group selected from a group consisting of —N=, —NH$_4$, —N=O, —NH—NH—, and (NO$_3$)—, and the non-aqueous secondary battery has a 0° C. ionic conductivity of 10 mS/cm or higher after a storage test for 4 hours at 85° C.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and the non-aqueous electrolyte solution described above, wherein the non-aqueous secondary battery contains at least one compound selected from a group consisting of organic acid, salt thereof, acid anhydride, and Li$_2$O, the organic acid includes at least one of acetic acid, oxalic acid, and formic acid, and the non-aqueous secondary battery has a 0° C. ionic conductivity of 10 mS/cm or higher after a storage test for 4 hours at 85° C.

In the present invention, it is preferable that the positive-electrode active material is a lithium-containing composite metal oxide expressed as "Li$_2$MO$_2$" (where "M" contains Ni and one or more metal elements selected from a group consisting of Mn, Co, Al, and Mg, a content ratio of the Ni element is more than 50%, and "z" denotes a number greater than 0.9 and smaller than 1.2).

In the present invention, it is preferable that a difference of the negative electrode electric potential around injection of the non-aqueous electrolyte solution is 0.3 V or higher.

In the present invention, it is preferable that a gas generation amount in a storage test at 60° C. for 200 hours is 0.008 ml or less per 1 mAh.

In the present invention, it is preferable that a resistance increase rate in a full-charge storage test at 60° C. for 720 hours is 400% or lower.

According to the present invention, there is provided a cell pack comprising the non-aqueous secondary battery described above, wherein the positive-electrode active material layer contains a lithium-containing compound including Fe, the negative-electrode active material layer contains graphite or at least one or more elements selected from a group consisting of Ti, V, Sn, Cr, Mn, Fe, Co, Ni, Zn, Al, Si, and B, the non-aqueous electrolyte solution contains cyclic carbonate without saturated secondary carbon, the cyclic carbonate without saturated secondary carbon is at least one selected from a group consisting of ethylene carbonate and vinylene carbonate, the non-aqueous secondary battery is configured by connecting one module or two or more modules, in which the module is obtained by connecting four cells in series, in parallel or the non-aqueous secondary battery is configured by connecting the four modules, in which the module is obtained by connecting two or more cells in parallel, in series, an operation voltage range per cell is within a range of 1.8 to 3.7 V, an average operation voltage is 2.5 to 3.5 V, and the module is mounted with a battery management system (BMS).

According to the present invention, there is provided a hybrid power system obtained by combining the cell pack described above, and a module or cell pack having a secondary battery other than a lithium ion battery.

According to the present invention, there is provided a cell pack comprising the non-aqueous secondary battery described above, wherein the positive-electrode active material layer contains a lithium-containing compound including Fe, the negative-electrode active material layer contains graphite or at least one or more elements selected from a group consisting of Ti, V, Sn, Cr, Mn, Fe, Co, Ni, Zn, Al, Si, and B, the non-aqueous electrolyte solution contains cyclic carbonate without saturated secondary carbon, the cyclic carbonate without saturated secondary carbon is at least one selected from a group consisting of ethylene carbonate and vinylene carbonate, the cell pack is configured by connecting one cell pack or two or more cell packs in parallel on the basis of Formula (2) and Formula (3), in which the number of cells and the number of modules of the non-aqueous secondary battery are defined, or the non-aqueous secondary battery is configured by connecting modules on the basis of Formula (2) and Formula (3), the module being obtained by connecting two or more cells in parallel, an operation voltage range per cell is within a range of 1.8 to 3.7 V, an average operation voltage is 2.5 to 3.5 V, and the module is mounted with a battery management system (BMS).

Formula (2): Number of cells connected in series per module (X): X=2, 4, 8, or 16

Formula (3): Number of modules connected in series per cell pack (Y): Y=16/X.

According to the present invention, there is provided a hybrid power system including the cell pack described above, and a module or cell pack having a secondary battery other than a lithium ion battery in combination.

Using the non-aqueous electrolyte solution according to the present invention, it is possible to delay generation of gas in the event of high-temperature operation and overcharging, reinforce the negative electrode SEI, and obtain excellent low-temperature characteristics or output power characteristics and excellent high-temperature characteristics.

As described above, using the non-aqueous electrolyte solution and the non-aqueous secondary battery using the same according to the present invention, it is possible to provide an acetonitrile electrolyte solution capable of improving desired battery performance.

DESCRIPTION OF EMBODIMENTS

Figure 1:
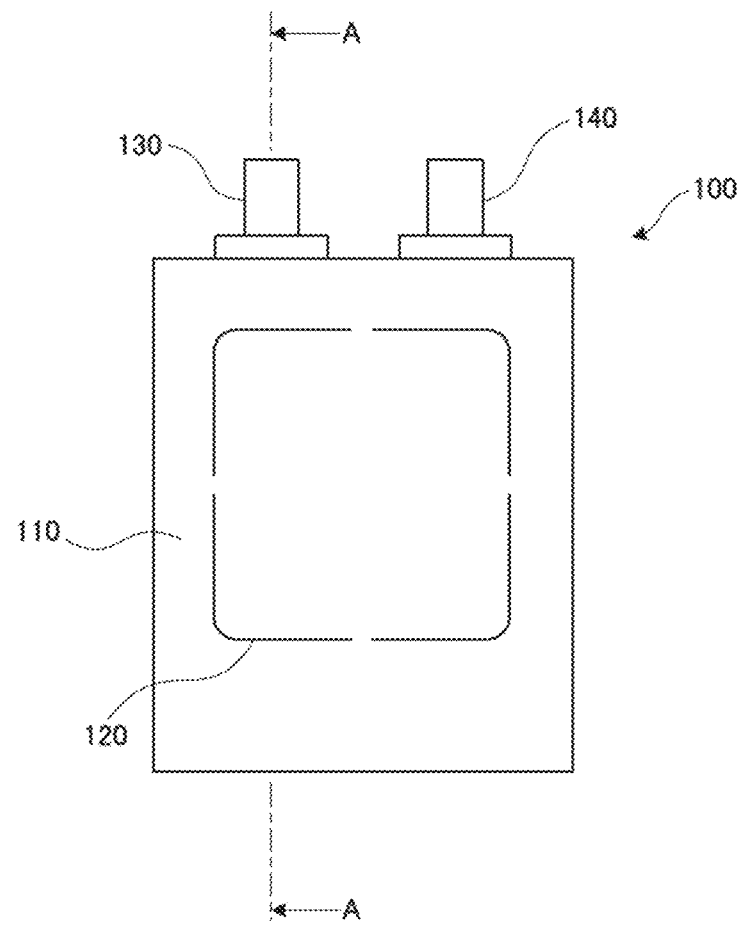
FIG. 1 is a plan view schematically illustrating an exemplary non-aqueous secondary battery according to an embodiment of the invention.

Embodiments of the invention (hereinafter, simply referred to as "embodiment") will now be described in details.

First Embodiment: Non-Aqueous Electrolyte Solution

First, a technical change at the time of development of the present invention will be described. Acetonitrile has a high potential as a solvent of the electrolyte solution due to excellent balance between viscosity and relative dielectric constant. For this reason, an electrolyte solution for a lithium ion battery provided with acetonitrile as a non-aqueous solvent has an excellent low-temperature characteristic. However, since acetonitrile has low resistance to reduction, there has been a problem that, when a reduction reaction site of the negative electrode is activated at a high temperature in the case of a lithium ion battery, the reductive decomposition of acetonitrile rapidly proceeds. For this reason, when the lithium ion battery is stored at a high temperature, reduction of acetonitrile is promoted, and gas is generated to cause battery swelling disadvantageously. In this regard, the inventors have developed the invention for suppressing battery swelling when the lithium ion battery using the electrolyte solution is at a high temperature by appropriately adjusting the type and the content of the additives to be added in the non-aqueous electrolyte solution, particularly an electrolyte solution containing acetonitrile. That is, this embodiment includes the following characteristic parts.

A non-aqueous electrolyte solution according to a first embodiment contains a non-aqueous solvent, $PO_2F_2$ anions, and cyclic acid anhydride.

In this manner, the non-aqueous electrolyte solution according to the first embodiment contains $PO_2F_2$ anions and cyclic acid anhydride in addition to the non-aqueous solvent.

The $PO_2F_2$ anions and the cyclic acid anhydride form a robust passive film called a solid electrolyte interface (SEI) on the negative electrode when an electrolyte solution containing them is used in the non-aqueous secondary battery. Although the SEI has ion conductivity, it does not have electron conductivity, so that reductive decomposition of the electrolyte solution is suppressed. Due to the $PO_2F_2$ anions and the cyclic acid anhydride, the SEI formed on the negative electrode is reinforced, so that the reductive decomposition of the electrolyte solution is effectively suppressed. As a result, when the non-aqueous secondary battery is heated to a high temperature, a reduction reaction of the electrolyte solution is promoted, and generation of gas is suppressed, so that battery swelling is suppressed.

The non-aqueous secondary battery using the non-aqueous electrolyte solution according to this embodiment can suppress reductive decomposition of the non-aqueous electrolyte solution in the event of high-temperature heating and suppress battery swelling at a high temperature.

For this reason, the non-aqueous secondary battery according to this embodiment can be applied to a high-temperature region, for example, at a temperature of 60° C. and is applicable to, for example, outdoor applications in summer or the like.

The non-aqueous secondary battery according to this embodiment has a positive electrode having a positive-electrode active material layer formed on one surface or both surfaces of a current collector, a negative electrode having a negative-electrode active material layer formed on one surface or both surfaces of a current collector, and a non-aqueous electrolyte solution.

The non-aqueous electrolyte solution contains, for example, a non-aqueous solvent, lithium salt, $PO_2F_2$ anions, and at least one selected from a group consisting of succinic anhydride (SAH), maleic anhydride (MAH), and phthalic anhydride (PAH) as the cyclic acid anhydride. Specifically, the non-aqueous electrolyte solution contains, for example, acetonitrile, imide salt such as $LiPF_6$, $LiN(SO_2F)_2$ or $LiN(SO_2CF_3)_2$, SAH, and $LiPO_2F_2$. In this case, in the non-aqueous secondary battery, there is no particular limitation in the negative electrode, the positive electrode, the separator, and the battery casing.

The configuration described above has a remarkable effect of suppressing an increase of resistance during high-temperature heating and obtaining low-temperature characteristics.

Second Embodiment: Non-Aqueous Electrolyte Solution

According to the second embodiment, in the non-aqueous electrolyte solution of the first embodiment, the content of $PO_2F_2$ anions preferably has a range of 0.001 mass % or more and 1 mass % or less with respect to the non-aqueous electrolyte solution.

The non-aqueous electrolyte solution according to the second embodiment preferably contains acetonitrile, $PF_6$ anions, $PO_2F_2$ anions, cyclic acid anhydride, and imide salt. Among them, the $PO_2F_2$ anions and the cyclic acid anhydride contribute to suppression of an increase of internal resistance during high-temperature heating. In addition, the imide salt contributes to improvement of the low-temperature characteristics. Here, the imide salt refers to lithium salt expressed as expressed as "$LiN(SO_2C_mF_{2m+1})_2$" (where "m" denotes an integer of 0 to 8).

Due to the composition of the non-aqueous electrolyte solution according to this embodiment, it is possible to suppress an increase of internal resistance during high-temperature heating and obtain excellent low-temperature characteristics.

Note that the low-temperature characteristics can be determined on the basis of the ionic conductivity at a low temperature (specifically, −10° C. or −30° C.).

According to the second embodiment, the content of $PO_2F_2$ anions has a range of 0.001 mass % or more and 1 mass % or less with respect to the non-aqueous electrolyte solution. In addition, the content of cyclic acid anhydride preferably has a range of 0.01 mass % or more and 1 mass % or less with respect to the non-aqueous electrolyte solution. Furthermore, the non-aqueous electrolyte solution contains imide salt with a molarity relationship of "$LiPF_6 \leq$ imide salt". Here, the contents of $PO_2F_2$ anions and the cyclic acid anhydride are expressed as mass ratios by assuming that a sum of all components of the non-aqueous electrolyte solution is set to 100 mass %. In addition, the molarities of $LiPF_6$ and imide salt are measured for the non-aqueous solvent of "1 L".

By defining the contents and the molarities as described above, $PO_2F_2$ anions and cyclic acid anhydride form a robust SEI on the negative electrode. In this manner, since a passive film called "SEI" is formed on the negative electrode, it is possible to effectively suppress an increase of resistance during high-temperature heating.

Since the imide salt is contained with a molarity relationship of "$LiPF_6 \leq$ imide salt", it is possible to suppress a decrease of the ionic conductivity at a low temperature and obtain excellent low-temperature characteristics.

The content of $PO_2F_2$ anions is more preferably 0.05 mass % or more and 1 mass % or less with respect to the non-aqueous electrolyte solution. In addition, the content of cyclic acid anhydride is more preferably 0.1 mass % or more and 0.5 mass % or less with respect to the non-aqueous electrolyte solution.

The content of imide salt is preferably 0.5 mol or more and 3 mol or less with respect to the non-aqueous solvent of "1 L".

As a result, it is possible to more effectively suppress an increase of resistance during high-temperature heating and obtain more excellent low-temperature characteristics.

According to this embodiment, it is possible to suppress a resistance increase rate to 400% or lower in a full-charge storage test for 720 hours at 60° C., but not limited thereto. In addition, preferably, it is possible to suppress the resistance increase rate to 300% or lower. More preferably, it is possible to suppress the resistance increase rate to 250% or lower.

According to this embodiment, the ionic conductivity at a temperature of −10° C. is preferably 10 mS/cm or higher, but not limited thereto. More preferably, the ionic conductivity at a temperature of −10° C. is 12 mS/cm or higher, and furthermore preferably, 12.5 mS/cm or higher.

According to this embodiment, the ionic conductivity at a temperature of −30° C. is 3 mS/cm or higher, and more preferably, 5 mS/cm or higher, but not limited thereto. Furthermore preferably, the ionic conductivity at a temperature of −30° C. is 6 mS/cm or higher, and furthermore preferably, the ionic conductivity at a temperature of −30° C. is 6.5 mS/cm or higher.

The non-aqueous secondary battery using the non-aqueous electrolyte solution according to this embodiment may function as a battery through initial charging. However, a part of the electrolyte solution is decomposed at the time of the initial charging for stabilization. In this case, since the content of $PO_2F_2$ anions or cyclic acid anhydride in the electrolyte solution is originally small, and they are incorporated into the SEI, or due to other reasons, it was difficult to detect a component after the initial charging in some cases.

For this reason, in the non-aqueous secondary battery using the $LiPF_6$-based acetonitrile electrolyte solution, if the aforementioned properties are provided after the initial charging, it can be inferred that the components of the non-aqueous electrolyte solution according to this embodiment are contained.

The non-aqueous secondary battery using the non-aqueous electrolyte solution according to the first and second embodiments may include a positive electrode, a negative electrode, and a non-aqueous electrolyte solution. In addition, the resistance increase rate may be 400% or lower in a full-charge storage test for 720 hours at 60° C., and the ionic conductivity at −10° C. may be 10 mS/cm or higher.

The non-aqueous secondary battery using the non-aqueous electrolyte solution according to the first and second embodiments can suppress a resistance increase rate during high-temperature heating and obtain excellent low-temperature characteristics.

For this reason, the non-aqueous secondary battery according to this embodiment is applicable to a wide temperature range from approximately 60° C. to −30° C. such as outdoor applications in summer and cold region use.

Third Embodiment: Non-Aqueous Electrolyte Solution

According to the third embodiment, in the non-aqueous electrolyte solution according to the first or second embodiment, the $PO_2F_2$ anions are preferably obtained by dissociating $LiPO_2F_2$.

In this manner, the electrolyte solution contains $PO_2F_2$ anions and lithium ions. By analyzing both ions, it is possible to check whether or not $LiPO_2F_2$ as the lithium salt is contained.

Fourth Embodiment: Non-Aqueous Electrolyte Solution

According to a fourth embodiment, in any one of the first to third embodiments, the cyclic acid anhydride preferably contains at least one selected from a group consisting of succinic anhydride, maleic anhydride, and phthalic anhydride. Only one of these cyclic acid anhydrides or a plurality of cyclic acid anhydrides may be contained. Alternatively, any cyclic acid anhydride other than the aforementioned cyclic acid anhydrides may also be contained. As a result, it is possible to form a robust SEI on the negative electrode and suppress an increase of the resistance during high-temperature heating.

Fifth Embodiment: Non-Aqueous Electrolyte Solution

According to the fifth embodiment, the cyclic acid anhydride of the non-aqueous electrolyte solution of the fourth embodiment preferably includes at least succinic anhydride. As a result, it is possible to more effectively form a robust SEI on the negative electrode.

Sixth Embodiment: Non-Aqueous Electrolyte Solution

According to the sixth embodiment, in the non-aqueous electrolyte solution of any one of the first to fifth embodiments, the content of cyclic acid anhydride is preferably 0.01 mass % or more and 1 mass % or less with respect to the non-aqueous electrolyte solution.

The content of the cyclic acid anhydride is calculated on a mass percentage basis relative to a total mass of all components contained in the non-aqueous electrolyte solution. More preferably, the content of the cyclic acid anhydride is 0.1 mass % or more and 0.7 mass % or less, and furthermore preferably, 0.5 mass % or less with respect to the non-aqueous electrolyte solution.

As a result, it is possible to more effectively delay generation of gas in the event of overcharge.

Seventh Embodiment: Non-Aqueous Electrolyte Solution

According to the seventh embodiment, in the non-aqueous electrolyte solution of any one of the first to sixth embodiments, the non-aqueous solvent preferably contains at least acetonitrile.

The non-aqueous solvent may contain acetonitrile alone or any other type of non-aqueous solvents other than the acetonitrile. Specific examples of the non-aqueous solvents applicable to this embodiment will be described below. Since the electrolyte solution containing acetonitrile contains $LiPO_2F_2$ and cyclic acid anhydride, the SEI is reinforced. For this reason, even under a high-temperature environment, dissolution of the SEI of the negative electrode is suppressed. Therefore, reductive decomposition of acetonitrile is suppressed.

Eighth Embodiment: Non-Aqueous Electrolyte Solution

According to an eighth embodiment, the non-aqueous electrolyte solution of any one of the first to seventh embodiments preferably contains $PF_6$ anions.

In this manner, since $PF_6$ anions are contained, hydrogen is removed from an α-position of acetonitrile, and generation of HF is promoted, so that LiF as an element of the negative electrode SEI is effectively formed. In addition, a suitable amount of water more effectively promotes a reaction of forming the negative electrode SEI of the cyclic acid anhydride. Therefore, since $PF_6$ anions are contained, organic/inorganic complexation of the negative electrode SEI efficiently proceeds, so that it is possible to more effectively delay generation of gas during overcharge.

Specifically, the composition of the non-aqueous electrolyte solution according to the eighth embodiment includes, for example, acetonitrile, $LiPF_6$, SAH, and $LiPO_2F_2$. In this case, in the non-aqueous secondary battery, there is no particular limitation in the negative electrode, the positive electrode, the separator, and the battery casing.

Ninth Embodiment: Non-Aqueous Electrolyte Solution

According to a ninth embodiment, in the non-aqueous electrolyte solution of the eighth embodiment, $PF_6$ anions are preferably obtained by dissociating $LiPF_6$.

In this manner, the $PF_6$ anions and the lithium ions exist in the electrolyte solution. By analyzing both the ions, it is possible to check whether or not the lithium salt and the $LiPF_6$ are contained.

According to this embodiment, the electrolyte solution is preferably obtained by mixing $LiPO_2F_2$ and then adding $LiPF_6$. In this manner, by defining the mixing sequence of the electrolyte solution, it is possible to control the dissolution speed of $LiPF_6$ and suppress generation of a decomposition product.

The electrolyte solution is preferably obtained by mixing acetonitrile and cyclic acid anhydride and then adding $LiPF_6$. As a result, it is possible to suppress an abrupt temperature increase when adding $LiPF_6$ and suppress generation of HF that causes an increase of internal resistance due to sacrificial reaction of the cyclic acid anhydride.

A temperature increase at the time of adding $LiPF_6$ is preferably suppressed to 50° C. or lower. As a result, it is possible to appropriately suppress thermal decomposition of $LiPF_6$ that may be generated at a temperature of 60° C. or higher.

Tenth Embodiment: Non-Aqueous Electrolyte Solution

According to a tenth embodiment, the non-aqueous electrolyte solution of any one of the first to ninth embodiments preferably further contains linear carbonate.

The combined use of acetonitrile and linear carbonate advantageously acts to suppress association between acetonitrile and $LiPF_6$.

Specifically, the composition of the non-aqueous electrolyte solution according to the tenth embodiment includes, for example, acetonitrile, $LiPF_6$, $LiN(SO_2F)_2$, $LiN(SO_2CF_3)_2$, SAH (1% or less), $LiPO_2F_2$, and VC (4% or less). In this case, in the non-aqueous secondary battery, there is no particular limitation in the negative electrode, the positive electrode, the separator, and the battery casing.

Using the configuration described above, a remarkable effect appears on the high-temperature durability of the non-aqueous secondary battery, so that it is possible to obtain a long service life even under a high-temperature environment.

Eleventh Embodiment: Non-Aqueous Electrolyte Solution

According to the eleventh embodiment, the linear carbonate of the non-aqueous electrolyte solution of the tenth embodiment includes, for example, at least one selected from a group consisting of diethyl carbonate, ethyl methyl carbonate, and dimethyl carbonate.

A specific composition according to the eleventh embodiment is a non-aqueous electrolyte solution containing $LiPF_6$, acetonitrile (AcN), and diethyl carbonate (DEC). In addition, the lithium salt may include $LiPF_6$, $LiN(SO_2F)_2$, or $LiB(C_2O_4)_2$ (LiBOB). In addition, the non-aqueous electrolyte solution preferably contains succinic anhydride (SAH).

According to the eleventh embodiment, the non-aqueous electrolyte solution preferably contains $LiPF_6$ and $LiN(SO_2F)_2$ as the lithium salt, acetonitrile as the solvent, and cyclic acid anhydride and $LiPO_2F_2$ as the additive. As a result, it is possible to suppress cycle degradation at a low temperature by suppressing an interface (film) resistance to be low.

In the non-aqueous electrolyte solution described above, a total mass of the additive is preferably less than 5%. Note that the additive refers to a general element used as a protection film formation agent such as VC, MAH, SAH, PAH, and ES. As a result, it is possible to suppress an interface (film) resistance to be low and suppress cycle degradation at a low temperature.

In the non-aqueous electrolyte solution described above, it is preferable that the amount of $LiPO_2F_2$ is 0.005 to 1 mass %, and the amount of vinylene carbonate is 4 mass % or less. As a result, by setting the amount of $LiPO_2F_2$ and the amount of vinylene carbonate to a predetermined range, it is possible to provide a secondary battery having excellent high-temperature durability and excellent low-temperature performance.

The non-aqueous secondary battery using the non-aqueous electrolyte solution according to the eleventh embodiment may be used for a cold region.

Twelfth Embodiment: Non-Aqueous Electrolyte Solution

According to the twelfth embodiment, in the non-aqueous electrolyte solution of the tenth or eleventh embodiment, the molar mixing ratio of the linear carbonate relative to acetonitrile is preferably set to 0.15 or higher and 2 or lower.

The combined use of the acetonitrile and the linear carbonate advantageously acts to suppress association between acetonitrile and $LiPF_6$. However, the linear carbonate has low polarity. In this regard, the molar mixing ratio of the linear carbonate relative to acetonitrile is adjusted in order to appropriately suppress a decrease of ionic conductivity in a low temperature range even when the linear carbonate is contained.

That is, according to the twelfth embodiment, the molar mixing ratio of the linear carbonate relative to the acetonitrile that affects solubility is adjusted to a particular range. The molar mixing ratio of the linear carbonate relative to acetonitrile is expressed as "C/A", where "A" denotes the number of moles of the acetonitrile and "C" denote the number of moles of the linear carbonate.

That is, according to the twelfth embodiment, the molar mixing ratio (C/A) of the linear carbonate relative to acetonitrile is adjusted to 0.15 or higher and 2 or lower.

According to this embodiment, it is preferable that the following conditions are satisfied: (1) the non-aqueous electrolyte solution contains $LiPF_6$ and a non-aqueous solvent, and the non-aqueous solvent contains acetonitrile and linear carbonate; (2) the content of $LiPF_6$ is 1.5 mol or less with respect to a non-aqueous solvent of 1 L; (3) the molar mixing ratio of $LiPF_6$ relative to acetonitrile is 0.08 or higher and 0.16 or lower; and (4) the molar mixing ratio of the linear carbonate relative to acetonitrile is set to 0.15 or higher and 2 or lower.

As a result, it is possible to more effectively address a tradeoff problem between prevention of association of $LiPF_6$ and suppression of a decrease of the ionic conductivity. Specifically, it is possible to obtain an ionic conductivity of 3 mS/cm or higher at a temperature of $-30°$ C. without observing precipitation of white sediments as aggregate. According to this embodiment, preferably, it is possible to obtain an ionic conductivity of 3.5 mS/cm or higher at a temperature of $-30°$ C. without inhibiting ion conduction caused by the aggregate. More preferably, it is possible to obtain an ionic conductivity of 4 mS/cm or higher without inhibiting ion conduction caused by the aggregate. Furthermore preferably, it is possible to obtain an ionic conductivity of 4.5 mS/cm or higher without forming the aggregate.

The specific composition and application of the twelfth embodiment are similar to those of the eleventh embodiment.

Thirteenth Embodiment: Non-Aqueous Electrolyte Solution

According to the thirteenth embodiment, in the non-aqueous electrolyte solution of the tenth or eleventh embodiment, the molar mixing ratio of the linear carbonate relative to acetonitrile is preferably set to 0.25 or higher and 2 or lower.

According to the thirteenth embodiment, a limitation is further added to the twelfth embodiment. As a result, even when the linear carbonate is contained, it is possible to more effectively and appropriately suppress a decrease of the ionic conductivity in a low temperature range.

Fourteenth Embodiment: Non-Aqueous Electrolyte Solution

According to the fourteenth embodiment, in the non-aqueous electrolyte solution of the tenth or eleventh embodiment, the molar mixing ratio of linear carbonate relative to acetonitrile is preferably 0.4 or higher and 2 or lower.

According to the fourteenth embodiment, a limitation is further added to the thirteenth embodiment. As a result, even when the linear carbonate is contained, it is possible to more effectively and appropriately suppress a decrease of the ionic conductivity in a low-temperature range.

Fifteenth Embodiment: Non-Aqueous Electrolyte Solution

According to the fifteenth embodiment, the non-aqueous electrolyte solution of any one of the first to fourteenth embodiments preferably contains imide salt.

A technical change at the time of development of the fifteenth embodiment will be described. In the existing electrolyte solution, imide salt such as lithium bis (fluorosulfonyl) imide ($LiN(SO_2F)_2$) is employed in order to improve the ionic conductivity and the cycle characteristics of the battery, or the like. Here, the imide salt is lithium salt expressed as "$LiN(SO_2C_mF_{2m+1})_2$", where "m" denotes an integer of 0 to 8. However, in the non-aqueous electrolyte solution containing imide salt, corrosion proceeds so as to form a soluble complex with aluminum used as a positive electrode current collector of the lithium secondary battery through charging/discharging, so that elution is generated in the electrolyte solution disadvantageously. In this regard, the inventors achieved the present invention to provide an electrolyte solution capable of suppressing aluminum elution through charging/discharging even when the imide salt is contained.

According to the fifteenth embodiment, the non-aqueous electrolyte solution contains a non-aqueous solvent, $PO_2F_2$ anions, lithium salt, and cyclic acid anhydride, and the lithium salt includes imide salt.

Here, according to the fifteenth embodiment, the non-aqueous electrolyte solution preferably contains the $PF_6$ anions of the eighth embodiment. The $PF_6$ anions react with water to produce hydrogen fluoride (hereinafter, referred to as "HF") and $PF_5$. The fluorine ion derived from HF reacts with aluminum as the positive electrode current collector to generate a passive film on a surface. As a result, it is possible to suppress corrosion of the positive electrode containing aluminum and elution of aluminum in the electrolyte solution.

If the acetonitrile is heated in presence of $PF_5$, hydrogen is released from the α-position so as to promote generation of HF from the $PF_6$ anion. As a result, even under a high-temperature environment where corrosion of aluminum proceeds, restoration of the passive film is promoted, so that it is possible to further suppress elution of aluminum. That is, it is possible to suppress elution of aluminum even in charging/discharging.

According to the fifteenth embodiment, the non-aqueous electrolyte solution preferably contains water of 1 ppm or more and 200 ppm or less, and more preferably, 1 ppm or more and 30 ppm or less. This is because an appropriate amount of water contributes to passivation of aluminum in the non-aqueous electrolyte solution.

A specific composition of the non-aqueous electrolyte solution according to the fifteenth embodiment includes, for example, acetonitrile, imide salt such as $LiN(SO_2F)_2$ or $LiN(SO_2CF_3)_2$, SAH, and $LiPO_2F_2$. In this case, in the non-aqueous secondary battery, there is no particular limitation in the negative electrode, the positive electrode, the separator, and the battery casing.

Sixteenth Embodiment: Non-Aqueous Electrolyte Solution

According to the sixteenth embodiment, the imide salt of the non-aqueous electrolyte solution of the fifteenth embodiment preferably includes at least one selected from a group consisting of $LiN(SO_2F)_2$ and $LiN(SO_2CF_3)_2$. Only one or both of these imide salts may be included. Alternatively, any other imide salt may also be contained.

According to the sixteenth embodiment, since hydrogen is released from the α-position of acetonitrile, generation HF from the $PF_6$ anions is promoted. Therefore, it is possible to promote passivation of aluminum even when the imide salt is used.

Note that, according to the sixteenth embodiment, $LiPO_2F_2$, cyclic acid anhydride, and imide salt are preferably added to the $LiPF_6$-based acetonitrile electrolyte solution. As a result, it is possible to suppress an increase of resistance during high-temperature heating and obtain low-temperature characteristics.

According to the sixteenth embodiment, it is preferable that the imide salt is added to the $LiPF_6$-based acetonitrile electrolyte solution such that the molarity is set to "$LiPO_2F_2$ of 0.005 to 1 mass %, cyclic acid anhydride of 0.01 to 1 mass %, and $LiPF_6 \leq$ imide salt". As a result, the $LiPO_2F_2$ and the cyclic acid anhydride reinforce the negative electrode SEI and suppress an increase of resistance during high-temperature heating. In addition, excellent low-temperature characteristics are exhibited due to the imide salt.

According to the sixteenth embodiment, it is preferable that $LiPO_2F_2$ of 0.1 to 0.5 mass % with respect to the acetonitrile electrolyte solution is added, and cyclic acid anhydride of 0.01 to 0.5 mass % with respect to the electrolyte solution is added. In addition, the content of the imide salt (particularly, $LiN(SO_2F)_2$) is set to 0.5 to 3 mol with respect to the non-aqueous solvent of 1 L. As a result, $LiPO_2F_2$ and the cyclic acid anhydride reinforce the negative electrode SEI, so that it is possible to suppress an increase of resistance during high-temperature heating.

Seventeenth Embodiment: Non-Aqueous Electrolyte Solution

According to the seventeenth embodiment, the non-aqueous electrolyte solution of the fifteenth or sixteenth embodiment contains imide salt as a main component of the lithium salt. Preferably, the non-aqueous electrolyte solution contains the imide salt and lithium salt other than the imide salt, as main components, by the same amount.

Here, the "main component" refers to lithium salt contained most in the electrolyte solution, and a percentage of the molar quantity of the imide salt relative to a total molar quantity of the lithium salt contained in the electrolyte solution is preferably 50% or higher, and more preferably 60% or higher.

Among the lithium salts, the imide salt may be contained most alone or lithium salt other than the imide salt may be contained most in combination.

The lithium salt of the non-aqueous electrolyte solution according to this embodiment may include $LiPF_6$, $LiN(SO_2F)_2$, or $LiN(SO_2CF_3)_2$.

In the non-aqueous electrolyte solution according to this embodiment, elution of aluminum caused charging/discharging is negligible. In addition, since the imide salt is contained, it is possible to improve the ionic conductivity and the battery cycle characteristic.

Therefore, the non-aqueous secondary battery using the non-aqueous electrolyte solution according to this embodiment is applicable to general-purpose products, automobiles, and the like, and is advantageous in that a voltage drop caused by charging/discharging is negligible.

Eighteenth Embodiment: Non-Aqueous Electrolyte Solution

According to the eighteenth embodiment, any one of the non-aqueous electrolyte solutions of the fifteenth to seventeenth embodiments preferably contains imide salt with a molarity relationship of "$LiPF_6 \leq$ imide salt".

According to the eighteenth embodiment, the content of $LiPO_2F_2$ preferably has a range of 0.001 mass % or more and 1 mass % or less with respect to the non-aqueous electrolyte solution. In addition, the content of the cyclic acid anhydride is preferably 0.01 mass % or more and 1 mass % or less with respect to the non-aqueous electrolyte solution. Furthermore, imide salt is preferably contained with a molarity relationship of "$LiPF_6 \leq$ imide salt". Here, the content of $LiPO_2F_2$ and the content of cyclic acid anhydride are expressed as a mass ratio by assuming that a sum of all components of the non-aqueous electrolyte solution is set to 100 mass %. In addition, the molarities of $LiPF_6$ and imide salt are measured with respect to the non-aqueous solvent of "1 L".

According to the eighteenth embodiment, by defining the content and the molarity as described above, $LiPO_2F_2$ and cyclic acid anhydride form a robust SEI on the negative electrode. In this manner, since a passive film called SEI is formed on the negative electrode, it is possible to effectively suppress an increase of resistance during high-temperature heating.

Since imide salt is contained with a molarity relationship of "$LiPF_6 \leq$ imide salt", it is possible to suppress a decrease of the ionic conductivity at a low temperature and obtain excellent low-temperature characteristics.

According to this embodiment, the content of $LiPO_2F_2$ is more preferably 0.05 mass % or more and 1 mass % or less with respect to the non-aqueous electrolyte solution. In addition, the content of cyclic acid anhydride is more preferably 0.1 mass % or more and 0.5 mass % or less with respect to the non-aqueous electrolyte solution. Furthermore, the content of imide salt is preferably 0.5 mol or more and 3 mol or less with respect to the non-aqueous solvent of "1 L". In this manner, by limiting the content, it is possible to more effectively suppress an increase of resistance during high-temperature heating and obtain more excellent low-temperature characteristics.

According to the eighteenth embodiment, similar to the sixteenth embodiment, the imide salt preferably includes at least one selected from a group consisting of $LiN(SO_2F)_2$ and $LiN(SO_2CF_3)_2$, but not limited thereto. Only one or both of these imide salts may be included. Alternatively, any other imide salt may also be contained. In this case, the imide salt is preferably contained with a molarity relationship of "$LiPF_6 \leq$ imide salt". In addition, the content of the imide salt is preferably 0.5 mol or more and 3 mol or less with respect to the non-aqueous solvent of "1 L".

Using the non-aqueous electrolyte solution containing at least one selected from a group consisting of $LiN(SO_2F)_2$ and $LiN(SO_2CF_3)_2$, it is possible to effectively suppress reduction of the ionic conductivity at a low temperature range of −10° C. or −30° C. and obtain excellent low-temperature characteristics.

The non-aqueous electrolyte solution according to the eighteenth embodiment contains acetonitrile, $LiPF_6$, $LiPO_2F_2$, imide salt including at least one selected from a group consisting of $LiN(SO_2F)_2$ and $LiN(SO_2CF_3)_2$, and cyclic acid anhydride including at least one selected from a group consisting of succinic anhydride, maleic anhydride, and phthalic anhydride. The cyclic acid anhydride preferably includes succinic anhydride (SAH).

In this case, there is no particular limitation in the negative electrode. Meanwhile, the positive-electrode active material preferably includes a lithium-containing compound having layered rock salt type crystals, but not limited thereto.

There is no particular limitation in the separator and the battery casing.

The configuration described above has a remarkable effect of suppressing an increase of resistance during high-temperature heating and obtaining low-temperature characteristics.

The non-aqueous secondary battery using the non-aqueous electrolyte solution according to the eighteenth embodiment may be used in the outdoor applications in summer.

Nineteenth Embodiment: Non-Aqueous Electrolyte Solution

According to the nineteenth embodiment, in the non-aqueous electrolyte solution according to any one of the fifteenth to eighteenth embodiments, the content of imide salt is preferably 0.5 mol or more and 3 mol or less with respect to the non-aqueous solvent of "1 L".

According to the nineteenth embodiment, the content of $LiPO_2F_2$ is preferably 0.05 mass % or more and 1 mass % or less with respect to the non-aqueous electrolyte solution. In addition, the content of cyclic acid anhydride is preferably 0.1 mass % or more and 0.5 mass % or less with respect to the non-aqueous electrolyte solution. In addition, the content of imide salt is preferably 0.5 mol or more and 3 mol or less with respect to the non-aqueous solvent of "1 L".

According to the nineteenth embodiment, similar to the sixteenth embodiment, the imide salt preferably includes at least one selected from a group consisting of $LiN(SO_2F)_2$ and $LiN(SO_2CF_3)_2$, but not limited thereto. Only one or both of these imide salts may be included. Alternatively, any imide salt other than these imide salts may be included. In this case, as described in the eighteenth embodiment, the imide salt is preferably contained with a molarity relationship of "$LiPF_6 \leq$ imide salt". In addition, the content of the imide salt is preferably 0.5 mol or more and 3 mol or less with respect to the non-aqueous solvent of "1 L".

Using the non-aqueous electrolyte solution containing at least one selected from a group consisting of $LiN(SO_2F)_2$ and $LiN(SO_2CF_3)_2$, it is possible to effectively suppress reduction of the ionic conductivity at a low temperature range of −10° C. or −30° C. and obtain excellent low-temperature characteristics.

According to the nineteenth embodiment, a configuration of using $LiPF_6$ and $LiN(SO_2F)_2$ as the lithium salt and using succinic anhydride (SAH) as the cyclic acid anhydride may be proposed.

According to the nineteenth embodiment, it is possible to suppress an increase of resistance during high-temperature heating and obtain low-temperature characteristics.

According to the eighteenth and nineteenth embodiments, it is possible to suppress a resistance increase rate to 400% or lower in a full-charge storage test for 720 hours at a temperature of 60° C. In addition, preferably, it is possible to suppress the resistance increase rate to 300% or lower. More preferably, it is possible to suppress the resistance increase rate to 250% or lower.

In measurement of the resistance increase rate, the resistance increase rate was calculated by obtaining a resistance value before the full-charged storage at a temperature of 60° C. and a resistance value after the full-charge storage test at a temperature of 60° C.

According to this embodiment, the ionic conductivity at a temperature of −10° C. is preferably 10 mS/cm or higher.

More preferably, the ionic conductivity at a temperature of −10° C. is 12 mS/cm or higher, and furthermore preferably, the ionic conductivity at a temperature of −10° C. is 12.5 mS/cm or higher.

The specific composition and application of the nineteenth embodiment are similar to, for example, those of the eighteenth embodiment.

Twentieth Embodiment: Non-Aqueous Electrolyte Solution

According to the twentieth embodiment, in the non-aqueous electrolyte solution of the eighth or ninth embodiment, it is preferable that the non-aqueous solvent contains acetonitrile, and the molar mixing ratio of $PF_6$ anions relative to acetonitrile is 0.01 or higher and lower than 0.08.

As a result, it is possible to more effectively promote the formation reaction of the negative electrode SEI without generating an insoluble component, and more effectively delay generation of gas in the event of overcharge. That is, according to the twentieth embodiment, it is possible to promote the reaction of cyclic acid anhydride by water and delay generation of blister gas in the event of overcharge.

The specific compositions and applications of the twentieth embodiment are similar to, for example, those of the first embodiment.

Twenty First Embodiment: Non-Aqueous Electrolyte Solution

According to the twenty first embodiment, the non-aqueous electrolyte solution of any one of the first to twentieth embodiments preferably further contains cyclic carbonate without no saturated secondary carbon.

A technical change at the time of development of the twenty first embodiment will be described. For example, if the battery using the existing acetonitrile electrolyte solution is used or placed at a temperature of 50 to 60° C. (50° C. or higher and 60° C. or lower), the battery performance is significantly degraded, so that an operation limitation may be reached in some cases. This is because, if acetonitrile is heated in presence of $PF_6$, hydrogen is released from the α-position, and generation of HF is promoted, so that the battery performance is abruptly degraded. In this regard, the inventors developed the present invention in order to reduce the amount of HF generated at a temperature of 50° C. to 60° C. That is, according to the twenty first embodiment, the non-aqueous electrolyte solution does not contain a non-aqueous solvent having saturated secondary carbon.

The inventors have found that, if the non-aqueous solvent contains saturated secondary carbon, protons are easily released, and this tends to promote generation of HF at a temperature of 50 to 60° C. That is, since the non-aqueous electrolyte solution according to this embodiment does not contain the non-aqueous solvent having saturated secondary carbon, it is possible to reduce the amount of HF generated at a temperature of 50° C. to 60° C.

Here, the "saturated secondary carbon" refers to a case where the number of adjacent carbon atoms bonded to a carbon atom is two. In addition, "saturation" means that there is no double or triple bond.

Specific examples of the non-aqueous solvent having the saturated secondary carbon include, for example, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, γ-valerolactone, γ-carprolactone, δ-carprolactone, 2-methyl tetrahydrofuran, and methyl isopropyl carbonate, but not limited thereto.

It was found that generation of HF is suppressed at a temperature of 50 to 60° C. by using the carbonate solvent without saturated secondary carbon as a non-aqueous solvent.

It was found that promote of generation of HF at a temperature of 50 to 60° C. caused by acetonitrile is further suppressed by adding the cyclic carbonate without saturated secondary carbon at a volume ratio higher than that of acetonitrile.

According to another mode of the twenty first embodiment, the non-aqueous electrolyte solution contains a non-aqueous solvent containing acetonitrile and $LiPF_6$, and an increase rate of the generation amount of the hydraulic fluid at 60° C. relative to the generation amount of hydraulic fluid at 25° C. is 165% or lower. In this manner, since it is possible to reduce an increase rate of the generation amount of hydraulic fluid at 60° C. relative to the generation amount of hydraulic fluid at 25° C., it is possible to obtain a non-aqueous secondary battery suitable for outdoor applications in summer or a tropical area without significantly degrading battery performance even when the battery is used or placed outdoor in summer or in the tropical area.

According to the twenty first embodiment, it is preferable that the $LiPF_6$-based acetonitrile electrolyte solution is diluted with a non-aqueous solvent without saturated tertiary carbon. Since protons are easily released from the carbonate having saturated secondary carbon (for example, propylene carbonate), generation of HF tends to be promoted at a temperature of 50 to 60° C. However, if the acetonitrile electrolyte solution is diluted with a non-aqueous solvent without saturated tertiary carbon, it is possible to effectively suppress generation of HF.

The non-aqueous polar solvent without saturated tertiary carbon preferably has a volume larger than that of acetonitrile. If the non-aqueous polar solvent without saturated secondary carbon (for example, ethylene carbonate or vinylene carbonate) is larger than the acetonitrile, it is possible to suppress generation of HF.

As described above, using the non-aqueous electrolyte solution according to the twenty first embodiment, it is possible to suppress generation of HF at a temperature of 50 to 60° C.

Specifically, the composition of the non-aqueous electrolyte solution according to the twenty first embodiment includes, for example, acetonitrile, EC, VC, SAH, and $LiPO_2F_2$. In this case, the positive electrode of the non-aqueous secondary battery preferably includes a layered rock salt type. Meanwhile, there is no particular limitation in the negative electrode, the positive electrode, the separator, and the battery casing.

The non-aqueous secondary battery using the non-aqueous electrolyte solution according to the twenty first embodiment is applicable to general-purpose products, automobiles, and the like. However, in any case, the non-aqueous secondary battery according to the twenty first embodiment is also suitably used for outdoor applications in summer or so-called tropical areas such as the tropical zone or the dry zone. For example, according to this embodiment, the configuration of the prior art may be applicable to the battery casing. That is, even when the battery casing has a configuration similar to that of the prior art, it is possible to obtain a non-aqueous secondary battery suitable for outdoor applications in summer or tropical areas. Therefore, it is possible to appropriately suppress an increase of the manufacturing cost without complicating a manufacturing process.

Twenty Second Embodiment: Non-Aqueous Electrolyte Solution

According to the twenty second embodiment, the cyclic carbonate without saturated secondary carbon in the non-aqueous electrolyte solution of the twenty first embodiment may include, for example, ethylene carbonate, vinylene carbonate, 4,5-dimethyl vinylene carbonate, and fluoroethylene carbonate.

Among them, the cyclic carbonate without saturated secondary carbon is at least one selected from a group consisting of ethylene carbonate and vinylene carbonate.

The specific composition and application of the twenty second embodiment are similar to those of the twenty first embodiment.

Twenty Third Embodiment: Non-Aqueous Electrolyte Solution

According to the twenty third embodiment, the non-aqueous electrolyte solution of the twenty first embodiment contains vinylene carbonate as the cyclic carbonate without saturated secondary carbon, and the amount of vinylene carbonate contained in the non-aqueous electrolyte solution is 4 volume % or less.

The additive is indispensable in order to suppress a reductive decomposition reaction of acetonitrile on the surface of the negative electrode. If the additive is insufficient, battery performance is abruptly degraded. Meanwhile, if the film is excessively formed, this degrades low-temperature performance.

In this regard, according to the twenty third embodiment, by adjusting a dosage of vinylene carbonate as an additive to the aforementioned range, it is possible to suppress an interface (film) resistance to be low and suppress cycle degradation at a low temperature.

According to the twenty third embodiment, the amount of vinylene carbonate is preferably less than 3 volume %. As a result, it is possible to more effectively improve the low temperature durability and provide a secondary battery having excellent low-temperature performance.

According to the twenty third embodiment, it is preferable that the non-aqueous electrolyte solution contains succinic anhydride (SAH), and the amount of the succinic anhydride contained in the non-aqueous electrolyte solution is less than 1 volume %.

Specifically, the composition of the non-aqueous electrolyte solution according to the twenty third embodiment includes, for example, acetonitrile, $LiPF_6$, $LiN(SO_2F)_2$, or $LiN(SO_2CF_3)_2$, SAH (1% or less), $LiPO_2F_2$, and VC (4% or less). In this case, in the non-aqueous secondary battery, there is no particular limitation in the negative electrode, the positive electrode, the separator, and the battery casing.

Twenty Fourth Embodiment: Non-Aqueous Electrolyte Solution

According to the twenty fourth embodiment, the non-aqueous electrolyte solution according to any one of the first to twenty third embodiments has an ionic conductivity of 3 mS/cm or higher at a temperature of −30° C.

A technical change at the time of development of the twenty fourth embodiment will be described. For example, in the battery using the existing electrolyte solution, an operation limitation is reached at a temperature of approximately −20° C. This is because, using the existing electrolyte solution, the ionic conductivity at a temperature of −20° C. is excessively lowered, and it is difficult to obtain an output power necessary for the operation. In this regard, the inventors developed the present invention in order to obtain, at least an ionic conductivity corresponding to that of the existing electrolyte solution at a temperature of −20° C. even at a temperature lower than −20° C. (specifically, −30° C.).

The non-aqueous electrolyte solution according to the twenty fourth embodiment preferably contains a non-aqueous solvent and LiPF$_6$ (lithium salt). In addition, the non-aqueous electrolyte solution according to the twenty fourth embodiment is characterized in that the ionic conductivity at a temperature of −30° C. is equal to or higher than 3 mS/cm.

The existing electrolyte solution containing cyclic carbonate, linear carbonate, and LiPF$_6$ has an ionic conductivity of approximately 2.7 mS/cm at a temperature of −20° C. Therefore, the non-aqueous electrolyte solution according to the twenty fourth embodiment has a −30° C. ionic conductivity equal to or higher than the −20° C. ionic conductivity of the existing electrolyte solution. As a result, even when the non-aqueous secondary battery using the non-aqueous electrolyte solution according to the twenty fourth embodiment is used at a low temperature of −30° C., it is possible to obtain output power equal to or higher than that of the battery using the existing electrolyte solution at a temperature of −20° C. Note that the temperature of −20° C. is a lower limitation of the operation range of the existing LIB. Therefore, it is possible to shift the operation limitation to the lower temperature range, compared to the prior art.

According to this embodiment, the ionic conductivity at a temperature of −30° C. is preferably 3.5 or higher. More preferably, the ionic conductivity at a temperature of −30° C. is 4.0 or higher. In addition, further preferably, the ionic conductivity at a temperature of −30° C. is 4.5 or higher. As a result, it is possible to shift the operation limitation to the lower temperature range, compared to the prior art. Therefore, it is possible to obtain more stable low-temperature characteristics.

According to the twenty fourth embodiment, the non-aqueous electrolyte solution preferably contains acetonitrile as a non-aqueous solvent. That is, the non-aqueous solvent contains acetonitrile as an indispensable component, and may contain acetonitrile alone or any other type of non-aqueous solvents in addition to acetonitrile.

However, in the non-aqueous solvent containing acetonitrile and LiPF$_6$, there is a tradeoff relationship between prevention of association between acetonitrile and LiPF$_6$ and suppression of reduction of the ionic conductivity. That is, if prevention of association between acetonitrile and LiPF$_6$ is promoted, the ionic conductivity decreases. Meanwhile, if suppression of reduction of the ionic conductivity is promoted, an aggregate is easily formed.

In this regard, according to the twenty fourth embodiment, a molar mixing ratio of LiPF$_6$ relative to acetonitrile is adjusted. The molar mixing ratio of LiPF$_6$ relative to acetonitrile is expressed as "B/A" where "A" denotes the number of moles of acetonitrile, and "B" denotes the number of moles of LiPF$_6$.

The molar mixing ratio of LiPF$_6$ relative to acetonitrile predominantly affects the amount of the aggregate. In the twenty fourth embodiment, it is preferable that the content of LiPF$_6$ is 1.5 mol or less relative to the non-aqueous solvent of 1 L, and the molar mixing ratio of LiPF$_6$ relative to acetonitrile is 0.08 or higher and 0.16 or lower. As a result, it is possible to implement a high ionic conductivity.

The non-aqueous solvent preferably contains linear carbonate in addition to acetonitrile. That is, the non-aqueous electrolyte solution contains LiPF$_6$, acetonitrile as a non-aqueous solvent, and linear carbonate. Although there is no limitation in the type of the linear carbonate, for example, the linear carbonate may include diethyl carbonate, ethyl methyl carbonate, dimethyl carbonate, or the like.

According to the twenty fourth embodiment, it is preferable that the non-aqueous electrolyte solution contains LiPF$_6$ and a non-aqueous solvent, the content of LiPF$_6$ is equal to or smaller than 1.5 mol relative to a non-aqueous solvent of 1 L, the non-aqueous solvent contains acetonitrile and linear carbonate, the molar mixing ratio of LiPF$_6$ relative to acetonitrile is 0.08 or higher and 0.4 or lower, and the molar mixing ratio of linear carbonate relative to acetonitrile is 0.3 or higher and 2 or lower. In such a composition range, it is possible to address a tradeoff problem between prevention of association between acetonitrile and LiPF$_6$ (by increasing linear carbonate) and suppression of reduction of the ionic conductivity (by increasing acetonitrile).

Using the non-aqueous electrolyte solution according to the twenty fourth embodiment, it is possible to improve the ionic conductivity in a low temperature range, compared to the prior art. Specifically, the non-aqueous electrolyte solution according to the twenty fourth embodiment has a −30° C. ionic conductivity equal to or higher than the −20° C. ionic conductivity of the existing electrolyte solution. According to the twenty fourth embodiment, it is possible to reduce the amount of the aggregate of PF$_6$ anions coordinated with two or more Li$^+$ atoms appearing at a temperature of −10° C. or lower to be smaller than a particular amount.

Specifically, the composition of the non-aqueous electrolyte solution according to the twenty fourth embodiment includes, for example, acetonitrile, LiPF$_6$, LiN(SO$_2$F)$_2$, LiN(SO$_2$CF$_3$)$_2$, SAH, and LiPO$_2$F$_2$. In this case, in the non-aqueous secondary battery, there is no particular limitation in the negative electrode, the positive electrode, the separator, and the battery casing.

The non-aqueous secondary battery using the non-aqueous electrolyte solution according to the twenty fourth embodiment is applicable to general-purpose products, automobiles, or the like, suitable for a cold region. For example, according to this embodiment, a configuration of the prior art is applicable to the battery casing. That is, it is possible to obtain a non-aqueous secondary battery suitable for a cold region even when the battery casing has a configuration of the prior art. Therefore, it is possible to appropriately suppress an increase of the manufacturing cost without complicating a manufacturing process.

Twenty Fifth Embodiment: Non-Aqueous
Electrolyte Solution

According to the twenty fifth embodiment, the non-aqueous electrolyte solution according to any one of the first to twenty fourth embodiments preferably has an ionic conductivity of 10 mS/cm or higher at a temperature of 0° C.

The 0° C. ionic conductivity is higher than the 20° C. ionic conductivity (8.7 to 9.1 mS/cm) of the existing electrolyte solution. The LiPO$_2$F$_2$ and the cyclic acid anhydride contribute to formation of the SEI capable of responding to a fast reaction of insertion or dissociation of lithium in the solvent under a low temperature.

It is preferable to satisfy a specific ratio of LiPF$_6$/AcN (effect to the aggregate amount) and a specific ratio of linear carbonate/AcN (effect to solubility) at the same time. In the AcN electrolyte solution, it is possible to reduce the amount of the aggregate of $PF_6$ anions coordinated with two or more $Li^+$ atoms appearing at a temperature of $-10°$ C. or lower to be smaller than a particular amount.

It is preferable that the non-aqueous electrolyte solution contains $LiPF_6$ and a non-aqueous solvent, the content of $LiPF_6$ is equal to or smaller than 1.5 mol relative to a non-aqueous solvent of 1 L, the non-aqueous solvent contains acetonitrile and linear carbonate, the molar mixing ratio of $LiPF_6$ relative to acetonitrile is 0.08 or higher and 0.4 or lower, and the molar mixing ratio of linear carbonate relative to acetonitrile is 0.3 or higher and 2 or lower. In such a composition range, it is possible to address a tradeoff problem between prevention of association between acetonitrile and $LiPF_6$ (by increasing linear carbonate) and suppression of reduction of the ionic conductivity at a low-temperature range (by increasing acetonitrile).

Twenty Sixth Embodiment: Non-Aqueous Electrolyte Solution

According to the twenty sixth embodiment, any one of the non-aqueous electrolyte solutions of the first to twenty fifth embodiments preferably has an ionic conductivity of 15 mS/cm or higher at a temperature of 20° C.

It is possible to exhibit high output power performance even when an electrode active material layer having a high volumetric energy density is designed. In addition, the ionic conductivity at a temperature of 20° C. is preferably 20 mS/cm or higher, and more preferably, 25 mS/cm or higher. If the ionic conductivity of the electrolyte solution at a temperature of 20° C. is equal to or higher than 15 mS/cm, lithium ion conduction in the electrode active material layer is sufficiently performed. Therefore, it is possible to perform charging/discharging at a large electric current. In addition, although there is no particular limitation in the upper limit of the ionic conductivity at a temperature of 20° C., the ionic conductivity is preferably 50 mS/cm or lower, more preferably 49 mS/cm or lower, and furthermore preferably 48 mS/cm or lower from the viewpoint of suppressing unexpected battery degradation such as elution or exfoliation of various battery members. Here, the ionic conductivity of the electrolyte solution can be controlled by adjusting, for example, viscosity and/or polarity of the non-aqueous solvent. Specifically, it is possible to control the ionic conductivity of the electrolyte solution to a high value by mixing a low viscosity non-aqueous solvent and a high polarity non-aqueous solvent. Furthermore, it may be possible to control the ionic conductivity of the electrolyte solution to a high value by using a non-aqueous solvent having low viscosity and high polarity. In this manner, according to this embodiment, it is possible to provide a high ionic conductivity at a temperature of 20° C.

Twenty Seventh Embodiment: Non-Aqueous Electrolyte Solution

First, a technical change at the time of development of the twenty seventh embodiment made by the inventors will be described. An electrolyte solution containing acetonitrile as a solvent and $LiPF_6$ as lithium salt exhibits a high ionic conductivity at the room temperature. However, in a low-temperature range equal to or lower than 0° C., a discontinuous change occurs in the ionic conductivity of the electrolyte solution, and the output power of the battery using this electrolyte solution is reduced disadvantageously. Such a phenomenon is a problem unique to the non-aqueous electrolyte solution having a high ionic conductivity, and such a problem has not been known until now. In this regard, the inventors developed the invention in order to stabilize the ionic conductivity even at a low temperature by preparing the type of the lithium salt and the content of the lithium salt in the electrolyte solution. That is, this embodiment has the following characteristic parts.

The non-aqueous electrolyte solution according to the twenty seventh embodiment contains a non-aqueous solvent and lithium salt. In addition, the activation energy for ionic conduction is preferably 15 kJ/mol or lower at a temperature of −20 to 0° C.

The non-aqueous electrolyte solution according to this embodiment has activation energy equal to or smaller than that of the existing electrolyte solution containing $LiPF_6$ and a carbonate solvent preferably at a low-temperature range of 0° C. or lower, and more preferably −10° C. or lower. As a result, it is possible to stabilize the ionic conductivity by suppressing a discontinuous change of the ionic conductivity of the electrolyte solution in a low-temperature range of 0° C. or lower. For this reason, even in a case where the non-aqueous secondary battery using the non-aqueous electrolyte solution according to this embodiment is used at a low temperature equal to or lower than 0° C., and more preferably, −10° C., it is possible to obtain the output power equal to or higher than that of the battery of the existing electrolyte solution at the room temperature. Therefore, it is possible to shift the operation limitation to the lower temperature range, compared to the prior art.

According to this embodiment, the activation energy for ionic conduction is preferably 14.5 kJ/mol or lower at a temperature of −20 to 0° C., and more preferably, 14.0 kJ/mol or lower at a temperature of −20 to 0° C. As a result, it is possible to shift the operation limitation to the lower temperature range and obtain stable low-temperature characteristic, compared to the prior art. Specifically, the composition of the non-aqueous electrolyte solution according to the twenty seventh embodiment includes, for example, acetonitrile, $LiPF_6$, $LiN(SO_2F)_2$, SAH, and $LiPO_2F_2$. In this case, in the non-aqueous secondary battery, there is no particular limitation in the negative electrode, the positive electrode, the separator, and the battery casing.

Twenty Eighth Embodiment: Non-Aqueous Electrolyte Solution

According to a twenty eighth embodiment, in the non-aqueous electrolyte solution of the twenty seventh embodiment, the activation energy for ionic conduction is 15 kJ/mol or lower at a temperature of 0 to 20° C. As a result, it is possible to reduce the activation energy of the electrolyte solution at a low temperature range of 0° C. or lower and maintain the activation energy equal to or lower than that of the existing electrolyte solution even in a temperature range higher than 0° C. Therefore, it is possible to suppress a discontinuous change of the ionic conductivity of the electrolyte solution and stabilize the ionic conductivity across a wide temperature range from the low temperature to the room temperature. For this reason, using the non-aqueous secondary battery using the non-aqueous electrolyte solution according to this embodiment, it is possible to obtain the same output power level even in use at a low temperature or in use at the room temperature range. In addition, the non-aqueous secondary battery can be used without being influenced by the temperature condition.

According to the twenty eighth embodiment, the activation energy for ionic conduction is preferably 14.5 kJ/mol or lower at a temperature of 0 to 20° C., and more preferably, 14.0 kJ/mol or lower at a temperature of 0 to 20° C. As a result, it is possible to shift the operation limitation to the wider temperature range, compared to the prior art.

It is possible to lower the activation energy in a low-temperature range of −10° C. or lower and in a high-temperature range.

The non-aqueous electrolyte solution preferably contains acetonitrile, $LiPO_2F_2$, and imide salt. The $LiPO_2F_2$ suppresses staining of an electrode as the imide salt functions in a low-temperature range.

Twenty Ninth Embodiment

According to the twenty ninth embodiment, the non-aqueous electrolyte solution according to any one of the first to twenty eighth embodiments preferably contains a compound expressed as the following formula (1).
[Chemical Formula 2]

Formula (1)

The Formula (1) of the twenty ninth embodiment corresponds to a minimum unit of a nitrogen-containing cyclic compound expressed in the following thirtieth embodiment.

Specifically, the composition of the non-aqueous electrolyte solution according to the twenty ninth embodiment includes, for example, acetonitrile, $LiPF_6$, $LiN(SO_2F)_2$, $LiN(SO_2CF_3)_2$, SAH, $LiPO_2F_2$, and MBTA. In this case, the positive electrode of the non-aqueous secondary battery preferably includes a layered rock salt type. Meanwhile, there is no particular limitation in the negative electrode, the positive electrode, the separator, and the battery casing.

Thirtieth Embodiment: Non-Aqueous Electrolyte Solution

According to the thirtieth embodiment, the compound of Formula (1) of the non-aqueous electrolyte solution of the twenty ninth embodiment is preferably a nitrogen-containing cyclic compound. Preferably, the nitrogen-containing cyclic compound is a bicyclic nitrogen-containing cyclic compound.

Specifically, the nitrogen-containing cyclic compound preferably includes a nitrogen-containing cyclic compound without steric hindrance around an unshared electron pair. As a specific example, for example, the nitrogen-containing cyclic compound may be expressed as the following Formula (9):

[Chemical Formula 3]

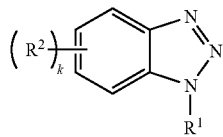

(9)

where "$R^1$" denotes an alkyl group having 1 to 4 carbon atoms, an aryl group, a propargyl group, a phenyl group, a benzyl group, a pyridyl group, an amino group, a pyrrolidylmethyl group, a trimethylsilyl group, a nitrile group, an acetyl group, a trifluoroacetyl group, a chloromethyl group, a methoxymethyl group, an isocyanomethyl group, a methylsulfonyl group, a phenylsulfonyl group, a sulfonyl azide group, a pyridylsulfonyl group, a 2-(trimethylsilyl)etoxycarbonyloxy group, a bis(N,N'-alkyl)aminomethyl group, or a bis(N,N'-alkyl)aminoethyl group, "$R^2$" denotes an alkyl group having 1 to 4 carbon atoms, a fluorine-substituted alkyl group having 1 to 4 carbon atoms, an alkoxy group having 1 to 4 carbon atoms, a fluorine-substituted alkoxy group having 1 to 4 carbon atoms, a nitrile group, a nitro group, an amino group, or halogen atoms, and "k" denotes an integer of 0 to 4.

In the nitrogen-containing organic compound expressed in the aforementioned Formula (9), it is particularly preferable that "$R^1=CH_3$, and $k=0$"

The content of the nitrogen-containing cyclic compound of the electrolyte solution according to the thirtieth embodiment is preferably 0.01 to 10 mass %, more preferably 0.02 to 5 mass %, and furthermore preferably 0.03 to 3 mass %, but not limited thereto, with respect to a total amount of the electrolyte solution. According to this embodiment, the nitrogen-containing cyclic compound forms a robust SEI by when it is used together with an organic lithium salt having an oxalic acid group.

The non-aqueous electrolyte solution preferably contains $LiPO_2F_2$ of 0.005 to 1 mass %, a nitrogen-containing cyclic compound of 0.01 to 1 mass %, and cyclic acid anhydride of 0.01 to 1 mass %. Since the nitrogen-containing cyclic compound is contained, elution of metal derived from the positive-electrode active material is suppressed, and an increase of interface resistance of the positive electrode is suppressed. Therefore, since a certain amount of $LiPO_2F_2$ and cyclic acid anhydride are contained, it is possible to suppress growth of a transition metal precipitated on the negative electrode.

In the twenty ninth and thirtieth embodiments, a specific composition includes 1-methyl-1H-benzotriazole (MBTA). Using the nitrogen-containing cyclic compound without N—H bond, it is possible to prevent hydrogen from being released in a high-temperature cycle and suppress generation of gas.

<Non-Aqueous Solvent>

Here, the non-aqueous solvent will be described. The "non-aqueous solvent" as used in this embodiment refers to an element of the electrolyte solution other than the lithium salt and the additive.

According to this embodiment, while acetonitrile is preferably contained as an essential component, any non-aqueous solvent other than the acetonitrile may also be contained. The non-aqueous solvent other than the acetonitrile may include, for example, alcohols such as methanol or ethanol, an aprotic solvent, or the like. Among them, the aprotic polar solvent is preferable.

Specifically, among the non-aqueous solvents, the aprotic solvent may include, for example, cyclic carbonate such as ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethyl vinylene carbonate, and vinyl ethylene carbonate; fluoroethylene carbonate such as 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one, and 4,4,5-trifluoro-5-methyl-1,3-dioxolan-2-one; lactone such as γ-butyrolactone, γ-valerolactone, γ-caprolactone, δ-valerolactone, δ-caprolactone, and ε-caprolactone; a sulfur compound such as ethylene sulfite, propylene sulfite, butylene sulfite, pentene sulfite, sulfolane, 3-sulfolane, 3-methyl sulfolane, 1,3-propane sultone, 1,4-butane sultone, 1-propene 1,3-sultone, dimethyl sulfoxide, tetramethylene sulfoxide, and ethyleneglycol sulfite; cyclic ethers such as tetrahydrofuran, 2-methyl tetrahydrofuran, 1,4-dioxane, and 1,3-dioxane; linear carbonates such as ethyl methyl carbonate, dimethyl carbonate, diethyl carbonate, methylpropyl carbonate, methyl isopropyl carbonate, dipropyl carbonate, methyl butyl carbonate, dibutyl carbonate, ethyl propylene carbonate, and methyl trifluoroethyl carbonate; linear fluorinated carbonate such as trifluorodimethyl carbonate, trifluorodiethyl carbonate, and trifluoroethyl methyl carbonate; mononitriles such as propionitrile, butyronitrile, valeronitrile, benzonitrile, and acrylonitrile; alkoxy-substituted nitrile such as methoxyacetonitrile and 3-methoxypropionitrile; dinitrile such as malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-dimethylglutaronitrile; cyclic nitrile such as benzonitrile; linear ester such as methyl propionate; linear ether such as dimethoxyethane, diethyl ether, 1,3-dioxolane, diglyme, triglyme, and tetraglyme; fluorinated ether such as $Rf^4$—$OR^5$ (where "$Rf^4$" is a fluorine atom-containing alkyl group and "$R^5$" is an organic group that may contain a fluorine atom); ketone such as acetone, methyl ethyl ketone, and methyl isobutyl ketone; halide such as fluoride thereof, or the like. These materials are used solely or in combination of two or more materials.

Among these and other non-aqueous solvents, at least one selected from a group consisting of cyclic carbonate and linear carbonate is preferably employed. Here, although the cyclic carbonate and the linear carbonate have been exemplified in the aforementioned description, only one of them may be employed, or two or more of them may be employed (for example, two or more of the cyclic carbonates described above, two or more of the linear carbonates described above, or a combination of two or more carbonates selected from one or more cyclic carbonates described above and one or more linear carbonates described above). Among them, the cyclic carbonate more preferably includes ethylene carbonate, propylene carbonate, vinylene carbonate, or fluoroethylene carbonate, and the linear carbonate more preferably includes ethyl methyl carbonate, dimethyl carbonate, or diethyl carbonate.

The acetonitrile is electrochemically susceptible to reductive decomposition. For this reason, it is preferable to perform at least one of a process of mixing the acetonitrile with another solvent or a process of adding an electrode protection additive for forming a protection film on the electrode.

In order to improve an ionization degree of the lithium salt contributing to charging/discharging of the non-aqueous secondary battery, the non-aqueous solvent preferably contains one or more cyclic aprotic polar solvents and more preferably contains one or more cyclic carbonates.

According to this embodiment, it is preferable that the non-aqueous electrolyte solution contains an organic chlorine compound as a chloride adduct of the cyclic carbonate.

Here, according to this embodiment, the cyclic carbonate preferably includes vinylene carbonate (VC), but not limited thereto.

According to this embodiment, the organic chlorine compound preferably includes at least one selected from a group consisting of compounds expressed in the following formulas (4) to (7).

[Chemical Formula 4]

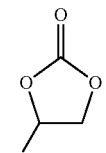

(4)

[Chemical Formula 5]

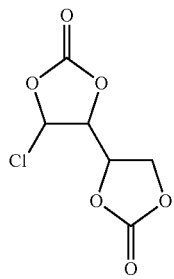

(5)

[Chemical Formula 6]

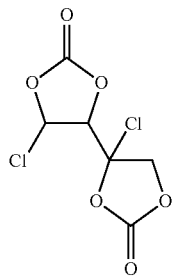

(6)

[Chemical Formula 7]

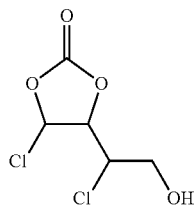

(7)

The organic chlorine compounds expressed in Formulas (4) to (7) may be used alone, or two or more different types of organic chlorine compounds may be used in combination.

Using the chloride adduct derived from vinylene carbonate belonging to a group that is easily reduced among the non-aqueous solvents, the SEI formation reaction reliably proceeds before reductive decomposition of acetonitrile. Therefore, it is possible to further promote reinforcement of the negative electrode SEI and more effectively improve the high-temperature durability of the non-aqueous secondary battery.

Among these and other non-aqueous solvents, it is preferable to use at least one selected from a group consisting of cyclic carbonates and linear carbonates. Here, as the cyclic carbonate and the linear carbonate, only one of those described above may be selected, or two or more of them may be employed in combination (for example, two or more cyclic carbonates described above, two or more linear carbonates described above, or a combination of two or more carbonates selected from one or more cyclic carbonates described above and one or more linear carbonates described above). Among them, the cyclic carbonate more preferably includes ethylene carbonate, propylene carbonate, vinylene carbonate, or fluoroethylene carbonate, and the linear carbonate more preferably includes ethyl methyl carbonate, dimethyl carbonate, or diethyl carbonate.

<Whole Configuration of Non-Aqueous Secondary Battery>

The non-aqueous electrolyte solution according to this embodiment may be used in a non-aqueous secondary battery. In the non-aqueous secondary battery according to this embodiment, there is no particular limitation in the negative electrode, the positive electrode, the separator, and the battery casing.

The non-aqueous secondary battery according to this embodiment may include a lithium ion battery, but not limited thereto, having a positive electrode containing a positive electrode material capable of absorbing and discharging lithium ions as a positive-electrode active material, and a negative electrode containing a negative electrode material capable of absorbing and discharging lithium ions and a negative electrode material including at least one selected from a group consisting of metal lithium as a negative-electrode active material.

Figure 2:
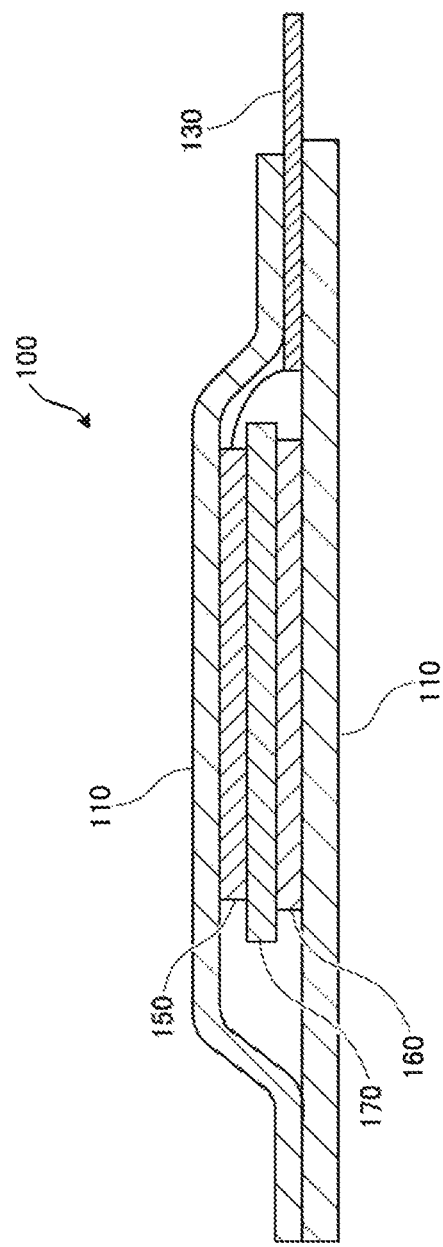
FIG. 2 is a cross-sectional view taken along the line A-A of the non-aqueous secondary battery of FIG. 1.

Specifically, the non-aqueous secondary battery according to this embodiment may be the non-aqueous secondary battery illustrated in FIGS. 1 and 2. Here, FIG. 1 is a plan view schematically illustrating the non-aqueous secondary battery, and FIG. 2 is a cross-sectional view taken along the line A-A of FIG. 1.

The non-aqueous secondary battery 100 of FIGS. 1 and 2 includes pouch type cells. The non-aqueous secondary battery 100 is configured by housing a laminated electrode structure formed by stacking a positive electrode 150 and a negative electrode 160 by interposing a separator 170 and a non-aqueous electrolyte solution (not shown) in a space 120 of a battery casing 110 having a pair of aluminum laminate films. The battery casing 110 is sealed by thermally fusing the upper and lower aluminum laminate films around their outer peripheries. The non-aqueous electrolyte solution is impregnated into the stacking component formed by sequentially stacking the positive electrode 150, the separator 170, and negative electrode 160.

The aluminum laminate film of the battery casing 110 is preferably formed by coating both sides of an aluminum foil with polyolefin-based resin.

The positive electrode 150 is connected to a positive electrode lead body 130 inside the non-aqueous secondary battery 100. Although not shown in the drawings, the negative electrode 160 is also connected to a negative electrode lead body 140 inside the non-aqueous secondary battery 100. In addition, in each of the positive electrode lead body 130 and the negative electrode lead body 140, one end side is exposed to the outside of the battery casing 110 in order to facilitate connection of external devices or the like. Such an ionomer portion is thermally fused together with one side of the battery casing 110.

In the non-aqueous secondary battery 100 illustrated in FIGS. 1 and 2, each of the positive electrode 150 and the negative electrode 160 has a single laminated electrode structure. However, the number of layers in the positive electrode 150 and the negative electrode 160 may appropriately increase depending on capacity design. In a case where each of the positive electrode 150 and the negative electrode 160 is a laminated electrode structure having a plurality of layers, taps of the same polarity are bonded through welding or the like, and they are bonded to one lead body through welding or the like, so that the lead may be extracted to the outside of the battery. As a tap of the same polarity, an exposed portion of the current collector or the like may be used. Alternatively, a metal piece may be welded to the exposed portion of the current collector, or any other type may be employed.

The positive electrode 150 includes a positive-electrode active material layer formed of a positive electrode mixture and a positive electrode current collector. The negative electrode 160 includes a negative-electrode active material layer formed of a negative electrode mixture and a negative electrode current collector. The positive electrode 150 and the negative electrode 160 are arranged such that the positive-electrode active material layer and the negative-electrode active material layer face each other by interposing the separator 170.

Each of these members may be formed by using materials of the lithium ion battery of the prior art, but not limited thereto. Each member of the non-aqueous secondary battery will now be described in details.

<Non-Aqueous Electrolyte Solution>

If the non-aqueous electrolyte solution has the characteristic parts described in each of the aforementioned embodiments, materials used in the non-aqueous electrolyte solution of the lithium ion battery of the prior art may be employed.

The "non-aqueous electrolyte solution" according to this embodiment refers to an electrolyte solution containing water of 1% or less. Preferably, the ratio of water is 300 ppm or less, and more preferably, 200 ppm or less.

The "non-aqueous solvent" has been described above, and will not be described repeatedly.

<Lithium Salt>

The lithium salt used in the non-aqueous electrolyte solution according to this embodiment is not particular limited unless specified otherwise in individual embodiments. For example, according to this embodiment, the lithium salt includes $LiPF_6$ or imide salt.

The imide salt is lithium salt expressed as "$LiN(SO_2C_mF_{2m+1})_2$" (where "m" denotes an integer of 0 to 8). Specifically, as described in the fourth embodiment, the imide salt preferably includes at least one selected from a group consisting of $LiN(SO_2F)_2$ and $LiN(SO_2CF_3)_2$.

The imide salt may include a fluorine-containing inorganic lithium salt other than $LiPF_6$. The imide salt may include a fluorine-containing inorganic lithium salt such as $LiBF_4$, $LiAsF_6$, $Li_2SiF_6$, $LiSbF_6$, and $Li_2B_{12}F_bH_{12-b}$ (where "b" denotes an integer of 0 to 3). The "fluorine-containing inorganic lithium salt" refers to lithium salt that does not contain a carbon atom in the anion but contains a fluorine atom in the anion. The fluorine-containing inorganic lithium salt is excellent in that it forms a passive film on a surface of a metal foil as the positive electrode current collector and suppresses corrosion of the positive electrode current collector. Such a fluorine-containing inorganic lithium salt may be used alone or in combination of two or more. A representative fluorine-containing inorganic lithium salt is $LiPF_6$ which releases the $PF_6$ anions when dissolved.

The content of the fluorine-containing inorganic lithium salt in the non-aqueous electrolyte solution according to this embodiment is not particularly limited, but is preferably 0.1 mol or more, more preferably 0.2 mol or more, and furthermore preferably 0.25 mol or more with respect to the non-aqueous solvent of 1 L. If the content of the fluorine-containing inorganic lithium salt is within the aforementioned range, it is possible to increase the ionic conductivity and exhibit high output power characteristics.

The non-aqueous electrolyte solution according to this embodiment may further contain an organic lithium salt. The "organic lithium salt" refers a lithium salt containing a carbon atom in the anion.

The organic lithium salt may include an organic lithium salt having an oxalic acid group. Specific examples of the organic lithium salt having the oxalic acid group may include, for example, $LiB(C_2O_4)_2$, $LiBF_2(C_2O_4)$, $LiPF_4(C_2O_4)$, or $LiPF_2(C_2O_4)_2$. Among them, the lithium salt preferably includes at least one selected from a group consisting of $LiB(C_2O_4)_2$ and $LiBF_2(C_2O_4)$. In addition, it is more preferable to use one of the organic lithium salts or two or more of the organic lithium salts described above together with the fluorine-containing inorganic lithium salt.

The amount of the organic lithium salt having an oxalic acid group to be added to the non-aqueous electrolyte solution is preferably 0.005 mol or more, more preferably 0.02 mol or more, and furthermore preferably 0.05 mol or more per 1 L of the non-aqueous solvent of the non-aqueous electrolyte solution in order to more reliably guarantee its use effect. However, if the amount of the organic lithium salt having the oxalic acid group in the non-aqueous electrolyte solution described above is excessively large, the lithium salt may be precipitated. Therefore, the amount of the organic lithium salt having the oxalic acid group added to the non-aqueous electrolyte solution described above is preferably less than 0.1 mol, more preferably less than 0.5 mol, and furthermore preferably less than 0.2 mol per 1 L of the non-aqueous solvent of the non-aqueous electrolyte solution.

It is known that the organic lithium salt having the oxalic acid group described above is insoluble in an organic solvent having a low polarity, and particularly linear carbonate. The organic lithium salt having the oxalic acid group contains a small amount of lithium oxalate in some cases. In addition, even when it is mixed as a non-aqueous electrolyte solution, it reacts with a small amount water contained in other source materials, so that white sediments of lithium oxalate are generated initially in some cases. Therefore, the content of the lithium oxalate in the non-aqueous electrolyte solution according to this embodiment is preferably 0 to 500 ppm, but not particularly limited thereto.

As the lithium salt according to this embodiment, any lithium salt typically used in the non-aqueous secondary battery other than those described above may be added as a supplement. A specific example of the other lithium salts may include, for example, an inorganic lithium salt that does not contain a fluorine atom in the anion, such as $LiClO_4$, $LiAlO_4$ $LiAlCl_4$, $LiB_{10}Cl_{10}$, or chloroborane Li; an organic lithium salt such as $LiCF_3SO_3$, $LiCF_3CO_2$, $Li_2C_2F_4(SO_3)_2$, $LiC(CF_3SO_2)_3$, $LiC_nF_{2n+1}SO_3$ (n≥2), low fat carboxylic acid lithium, or tetraphenylboric acid lithium; an organic lithium salt expressed as "$LiPF_n(C_pF_{2p+1})_{6-n}$" (where "n" denotes an integer of 1 to 5, and "p" denotes an integer of 1 to 8), such as $LiPF_5(CF_3)$; an organic lithium salt expressed as "$LiBF_q(CsF_{2s+1})_{4-q}$" (where "q" denotes an integer of 1 to 3, and "s" denotes an integer of 1 to 8), such as $LiBF_3(CF_3)$; a lithium salt bonded to a polyvalent anion; or an organic lithium salt expressed as the following formulas (10a), (10b), and (10c):

$$LiC(SO_2R^6)(SO_2R^7)(SO_2R^8) \qquad (10\text{ a})$$

$$LiN(SO_2OR^9)(SO_2OR^{10} \qquad (10\text{ b})$$

$$LiN(SO_2R^{11})(SO_2OR^{12}) \qquad (10\text{ c})$$

(where the factors $R^6$, $R^7$, $R^8$, $R^9$, $R^{10}$, $R^{11}$, and $R^{12}$ may be the same or different, and denote a perfluoroalkyl group having a carbon number of 1 to 8) and the like. One or more of these materials may be used together with $LiPF_6$.

(Other Optional Additives)

According to this embodiment, the non-aqueous electrolyte solution may appropriately contain an optional additive selected from a group consisting of acid anhydride, sulfonic ester, diphenyl disulfide, cyclohexylbenzene, biphenyl, fluorobenzene, tert-butylbenzene, phosphate ester (such as ethyl diethyl phosphono acetate (EDPA): $(C_2H_5O)_2(P=O)—CH_2(C=O)OC_2H_5$, tris(trifluoroethyl) phosphaste (TFEP): $(CF_3CH_2O)_3P=O$, triphenyl phosphate (TPP): $(C_6H_5O)_3P=O$, triaryl phosphate: $(CH_2=CHCH_2O)_3P=O)$, and any derivative of these compounds. In particular, the aforementioned phosphate ester has an effect of suppressing a side reaction during storage, which is effective.

The non-aqueous electrolyte solution according to this embodiment may include a nitrogen-containing cyclic compound without steric hindrance around an unshared electron pair as described in the twenty fifth embodiment.

<Positive Electrode>

The positive electrode 150 includes a positive-electrode active material layer formed of a positive electrode mixture and a positive electrode current collector. Any electrode may be employed as the positive electrode 150 without a particular limitation, including those known in the art, as long as it can serve as a positive electrode of the non-aqueous secondary battery.

The positive-electrode active material layer contains a positive-electrode active material and optionally further contains a conductive aid and a binder.

The positive-electrode active material layer preferably contains a material capable of absorbing and releasing lithium ions as a positive-electrode active material. The positive-electrode active material layer preferably contains a conductive aid and a binder as necessary in addition to the positive-electrode active material. Using these materials, it is possible to obtain a high voltage and a high energy density, advantageously.

The positive-electrode active material may include a lithium-containing compound expressed as the following formulas (11a) and (11b) and any other lithium-containing compound, $$Li_xMO_2 \qquad (11a)$$

$$Li_yM_2O_4 \qquad (11b)$$

(where "M" denotes one or more metal elements including at least one of transition metal elements, "x" denotes a number of 0 to 1.1, and "y" denotes a number of 0 to 2).

The lithium-containing compound expressed in the formulas (11a) and (11b) may include, for example, lithium cobalt oxide such as $LiCoO_2$, lithium manganese oxide such as $LiMnO_2$, $LiMn_2O_4$, and $Li_2Mn_2O_4$, lithium nickel oxide such as $LiNiO_2$, lithium-containing composite metal oxide such as $Li_zMO_2$ (where "M" contains a transition metal element containing at least one selected from a group consisting of Ni, Mn, and Co, or two or more metal elements selected from a group consisting of Ni, Mn, Co, Al, and Mg, and "z" denotes a number greater than 0.9 and smaller than 1.2), or the like.

The lithium-containing compound other than those of the formulas (11a) and (11b) are not particularly limited as long as it contains lithium. Such a lithium-containing compound may include, for example, a composite oxide containing lithium and a transition metal element, metal chalcogenide having lithium, a phosphate metal compound containing lithium and a transition metal element, or a silicate metal compound containing lithium and a transition metal element (for example, $Li_tM_uSiO_4$ where "M" is defined in Formula (12a), "t" denotes a number of 0 to 1, and "u" denotes a number of 0 to 2). In order to obtain a higher voltage, the lithium-containing compound is preferably a phosphate metal compound or a composite oxide particularly containing lithium and a transition metal element including at least one selected from a group consisting of cobalt (Co), nickel (Ni), manganese (Mn), iron (Fe), copper (Cu), zinc (Zn), chromium (Cr), vanadium (V), and titanium (Ti).

More specifically, the lithium-containing compound preferably includes a composite oxide containing lithium and a transition metal element, metal chalcogenide containing lithium and a transition metal element, or a phosphate metal compound containing lithium. For example, the lithium-containing compound may be expressed by the following Formulas (12a) and (12b):

$$Li_vM^ID_2 \quad (12\,a)$$

$$Li_wM^{II}PO_4 \quad (12\,b)$$

(where "D" denotes an oxygen or charlcogen element, "$M^I$" and "$M^{II}$" denotes one or more transition metal elements, "v" and "w" values are defined by a charging/discharging state of the battery, "v" denotes a number of 0.05 to 1.10, and "w" denotes a number of 0.05 to 1.10).

The lithium-containing compound expressed in the aforementioned Formula (12a) has a layered structure, and the compound expressed in the aforementioned Formula (12b) has an olivine structure. For the purpose of stabilizing a structure or the like, such a lithium-containing compound may be obtained by substituting a part of the transition metal element with Al, Mg, or another transition metal element, inserting such a metal element into a crystalline interface, substituting a part of the oxygen atom with a fluorine atom or the like, coating another positive-electrode active material on at least a part of the surface of the positive-electrode active material, or the like.

The positive-electrode active material according to this embodiment may include only the lithium-containing compound described above, or may additionally include another positive-electrode active material together with the lithium-containing compound.

Such other positive-electrode active materials may include, for example, a metal oxide or metal chalcogenide having a tunnel structure or a layered structure, sulfur, a conductive polymer, or the like. The metal oxide or metal chalcogenide having a tunnel structure or a layered structure may include, for example, oxide, sulfide, selenide, or the like of metal other than lithium, such as $MnO_2$, $FeO_2$, $FeS_2$, $V_2O_5$, $V_6O_{13}$, $TiO_2$, $TiS_2$, $MoS_2$, and $NbSe_2$. The conductive polymer may include, for example, polyaniline, polythiophene, polyacetylene, or polypyrrole.

The other positive-electrode active materials described above may be used alone or in combination of two or more materials without a particular limitation. However, the aforementioned positive-electrode active material layer preferably contains at least one transition metal element selected from a group consisting of Ni, Mn, and Co because it is possible to reversibly and stably absorb and release lithium ions and achieve a high energy density.

In a case where the lithium-containing compound and another positive-electrode active material are used in combination as the positive-electrode active material, a ratio therebetween, that is, a ratio of the lithium-containing compound relative to the whole positive-electrode active material is preferably 80 mass % or more, and more preferably 85 mass % or more.

The conductive aid may include, for example, carbon black such as graphite, acetylene black, and ketjen black, or a carbon fiber. The content of the conductive aid is preferably 10 parts by mass or less, and more preferably 1 to 5 parts by mass with respect to 100 parts by mass of the positive-electrode active material.

The binder may include, for example, polyvinylidene fluoride (PVDF), polytetrafluoroethylene (PTFE), polyacrylic acid, styrene butadiene rubber, or fluororubber. The content of the binder is preferably 6 parts by mass or less, and more preferably 0.5 to 4 parts by mass with respect to 100 parts by mass of the positive-electrode active material.

The positive-electrode active material layer is formed by applying, to the positive electrode current collector, positive electrode mixture-containing slurry obtained by dispersing a positive electrode mixture obtained by mixing the positive-electrode active material, the conductive aid, and the binder as necessary into a solvent, drying it (to remove the solvent), and pressing it as necessary. Such a solvent may include those used in the prior art without a particular limitation. For example, the solvent may include N-methyl-2-pyrrolidone, dimethylformamide, dimethylacetamide, water, or the like.

The positive electrode current collector includes, for example, a metal foil such as an aluminum foil, a nickel foil, and a stainless foil. The positive electrode current collector may have a surface coated with carbon or may be meshed. The thickness of the positive electrode current collector is preferably 5 to 40 μm, more preferably 7 to 35 μm, and furthermore preferably 9 to 30 μm.

<Negative Electrode>

The negative electrode 160 includes a negative-electrode active material layer formed of a negative electrode mixture, and a negative electrode current collector. Any electrode may be employed as the negative electrode 160 without a particular limitation, including those known in the art, as long as it can serve as a negative electrode of a non-aqueous secondary battery.

The negative-electrode active material layer preferably contains a material capable of absorbing lithium ions as a negative-electrode active material at an electric potential lower than 0.4 V vs. $Li/Li^+$ from the viewpoint of increasing the battery voltage. The negative-electrode active material layer preferably contains a conductive aid and a binder, as necessary, together with the negative-electrode active material.

The negative-electrode active material may include, for example, a carbon material such as amorphous carbon (hard carbon), artificial graphite, natural graphite, graphite, pyrolytic carbon, coke, glassy carbon, a sintered product of an organic polymer compound, mesocarbon microbeads, a carbon fiber, activated carbon, graphite, carbon colloid, and carbon black, metal lithium, metal oxide, metal nitride, lithium alloy, tin alloy, silicon alloy, an intermetallic compound, an organic compound, an inorganic compound, a metal complex, an organic polymer compound, or the like.

The negative-electrode active material may be used alone or in combination of two or more materials.

The conductive aid may include, for example, carbon black such as graphite, acetylene black, and ketjen black, or a carbon fiber. The content of the conductive aid is preferably 20 parts by mass or less, and more preferably 0.1 to 10 parts by mass with respect to 100 parts by mass of the negative-electrode active material.

The binder may include, for example, PVDF, PTFE, polyacrylic acid, styrene butadiene rubber, or fluororubber. The content of the binder is preferably 10 parts by mass or less, and more preferably 0.5 to 6 parts by mass with respect to 100 parts by mass of the negative-electrode active material.

The negative-electrode active material layer is formed by applying, to the negative electrode current collector, negative electrode mixture-containing slurry obtained by dispersing a negative electrode mixture obtained by mixing the negative-electrode active material, the conductive aid, and the binder as necessary into a solvent, drying it (to remove the solvent), and pressing it as necessary. Such a solvent may include those used in the prior art without a particular limitation. For example, the solvent may include N-methyl-2-pyrrolidone, dimethylformamide, dimethylacetamide, water, or the like.

The negative electrode current collector includes, for example, a metal foil such as a copper foil, a nickel foil, and a stainless foil. The negative electrode current collector may have a surface coated with carbon or may be meshed. The thickness of the negative electrode current collector is preferably 5 to 40 μm, more preferably 6 to 35 μm, and furthermore preferably 7 to 30 μm.

<Separator>

The non-aqueous secondary battery 100 according to this embodiment preferably has a separator 170 between the positive electrode 150 and the negative electrode 160 in order to prevent short-circuiting between the positive electrode 150 and the negative electrode 160 or giving safety protection such as shutdown. The separator 170 may be those provided in a non-aqueous secondary battery known in the art without a limitation, and is preferably an insulating thin film having high ion permeability and a strong mechanical strength. The separator 170 may include, for example, a woven fabric, a non-woven fabric, a microporous membrane made from a synthetic resin, or the like. Among them, the microporous membrane made from a synthetic resin is preferable.

The microporous membrane made from a synthetic resin may include, for example, a microporous membrane containing polyethylene or polypropylene as a main component, or a polyolefin-based microporous membrane such as a microporous membrane containing both of these polyolefins. The nonwoven fabric may include, for example, a porous membrane formed of glass, ceramic, polyolefin, polyester, polyamide, liquid crystal polyester, and heat-resistant resin such as aramid.

The separator 170 may be formed by stacking a single layer or a plurality of layers of one type of the microporous membrane or may be a stack of two or more microporous membranes. The separator 170 may be formed by stacking a mixed resin material obtained by melting and kneading two or more resin materials in a single layer or a plurality of layers.

<Battery Casing>

A configuration of the battery casing 110 of the non-aqueous secondary battery 100 according to this embodiment may include some battery casing components, such as a battery can and a laminate film package, but not limited thereto. The battery can may include a metal can such as a steel can or an aluminum can. The laminate film package may include, for example, a laminate film having a three-layered structure of hot-melting resin/metal film/resin.

The laminate film package may be used as a package by overlapping a pair of films while directing the hot-melting resin side inward or folding a pair of films to allow the hot-melting resin side to face inward, and thermally sealing both ends. In a case where the laminate film package is employed, the positive electrode lead body 130 (or a positive electrode terminal and a lead tap connected to the positive electrode terminal) may be connected to the positive electrode current collector, and the negative electrode lead body 140 (or a negative electrode terminal and a lead tap connected to the negative electrode terminal) may be connected to the negative electrode current collector. In this case, the laminate film package may be sealed while ends of the positive electrode lead body 130 and the negative electrode lead body 140 (or the lead tap connected to each positive electrode terminal and negative electrode terminal) are exposed to the outside of the package.

<Method of Producing Non-Aqueous Electrolyte Solution>

The non-aqueous electrolyte solution according to this embodiment may be produced by mixing lithium salt, cyclic acid anhydride, and additives described in each embodiment with acetonitrile as a non-aqueous solvent using an arbitrary method. Note that the content of each additive is described in each embodiment.

<Method of Manufacturing Battery>

The non-aqueous secondary battery 100 according to this embodiment is manufactured by using the non-aqueous electrolyte solution described above, the positive electrode 150 having a positive-electrode active material layer formed on one or both sides of the current collector, a negative electrode 160 having a negative-electrode active material layer formed on one or both sides of the current collector, the battery casing 110, and the separator 170 as necessary on the basis of a method known in the art.

First, a stacking component including the positive electrode 150, the negative electrode 160, and the separator 170 as necessary is formed. For example, a winding structure stacking component may be formed by winding a stack of the long positive electrode 150 and the long negative electrode 160 while interposing a long separator between the positive electrode 150 and the negative electrode 160. A layered structure stacking component may be formed by alternately stacking positive electrode sheets and a negative electrode sheets obtained by cutting the positive electrode 150 and the negative electrode 160 to a plurality of sheets having constant areas and shapes while interposing separator sheets. A layered structure stacking component may be formed by folding a long separator in an overlapping manner and alternately inserting the positive electrode sheets and the negative electrode sheets between the separators.

Then, the stacking component described above is housed in the battery casing 110 (battery casing), and the electrolyte solution according to this embodiment is injected into the battery casing. In addition, the stacking component is impregnated into an electrolyte solution, and sealing is performed, so that the non-aqueous secondary battery according to this embodiment can be manufactured.

Alternatively, the non-aqueous secondary battery 100 may be manufactured in the following way. A gel type electrolyte membrane is prepared in advance by impregnating the electrolyte solution into a base material formed of polymer. A layered structure stacking component is formed using the sheet-like positive electrode 150, the sheet-like negative electrode 160, the electrolyte membrane, and the separator 170 as necessary. Then, the stacking component is housed in the battery casing 110.

The shape of the non-aqueous secondary battery 100 according to this embodiment may include, for example, a cylindrical shape, an elliptical shape, a square tube shape, a button shape, a coin shape, a flat shape, a laminate shape, or the like, without a particular limitation. In particular, according to this embodiment, the non-aqueous secondary battery 100 preferably has a laminate shape.

Note that, in a case where the electrode arrangement is designed such that an outer edge of the negative-electrode active material layer and an outer edge of the positive-electrode active material layer are overlapped with each other, or there is a portion where a width of the non-facing part of the negative-electrode active material layer is excessively small, a positional misalignment of the electrode may occur during assembly of the battery, so that the charging/discharging cycle characteristic of the non-aqueous secondary battery may be degraded. Therefore, in the electrode body used in the non-aqueous secondary battery, positions of the electrodes are preferably fixed in advance using a tape such as a polyimide tape, a polyphenylene sulfide tape, and a PP tape, an adhesive, or the like.

Although the non-aqueous secondary battery 100 according to this embodiment can function as a battery through initial charging, it is stabilized as a part of the electrolyte solution is decomposed during the initial charging. Although there is no particular limitation in the method of the initial charging, the initial charging is preferably performed to a capacity of 0.001 to 0.3 C, more preferably 0.002 to 0.25 C, and furthermore preferably 0.003 to 0.2 C. It is also preferable that the initial charging is performed at a constant voltage on the way. A constant current for discharging a design capacity within one hour is set to "1 C". By setting a voltage range in which lithium salt affects an electrochemical reaction to be long, it is possible to achieve an effect of suppressing an increase of internal resistance including the positive electrode 150 by forming the SEI on the electrode surface, and any type of excellent effects to the positive electrode 150, the separator 170, or the like other than the negative electrode 160, without strongly attaching a reaction product only to the negative electrode 160. For this reason, it is very effective to perform the initial charging in consideration of the electrochemical reaction of the lithium salt dissolved in the non-aqueous electrolyte solution.

The non-aqueous secondary battery 100 according to this embodiment may also be used as a cell pack by connecting a plurality of non-aqueous secondary batteries 100 in series or in parallel. From the viewpoint of management of the charging/discharging state of the cell pack, a working voltage range per non-aqueous secondary battery is preferably set to 2 to 5 V, more preferably 2.5 to 5 V, and furthermore preferably 2.75 to 5 V.

Next, preferable embodiments of the non-aqueous secondary battery will be described.

Thirty First Embodiment: Non-Aqueous Secondary Battery

According to the thirty first embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous electrolyte solution contains acetonitrile and $LiPO_2F_2$. In addition, in the non-aqueous secondary battery, a value obtained by dividing a bulk resistance at a temperature of −30° C. in the measurement of electrochemical impedance spectroscopy by an internal resistance value is within a range of 0.05 to 0.7.

In the prior art, in order to guarantee reduction resistance of the acetonitrile electrolyte solution, it is necessary to form a strong film formation agent. For this reason, an interface resistance significantly increases, and low-temperature performance is degraded, disadvantageously.

In the non-aqueous secondary battery according to the thirty first embodiment, an acetonitrile electrolyte solution having a low melting point and a high ionic conductivity is employed. Therefore, an increase of the internal resistance caused by the electrolyte solution is insignificant even under the −30° C. environment. In addition, since $LiPO_2F_2$ and cyclic acid anhydride are received by the film product, a film having a low interface resistance even under a low temperature is provided. Specifically, the non-aqueous electrolyte solution contains acetonitrile and lithium salt, and the value obtained by dividing a bulk resistance at a temperature of −30° C. in the measurement of electrochemical impedance spectroscopy by an internal resistance value is within a range of 0.05 to 0.7.

Using the non-aqueous secondary battery according to the thirty first embodiment, it is possible to perform evaluation in the measurement of electrochemical impedance spectroscopy under the −30° C. environment.

Note that the positive electrode active material may include lithium cobaltate ($LiCoO_2$: LCO), a ternary system positive electrode material $Li(Ni/Co/Mn)O_2$: NCM, or the like.

The non-aqueous electrolyte solution according to the thirty first embodiment contains, for example, acetonitrile, $LiPF_6$, $LiN(SO_2F)_2$, $LiN(SO_2CF_3)_2$, and $LiPO_2F_2$. In addition, in the non-aqueous secondary battery according to the thirty first embodiment, a material of the separator having high porosity is preferably employed. There is no particular limitation in the negative electrode and the battery casing.

The non-aqueous secondary battery according to the thirty first embodiment is particularly suitable for applications in a cold region.

Thirty Second Embodiment: Non-Aqueous Secondary Battery

According to the thirty second embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains a compound containing at least one functional group selected from a group consisting of —N=, —$NH_4$, —N=O, —NH—NH—, and ($NO_3$)—. In addition, in the non-aqueous secondary battery, the value obtained by dividing a bulk resistance at a temperature of −30° C. in the measurement of electrochemical impedance spectroscopy by an internal resistance value is within a range of 0.05 to 0.7.

According to the thirty second embodiment, the inventors achieved the invention in view of a fact that the acetonitrile electrolytic solution generates metal elution derived from the positive-electrode active material, and as a result, the interface resistance increases, so that the high-temperature performance and the low-temperature performance decrease.

According to the thirty second embodiment, as described above, the non-aqueous secondary battery contains a compound containing at least one functional group selected from a group consisting of —N=, —$NH_4$, —N=O, —NH—

NH—, and (NO$_3$)—. As a result, it is possible to suppress an increase of the internal resistance. Specifically, the value obtained by dividing a bulk resistance at a temperature of −30° C. in the measurement of electrochemical impedance spectroscopy by an internal resistance value is within a range of 0.05 to 0.7.

According to the thirty second embodiment, the compound having the aforementioned functional group is preferably contained on a surface portion of the positive electrode of the battery by approximately 0.5 to 20 atomic % as an N-concentration obtained from a result of an XPS analysis described below. As a result, it is possible to effectively suppress metal elution derived from the positive-electrode active material and suppress an increase of the interface resistance of the positive electrode.

According to the thirty second embodiment, the compound having the aforementioned functional group is preferably contained on a surface portion of the positive electrode of the battery by approximately 0.5 to 6.5 atomic % as an N-concentration obtained from a result of an XPS analysis described below, and a thermal history of 40° C. or higher is generated in the event of initial charging. As a result, it is possible to suppress metal elution derived from the positive-electrode active material and improve a cycle life and safety.

The non-aqueous electrolyte solution used in the non-aqueous secondary battery according to the thirty second embodiment preferably contains, for example, acetonitrile, LiPF$_6$, LiN(SO$_2$F)$_2$, LiN(SO$_2$CF$_3$)$_2$, SAH, LiPO$_2$F$_2$, or 1-methyl-1H-benzotriazole (MBTA).

In this case, there is no particular limitation in the negative electrode. Meanwhile, although the positive electrode is not particularly limited, the positive-electrode active material preferably includes a lithium-containing compound having layered rock salt type crystals.

The non-aqueous secondary battery according to the thirty second embodiment preferably employs any one of the non-aqueous electrolyte solutions of the first to thirties embodiments.

There is no particular limitation in the separator and the battery casing.

The non-aqueous secondary battery according to the thirty second embodiment is preferably applicable to in-vehicle applications.

Thirty Third Embodiment: Non-Aqueous Secondary Battery

According to the thirty third embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The negative-electrode active material layer contains at least one compound selected from a group consisting of imide salt and (SO$_4$)$^{2-}$. The imide salt is at least one selected from a group consisting of Li salt and onium salt. In the non-aqueous secondary battery described above, the bulk resistance at a temperature of 25° C. in the measurement of electrochemical impedance spectroscopy is 0.025 ohm or smaller.

As a result, acetonitrile durability improves because a decomposition product derived from the imide salt forms a film on the negative-electrode active material layer. In addition, since the bulk resistance at a temperature of 25° C. is 0.025 ohm or smaller, it is possible to provide high output power and high durability.

According to this embodiment, a film formed of LiPO$_2$F$_2$ and cyclic acid anhydride is preferably provided on a surface of the negative-electrode active material. As a result, it is possible to suppress a resistance increase in a low-temperature range.

The non-aqueous electrolyte solution used in the non-aqueous secondary battery according to the thirty third embodiment preferably contains, for example, acetonitrile, LiN(SO$_2$F)$_2$, LiN(SO$_2$CF$_3$)$_2$, or LiPO$_2$F$_2$.

In this case, the negative electrode preferably has a film derived from imide salt. Meanwhile, there is no particular limitation in the positive electrode, the separator, and the battery casing.

In the non-aqueous secondary battery according to the thirty third embodiment, any one of the non-aqueous electrolyte solutions of the first to thirtieth embodiments is preferably employed.

Thirty Fourth Embodiment: Non-Aqueous Secondary Battery

According to the thirty fourth embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains at least one compound selected from a group consisting of organic acid, salt thereof, acid anhydride, and Li$_2$O. The organic acid includes at least one selected from a group consisting of acetic acid, oxalic acid, and formic acid. In addition, the value obtained by dividing a bulk resistance at a temperature of −30° C. in the measurement of electrochemical impedance spectroscopy by an internal resistance value is within a range of 0.05 to 0.7.

The acetonitrile-based electrolyte solution has a high ionic conductivity with excellent balance between viscosity and relative dielectric constant. However, the durability of the negative electrode SEI is degraded. In this regard, if a large amount of film formation agent is added, the internal resistance increases, and the battery performance is degraded, disadvantageously. The inventors achieved the thirty fourth embodiment of the invention in view of the problems of the prior art described above.

According to the thirty fourth embodiment, the battery contains at least one compound selected from a group consisting of organic acid (such as acetic acid, oxalic acid, and formic acid), salt thereof, acid anhydride, and Li$_2$O. As a result, it is possible to suppress an increase of the internal resistance. Specifically, in the non-aqueous secondary battery, the value obtained by dividing a bulk resistance at a temperature of −30° C. in the measurement of electrochemical impedance spectroscopy by an internal resistance value is within a range of 0.05 to 0.7.

According to the thirty fourth embodiment, the surface portion of the negative electrode of the battery contains at least one compound selected from a group consisting of organic acid (such as acetic acid, oxalic acid, and formic acid), salt thereof, acid anhydride, and Li$_2$O as much as 1 to 35 atomic % as an O-concentration obtained from a result of the XPS analysis described below. As a result, it is possible to form a negative electrode SEI having an excellent ionic conductivity and suppress an increase of the internal resistance of the battery using the acetonitrile electrolytic solution. Therefore, it is possible to effectively improve the cycle performance.

According to the thirty fourth embodiment, the surface portion of the negative electrode of the battery contains at least one compound selected from a group consisting of organic acid (such as acetic acid, oxalic acid, and formic acid), salt thereof, acid anhydride, and $Li_2O$ as much as 10 to 25 atomic % as an O-concentration obtained from a result of the XPS analysis described below. As a result, it is possible to form the SEI having high acetonitrile resistance and reduce the addition amount of vinylene carbonate (VC) in the acetonitrile electrolytic solution. As a result, it is possible to suppress an increase of the internal resistance and effectively improve the output power performance.

The non-aqueous electrolyte solution used in the non-aqueous secondary battery according to the thirty fourth embodiment preferably contains, for example, acetonitrile, $LiPF_6$, $LiN(SO_2F)_2$, $LiN(SO_2CF_3)_2$, SAH, or $LiPO_2F_2$. In addition, in the non-aqueous secondary battery according to the thirty fourth embodiment, any one of the non-aqueous electrolyte solutions of the first to thirtieth embodiments is preferably employed. Furthermore, in the non-aqueous secondary battery, there is no limitation in the positive electrode, the negative electrode, the separator, and the battery casing.

The non-aqueous secondary battery according to the thirty fourth embodiment is suitable for applications in a cold region.

Thirty Fifth Embodiment: Non-Aqueous Secondary Battery

According to the thirty fifth embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains at least one compound selected from a group consisting of imide salt and $(SO_4)^{2-}$ in the negative-electrode active material layer, and the imide salt is at least one selected from a group consisting of Li salt and onium salt. In the non-aqueous secondary battery, the bulk resistance at a temperature of $-30°$ C. in the measurement of electrochemical impedance spectroscopy is 0.07 ohm or smaller.

As a result, a decomposition product derived from the imide salt forms a film on the negative-electrode active material layer to provide a film having a small interface resistance. In addition, since the bulk resistance at a temperature of $-30°$ is equal to or smaller than 0.07 ohm, it is possible to provide a secondary battery having excellent balance between the diffusion reaction and the interface reaction of the lithium ions and high low-temperature performance.

According to this embodiment, it is preferable that a film formed of $LiPO_2F_2$ and cyclic acid anhydride is provided on a surface of the negative-electrode active material. As a result, it is possible to suppress a resistance increase in a low-temperature range.

The non-aqueous electrolyte solution used in the non-aqueous secondary battery according to the thirty fifth embodiment preferably contains, for example, acetonitrile, $LiN(SO_2F)_2$, $LiN(SO_2CF_3)_2$, or $LiPO_2F_2$.

In this case, the negative electrode preferably has a film derived from imide salt. Meanwhile, there is no particular limitation in the positive electrode, the separator, and the battery casing.

In the non-aqueous secondary battery according to the thirty fifth embodiment, any one of the non-aqueous electrolyte solutions of the first to thirtieth embodiments is preferably employed.

Thirty Sixth Embodiment: Non-Aqueous Secondary Battery

According to the thirty sixth embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains a compound containing at least one functional group selected from a group consisting of —N=, —$NH_4$, —N=O, —NH—NH—, and $(NO_3)$—. In addition, the non-aqueous secondary battery has a capacity retention rate of 70% or higher, where the capacity retention rate is calculated by dividing the 5 C discharge capacity by the 1 C discharge capacity after performing a storage test for 4 hours at a temperature of 85° C.

According to the thirty sixth embodiment, as described above, the non-aqueous secondary battery contains a compound containing at least one functional group selected from a group consisting of —N=, —$NH_4$, —N=O, —NH—NH—, and $(NO_3)$—. As a result, it is possible to suppress an increase of the internal resistance. Specifically, the non-aqueous secondary battery has a capacity retention rate of 70% or higher, where the capacity retention rate is calculated by dividing the 5 C discharge capacity by the 1 C discharge capacity. In this manner, using the non-aqueous secondary battery according to the thirty sixth embodiment, it is possible to obtain an excellent rate characteristic.

According to the thirty sixth embodiment, it is preferable that the non-aqueous electrolyte solution contains a nitrogen-containing compound, and the aging is performed at a voltage of 3.5 V or lower during initial charging. Before ionization of the transition metal derived from the positive-electrode active material, the compound containing at least one functional group selected from a group consisting of —N=, —$NH_4$, —N=O, —NH—NH—, and $(NO_3)$— protects the surface of the positive electrode. As a result, it is possible to suppress an increase of internal resistance over time caused by a thermal history.

According to the thirty sixth embodiment, the aging temperature is preferably set to 35° C. or higher and 60° C. or lower. By applying a thermal history at a temperature lower than 60° C., the protective film can inactivate the activation point of the positive electrode surface at an early stage and suppress an increase of internal resistance under a high temperature condition.

The non-aqueous secondary battery according to the thirty sixth embodiment includes a positive electrode having a positive-electrode active material layer formed on one or both sides of a current collector, a negative electrode having a negative-electrode active material layer formed on one or both sides of a current collector, and a non-aqueous electrolyte solution.

The non-aqueous electrolyte solution used in the non-aqueous secondary battery according to the thirty sixth embodiment preferably contains, for example, acetonitrile, $LiPF_6$, $LiN(SO_2F)_2$, $LiN(SO_2CF_3)_2$, SAH, $LiPO_2F_2$, or 1-methyl-1H-benzotriazole (MBTA). In addition, in the non-aqueous secondary battery according to the thirty sixth embodiment, any one of the non-aqueous electrolyte solutions of the first to thirtieth embodiments is preferably employed. In this case, in the non-aqueous secondary battery, there is no particular limitation in the negative electrode, the positive electrode, the separator, and the battery casing.

The thirty sixth embodiment is preferably applicable to a power tool requiring a high rate characteristic with high performance and high output power.

Thirty Seventh Embodiment: Non-Aqueous Secondary Battery

According to the thirty seventh embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains at least one compound selected from a group consisting of organic acid, salt thereof, acid anhydride, and $Li_2O$. In this case, the organic acid includes at least one selected from a group consisting of acetic acid, oxalic acid, and formic acid. In addition, the non-aqueous secondary battery has a capacity retention rate of 70% or higher, where the capacity retention rate is calculated by dividing the 5 C discharge capacity by the 1 C discharge capacity after performing a storage test of 4 hours at a temperature of 85° C.

If the non-aqueous secondary battery is applied to a power tool requiring a high rate characteristic with high performance and high output power, the rate characteristic is reduced as a service time increases because a thermal history of the electrolyte solution is inevitable in this application. In view of such a problem, the invention of the thirty seventh embodiment has been achieved.

According to the thirty seventh embodiment, it is possible to suppress an increase of internal resistance and resist to the thermal history by controlling an aging condition during initial charging.

According to the thirty seventh embodiment, the non-aqueous electrolyte solution contains cyclic acid anhydride, and aging is performed at a voltage of 3.5 V or lower during initial charging. According to thirty seventh embodiment, the negative electrode SEI film contains at least one compound selected from a group consisting of organic acid (such as acetic acid, oxalic acid, and formic acid), salt thereof, acid anhydride, and $Li_2O$. Therefore, it is possible to suppress an increase of internal resistance over time caused by a thermal history.

According to the thirty seventh embodiment, the aging temperature is preferably set to 35° C. or higher and 60° C. or lower. As a result, it is possible to appropriately suppress thermal decomposition of $LiPF_6$ that may occur at a temperature of 60° C. or higher.

The non-aqueous electrolyte solution according to the thirty seventh embodiment preferably contains, for example, acetonitrile, $LiPF_6$, $LiN(SO_2F)_2$, $LiN(SO_2CF_3)_2$, SAH, $LiPO_2F_2$, 1-methyl-1H-benzotriazole (MBTA). In the non-aqueous secondary battery according to the thirty seventh embodiment, any one of the non-aqueous electrolyte solutions of the first to thirtieth embodiments is preferably employed. In this case, there is no particular limitation in the negative electrode, the positive electrode, the separator, and the battery casing.

The thirty seventh embodiment is preferably applicable to a power tool requiring a high rate characteristic with high performance and high output power.

Thirty Eighth Embodiment: Non-Aqueous Secondary Battery

According to the thirty eighth embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains a compound containing at least one functional group selected from a group consisting of —N=, —$NH_4$, —N=O, —NH—NH—, and ($NO_3$)—. In addition, the non-aqueous secondary battery has a 0° C. ionic conductivity of 10 mS/cm or higher after performing a storage test for 4 hours at a temperature of 85° C.

In this manner, in the non-aqueous secondary battery according to the thirty eighth embodiment, it is possible to increase the 0° C. ionic conductivity measured so as to expose the battery to a heat of 85° C. while being charged with 4.2 V and then decreasing the temperature to 0° C., compared to the prior art. In this manner, it is possible to increase resistance to the thermal history. Therefore, it is possible to maintain a high ionic conductivity even when the battery is carried from a high-temperature environment to a low temperature environment. Therefore, even when the battery is used in an application where the thermal history is severe, it is possible to achieve excellent low-temperature characteristics. According to this embodiment, it is possible to operate the battery even at a temperature lower than a limitation temperature of the operation range of the existing electrolyte solution.

According to the thirty eighth embodiment, it is possible to suppress a decomposition product of the nitrogen-containing compound by defining a mixing sequence of the non-aqueous electrolyte solution. The non-aqueous electrolyte solution effectively functions as a protection film formation agent of the positive electrode.

According to the thirty eighth embodiment, a non-aqueous electrolyte solution containing acetonitrile and the nitrogen-containing compound is employed. As a result, it is possible to appropriately form the positive electrode protection film and suppress generation of HF that causes an increase of the internal resistance.

According to the thirty eighth embodiment, a temperature increase at the time of adding the nitrogen-containing compound is preferably suppressed to 50° C. or lower. As a result, it is possible to appropriately suppress thermal decomposition of the nitrogen-containing compound generated at a temperature of 60° C. or higher.

The non-aqueous electrolyte solution according to the thirty eighth embodiment preferably contains acetonitrile, $LiPF_6$, $LiN(SO_2F)_2$, $LiN(SO_2CF_3)_2$, SAH, $LiPO_2F_2$, 1-methyl-1H-benzotriazole (MBTA). In addition, the non-aqueous electrolyte solution according to any one of the first to thirtieth embodiments is preferably employed in the non-aqueous secondary battery according to the thirty eighth embodiment. In this case, there is no particular limitation in the negative electrode, the positive electrode, the separator, and the battery casing.

The non-aqueous secondary battery according to the thirty eighth embodiment is suitable for use as an in-vehicle storage battery compatible with a cold region.

Thirty Ninth Embodiment: Non-Aqueous Secondary Battery

According to the thirty ninth embodiment, the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution. The non-aqueous secondary battery contains at least one compound selected from a group consisting of organic acid, salt thereof, acid anhydride, and $Li_2O$. In addition, the organic acid includes at least one selected from a group consisting of acetic acid, oxalic acid, and formic acid. In addition, the non-aqueous secondary battery has a 0° C. ionic conductivity of 10 mS/cm or higher after performing a storage test for 4 hours at a temperature of 85° C.

The low-temperature characteristic of the non-aqueous secondary battery is disadvantageously degraded as a service time increases in an application where a thermal history of the non-aqueous electrolyte solution is inevitable.

According to the thirty ninth embodiment, it is preferable to determine a mixing sequence of the non-aqueous electrolyte solution. As a result, it is possible to suppress a decomposition product of $LiPF_6$ and improve resistance to the thermal history. According to the thirty ninth embodiment, it is preferable to obtain the non-aqueous electrolyte solution by adding acetonitrile and cyclic acid anhydride and then adding $LiPF_6$. As a result, it is possible to suppress an abrupt temperature increase when adding $LiPF_6$ and suppress generation of HF that may increase the internal resistance due to a sacrificial reaction of the cyclic acid anhydride.

According to the thirty ninth embodiment, it is preferable to suppress a temperature increase caused by adding $LiPF_6$ to 50° C. or lower. As a result, it is possible to suppress thermal decomposition of $LiPF_6$ that may occur at a temperature of 60° C. or higher.

The non-aqueous electrolyte solution according to the thirty ninth embodiment preferably contains, for example, acetonitrile, $LiPF_6$, $LiN(SO_2F)_2$, $LiN(SO_2CF_3)_2$, SAH, $LiPO_2F_2$, or 1-methyl-1H-benzotriazole (MBTA). In addition, the non-aqueous electrolyte solution according to any one of the first to thirtieth embodiments is preferably employed in the non-aqueous secondary battery according to the thirty ninth embodiment. In this case, there is no particular limitation in the negative electrode, the positive electrode, the separator, and the battery casing.

The non-aqueous secondary battery according to the thirty ninth embodiment is preferably applicable to an in-vehicle battery.

Fortieth Embodiment: Non-Aqueous Secondary Battery

According to the fortieth embodiment, in the non-aqueous secondary battery of any one of the thirty first to thirty ninth embodiments, the positive-electrode active material preferably contains a lithium-containing composite metal oxide expressed as "$Li_zMO_2$" where "M" denotes at least one metal element selected from a group consisting of Ni, Mn, Co, Al, and Mg, the content of Ni is more than 50%, and "z" denotes a number greater than 0.9 and smaller than 1.2, from the viewpoint of increasing the energy density of the non-aqueous secondary battery.

According to this embodiment, using the electrolyte solution containing acetonitrile and a nitrogen-containing compound, it is possible to suppress capacity degradation caused by an unstable crystal structure even when the nickel content increases.

According to this embodiment, it is preferable that the charging voltage is 4.3 V or higher in the non-aqueous secondary battery obtained by using the high nickel positive electrode as the positive-electrode active material. As a result, it is possible to set the design capacity to 150 Ah/L or larger.

The non-aqueous electrolyte solution used in the non-aqueous secondary battery according to the fortieth embodiment preferably contains, for example, acetonitrile, $LiPF_6$, $LiN(SO_2F)_2$, $LiN(SO_2CF_3)_2$, SAH, $LiPO_2F_2$, or 1-methyl-1H-benzotriazole (MBTA). In addition, the non-aqueous electrolyte solution according to any one of the first to thirtieth embodiments is preferably employed in the non-aqueous secondary battery according to the fortieth embodiment. In this case, there is no particular limitation in the negative electrode, the positive electrode, the separator, and the battery casing.

Forty First Embodiment: Non-Aqueous Secondary Battery

According to the forty first embodiment, in the non-aqueous secondary battery of the thirty first to fortieth embodiments, an electric potential difference of the negative electrode around injection of the non-aqueous electrolyte solution is preferably 0.3 V or higher.

According to the forty first embodiment, the invention has been made in view of a fact that a metal having a high standard electrode potential is eluted, and safety is degraded if the battery is stored for a long time without performing a charging/discharging test after injection of the electrolyte solution. Here, the standard electrode potential is an electric potential expressed with respect to an electric potential (0 V) of a standard hydrogen electrode.

According to the forty first embodiment, a non-aqueous electrolyte solution containing acetonitrile and lithium salt is employed as the non-aqueous electrolyte solution. According to the forty first embodiment, the negative electrode electric potential of the battery after liquid injection can be lowered to the vicinity of 2.6 V vs. $Li/Li^+$. As a result, it is possible to avoid an electric potential at which the copper current collector is eluted. In the non-aqueous secondary battery known in the prior art, no electric potential difference is generated as long as electricity does not flow. However, in the non-aqueous secondary battery according to this embodiment, an electric potential difference is generated after liquid injection even before electricity conduction, which is very unique. This electric potential difference is presumed as a spontaneous lithium ion insertion reaction to the negative electrode caused by a high ionic conductivity, and is expected to contribute to formation of a dense SEI.

According to the forty first embodiment, the negative electrode contains at least one of metals having a standard electrode potential of 0 V or higher. Since the negative electrode using the existing carbonate electrolyte solution has an electric potential close to 3.1 V vs. $Li/Li^+$ after liquid injection, elution of a metal element having a high standard electrode potential gradually proceeds as it is stored for a long time. Meanwhile, the electrolyte solution using acetonitrile does not cause elution even when it is stored for a long time after liquid injection. Therefore, it is possible to extend a manufacturing control period including the impregnation time.

According to the forty first embodiment, the negative electrode current collector is preferably formed of copper. As a result, it is possible to suppress elution of copper without generating a charging/discharging history.

The non-aqueous electrolyte solution used in the non-aqueous secondary battery according to the forty first embodiment preferably contains, for example, acetonitrile, $LiPF_6$, $LiN(SO_2F)_2$, $LiN(SO_2CF_3)_2$, SAH, $LiPO_2F_2$, or 1-methyl-1H-benzotriazole (MBTA). In addition, the non-aqueous electrolyte solution according to any one of the first to thirtieth embodiments is preferably employed in the non-aqueous secondary battery according to the forty first embodiment. In this case, the negative electrode preferably has a current collector using metal having a standard electrode potential of 0 V or higher. Meanwhile, there is no particular limitation in the positive electrode, the separator, and the battery casing.

Forty Second Embodiment: Non-Aqueous Secondary Battery

According to the forty second embodiment, in the non-aqueous secondary battery of any one of the thirty first to forty first embodiments, a gas generation amount in a storage test for 200 hours at 60° C. is preferably 0.008 ml or smaller per 1 mAh.

Since acetonitrile promotes reductive decomposition at a high temperature, a large amount of gas is generated when it is stored at a high temperature for a long time. According to the forty second embodiment, the non-aqueous electrolyte solution preferably contains acetonitrile, $LiPO_2F_2$, acetic acid, and cyclic acid anhydride. As a result, $LiPO_2F_2$, acetic acid, and cyclic acid anhydride function as reduction resistance, and acetonitrile is reductively decomposed, so that it is possible to suppress gas generation.

According to the forty second embodiment, the non-aqueous secondary battery is preferably a pouch type non-aqueous secondary battery containing acetonitrile, $LiPO_2F_2$, acetic acid, and cyclic acid anhydride. Due to the $LiPO_2F_2$, acetic acid, and cyclic acid anhydride, the SEI is formed on the surface of the negative electrode, and it is possible to suppress reduction of acetonitrile from being promoted at a high temperature.

According to the forty second embodiment, the content of acetic acid is preferably set to 0.1 ppm or more and 5 ppm or less with respect to the non-aqueous electrolyte solution. As a result, it is possible to more effectively set the gas generation amount in the storage test for 200 hours at 60° C. to 0.008 ml or less per 1 mAh.

The non-aqueous electrolyte solution according to the forty second embodiment preferably contains acetonitrile, $LiN(SO_2F)_2$, $LiN(SO_2CF_3)_2$, $LiPO_2F_2$, and acetic acid. In addition, the non-aqueous electrolyte solution of any one of the first to thirtieth embodiments is preferably employed in the non-aqueous secondary battery according to the forty second embodiment. In this case, there is no particular limitation in the negative electrode, the positive electrode, the separator, and the battery casing.

Forty Third Embodiment: Non-Aqueous Secondary Battery

According to the forty third embodiment, in the non-aqueous secondary battery of the thirty first to forty second embodiments, a resistance increase rate in a full-charge storage test for 720 hours at 60° C. is preferably 400% or lower.

According to the forty third embodiment, the invention has been achieved in view of a problem that, in the non-aqueous electrolyte solution containing acetonitrile and $LiPF_6$, acetonitrile and $LiPF_6$ react and are violently decomposed at a high temperature, and a resistance increase rate of the internal resistance significantly increases.

The forty third embodiment is suitable for a storage battery using the non-aqueous secondary battery containing acetonitrile, compatible with a cold region. According to the forty third embodiment, it is possible to suppress an increase of internal resistance during high-temperature heating and obtain excellent low-temperature characteristics.

According to the forty third embodiment, it is preferable that the solvent of the electrolyte solution containing imide salt contains acetonitrile, and the non-aqueous secondary battery is a storage battery containing $LiPO_2F_2$ and cyclic acid anhydride as the additive and compatible with a cold region. As a result, it is possible to suppress an increase of internal resistance during high-temperature heating and obtain excellent low-temperature characteristics.

According to the forty third embodiment, imide salt is preferably contained in a molarity relationship of "$LiPF_6 \leq$ imide salt". Therefore, it is possible to suppress reduction of the ionic conductivity at a low temperature and obtain excellent low-temperature characteristics. The $LiPO_2F_2$ and cyclic acid anhydride suppress an increase of the internal resistance during high-temperature heating. In addition, the imide salt contributes to improvement of the low-temperature characteristics.

According to the forty third embodiment, a non-aqueous electrolyte solution containing acetonitrile and at least one selected from a group consisting of succinic anhydride, maleic anhydride, and phthalic anhydride is preferably employed. As a result, it is possible to suppress an increase of the internal resistance during high-temperature heating and obtain excellent low-temperature characteristics.

The non-aqueous electrolyte solution according to the forty third embodiment preferably contains for example, acetonitrile, $LiPF_6$, $LiN(SO_2F)_2$, $LiN(SO_2CF_3)_2$, SAH, $LiPO_2F_2$, and 1-methyl-1H-benzotriazole (MBTA). In addition, the non-aqueous electrolyte solution of any one of the first to thirtieth embodiments is preferably employed in the non-aqueous secondary battery according to the forty third embodiment. In this case, there is no particular limitation in the negative electrode, the positive electrode, the separator, and the battery casing.

Forty Fourth Embodiment: Cell Pack

A cell pack according to the forty fourth embodiment has the non-aqueous secondary battery of any one of the thirty first to forty third embodiments.

The non-aqueous secondary battery of any one of the thirty first to forty third embodiments has a positive-electrode active material layer containing a lithium-containing compound containing Fe. In addition, the negative-electrode active material layer contains graphite or at least one element selected from a group consisting of Ti, V, Sn, Cr, Mn, Fe, Co, Ni, Zn, Al, Si, and B.

The non-aqueous electrolyte solution contains cyclic carbonate without saturated secondary carbon, and the cyclic carbonate without saturated secondary carbon includes at least one selected from a group consisting of ethylene carbonate and vinylene carbonate.

According to the forty fourth embodiment, the non-aqueous secondary battery is configured by using a single module or connecting two or more modules in parallel, in which the module is obtained by connecting four cells in series, or by connecting four modules in series, in which the module is formed by connecting two or more cells in parallel. In addition, an operation voltage range per cell is within a range of 1.8 to 3.7 V, and an average operation voltage is set to 2.5 to 3.5 V. In addition, each module is mounted with a battery management system (BMS) for diagnosing a battery charge state and an operation state.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. Li/Li$^+$) or higher has been used. However, according to the forty fourth embodiment, since the electrolyte solution containing ethylene carbonate or vinylene carbonate and the positive electrode of iron phosphate lithium (LiFePO$_4$: LFP) and/or the negative electrode of graphite are employed, it is possible to improve a cycle life at a high temperature. The LFP has excellent high-temperature characteristics, compared to other positive electrode materials such as lithium cobaltate (LiCoO$_2$: LCO) or a ternary system positive electrode material (Li(Ni/Co/Mn)O$_2$: NCM). In addition, in a case where an electrolyte solution containing acetonitrile as a main solvent is employed as the lithium ion battery, reductive decomposition proceeds at the negative electrode electric potential of graphite. Therefore, a negative electrode capable of absorbing lithium ions at 0.4 V (vs Li/Li$^+$) or higher is employed. In addition, ethylene carbonate or vinylene carbonate is reductively decomposed on the graphite negative electrode, so as to form a film having excellent high-temperature durability.

According to the forty fourth embodiment, since the operation voltage range per cell is set within a range of 1.8 to 3.7 V, it is possible to substitute an existing four-series 12V lead acid battery. Since a specification of an electric system is defined on the basis of the operation voltage range of the lead acid battery, it is very important to determine the operation voltage range per cell. For this reason, it is preferable to mount the BMS for appropriately managing the voltage.

According to the forty fourth embodiment, the cell preferably contains a non-aqueous electrolyte solution having an −30° C. ionic conductivity of 3 mS/cm or higher. As a result, it is possible to obtain both the high-temperature durability and the low-temperature performance.

The cell pack according to the forty fourth embodiment is suitable for a mobile entity application or a stationary application. The mobile entity application includes a hybrid electric vehicle (HEV), a fork lift, a golf cart, an e-motorcycle, an automated guided vehicle (AGV), a train, a ship, or the like. In addition, the stationary application includes an uninterruptible power supply (UPS) device, an emergency power system, an energy storage system, or the like.

Forty Fifth Embodiment: Hybrid Power System

A hybrid power system according to the forty fifth embodiment includes the cell pack of the forty fourth embodiment, and a module having a secondary battery other than the lithium ion battery or a cell pack in combination.

In this embodiment, a power system is configured by connecting a module and a second secondary battery in parallel, so that energy generated in braking of a traveling vehicle can be efficiently used as regenerative energy by supplementing a lithium ion battery (LIB) capable of receiving a large current with the current flowing through the battery that is not capable of receiving a large current in the event of charging caused by braking of vehicle deceleration or the like. The second secondary battery may include, for example, a lead acid battery, a nickel hydrogen battery, a Ni—Cd battery, an electric double layer capacitor (EDLC), a lithium ion capacitor (LIC), or the like. In addition, the second secondary battery may include a next-generation battery or an innovation battery such as an all-solid battery, a lithium-sulfur battery, a lithium-air battery, a sodium ion battery, a multivalent ion battery based on magnesium ions or calcium ions, or the like. Note that the secondary battery other than the lithium ion battery according to this embodiment is not limited thereto. A power system combined with a generative energy device such as a fuel cell battery or a solar cell battery may also be employed.

According to the forty fourth embodiment, the hybrid power system is preferably a combinational hybrid power system in which the LIB module of the forty fourth embodiment and the secondary battery other than the lead acid battery are combined. Here, the module is formed by connecting a plurality of cells, and the cell pack is formed by connecting a plurality of modules. However, the cell pack is a terminology including the module. In the LIB of the prior art, an organic solvent is used in the electrolyte solution. Therefore, viscosity of the electrolyte solution increases at a low temperature, and the internal resistance significantly increases. As a result, the low-temperature output power of the LIB is reduced, compared to the lead acid battery. Meanwhile, the lead acid battery has low output power at 25° C. but has high output power at −10° C.

In this regard, according to the forty fifth embodiment, a 12V vehicle power system is configured by connecting the LIB module of the forty fourth embodiment to the secondary battery other than the lead acid battery in parallel, and a large current is supplemented to the LIB module of the forty fourth embodiment capable of receiving a large current in the event of charging caused by braking of vehicle deceleration or the like. As a result, it is possible to efficiently use energy generated in the event of braking of a traveling vehicle such as an automobile as regenerative energy.

According to the forty fifth embodiment, iron phosphate lithium (LiFePO$_4$) is used as the positive-electrode active material of the LIB, and graphite is used as the negative-electrode active material, so that the electrolyte solution preferably has a 20° C. ionic conductivity of 18 mS/cm or higher. Since iron phosphate lithium has a lower electron conductivity, compared to NCM or LCO, it has a problem in charging/discharging. For this reason, its advantage may be degraded when it is combined with a secondary battery other than the LIB. In this regard, by using an electrolyte solution having a high ionic conductivity, it is possible to cope with a wide temperature range from a low temperature to a room temperature in the large-current charging/discharging. Therefore, it is possible to extend a service life.

Forty Sixth Embodiment: Cell Pack

A cell pack according to the forty sixth embodiment has the non-aqueous secondary battery of any one of the thirty first to forty third embodiments.

The non-aqueous secondary battery of any one of the thirty first to forty third embodiments has a positive-electrode active material layer containing a lithium-containing compound containing Fe. In addition, the negative-electrode active material layer contains graphite or at least one element selected from a group consisting of Ti, V, Sn, Cr, Mn, Fe, Co, Ni, Zn, Al, Si, and B.

The non-aqueous electrolyte solution contains cyclic carbonate without saturated secondary carbon, and the cyclic carbonate without saturated secondary carbon includes at least one selected from a group consisting of ethylene carbonate and vinylene carbonate.

The non-aqueous secondary battery is configured by the single cell pack or by connecting two or more cell packs in parallel on the basis of the following formulas (2) and (3) that define the number of cells and the number of modules of the non-aqueous secondary battery. Alternatively, the cell pack is configured by connecting modules in which two or more cells are connected in parallel, on the basis of the formulas (2) and (3).

Formula (2)

Number of cells connected in series per module (X): X=2, 4, 8, or 16

Formula (3)

Number of modules connected in series per cell pack (Y): Y=16/X

The operation voltage range per cell is within a range of 1.8 to 3.7 V, the average operation voltage is 2.5 to 3.5 V, and the module is mounted with the BMS. Here, the average operation voltage refers to a voltage when a percentage of the charged electricity amount relative to an electric capacity (state of charge: SOC) is at 50%.

The LFP electrode has a poor electron conductivity, low current emission and acceptance performance, compared to NCM or LCO. Since the in-vehicle battery has an electronic device requiring a large current, the LFP is difficult to apply disadvantageously. However, according to the forty sixth embodiment, since the electrolyte solution containing ethylene carbonate or vinylene carbonate, the LFP positive electrode and/or the graphite negative electrode are employed, it is possible to improve a cycle life at a high temperature. The LFP has excellent high-temperature characteristics, compared to the positive electrode material such as NCM or LCO. In addition, ethylene carbonate or vinylene carbonate is reductively decomposed on the graphite negative electrode, so as to form a film having excellent high-temperature durability.

According to this embodiment, the operation voltage range per cell is preferably within a range of 1.8 to 3.7 V, and the average operation voltage is preferably 2.5 to 3.5 V. In addition, the BMS is preferably mounted on a module or a system, and the cell pack is preferably configured by connecting one or more modules connected in series in parallel. Alternatively, in the non-aqueous secondary battery of any one of the thirty first to forty third embodiments, the cell pack is preferably configured by forming a module by connecting two or more cells in parallel and connecting fourteen to sixteen modules in series. In this manner, by setting the operation voltage range per cell to 1.8 to 3.7 V, the non-aqueous secondary battery can be connected to electric equipment complying with a 48V power standard LV148 (defined in 2011) by connecting sixteen modules in series.

According to the forty sixth embodiment, the cell preferably includes an electrolyte solution containing acetonitrile as a solvent, a separator having high porosity, a member obtained by coating a surface of the positive-electrode active material particle with carbon, a positive electrode mixture layer containing a conductive aid of 5 mass % or more, and a member obtained by coating a surface of a positive electrode charge collecting foil with carbon. In this manner, for the ionic conduction portion, acetonitrile having a high ionic conductivity is added to the electrolyte solution, and a nonwoven fabric having high porosity is used. In addition, for the electron movement portion, a conduction path from the charge collecting foil to a gap between particles is improved using each member. As a result, it is possible to achieve high output power performance.

The cell pack according to the forty sixth embodiment is suitable for a mobile entity application or a stationary application. The mobile entity application includes a hybrid electric vehicle (HEV), a fork lift, a golf cart, an e-motorcycle, an automated guided vehicle (AGV), a train, a ship, or the like. In addition, the stationary application includes an uninterruptible power supply (UPS) device, an emergency power system, or an energy storage system.

Forty Seventh Embodiment: Hybrid Power System

A hybrid power system according to the forty seventh embodiment includes the cell pack of the forty sixth embodiment, and a module or a cell pack having a secondary battery other than the lithium ion battery in combination.

As a result, a 48V power system and a 12V power system are provided in combination, so that, even when one of them is shut down, the other system can supplement it.

According to the forty seventh embodiment, it is preferable that the LIB module of the forty second embodiment and a lead acid battery are combined as a combinational system. As a result, the 48V power system corresponds to the LIB, and the 12V power system corresponds to the battery other than LIB, so that it is possible to obtain a power system having excellent balance between the energy density and the system cost.

According to the forty seventh embodiment, it is preferable that the positive-electrode active material of the LIB is iron phosphate lithium (LiFePO$_4$), the negative-electrode active material of the LIB is graphite, and the electrolyte solution has an 20° C. ionic conductivity of 15 mS/cm or higher. Since the iron phosphate lithium has a lower electron conductivity, compared to NCM or LCO, there may be a problem in charging/discharging, and advantages may be degraded when it is combined with the lead acid battery. Therefore, by using the electrolyte solution having a high ionic conductivity, it is possible to cope with large-current charging/discharging of the lead acid battery in the vicinity of the room temperature and extend the service life until replacement of the battery.

While embodiments of the invention have been described hereinbefore, the invention is not limited by the aforementioned embodiments. Various changes or modifications may be possible without departing from the spirit and scope of the invention.

EXAMPLES

In the following examples and comparative examples, Lithium Battery Grade produced by Kishida Chemical Co., Ltd. was employed as acetonitrile.

Examples of the first to seventh embodiments will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 1. Note that, in Table 1, "AcN" denotes acetonitrile, "DEC" denotes diethyl carbonate, "DMC" denotes dimethyl carbonate, "EMC" denotes ethyl methyl carbonate, "EC" denotes ethylene carbonate, "VC" denotes vinylene carbonate, "PC" denotes propylene carbonate, "LiPF$_6$" denotes lithium hexafluorophosphate, "LiBOB" denotes lithium bis (oxalate) borate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "SAH" denotes succinic anhydride, "MAH" denotes maleic anhydride, "PAH" denotes phthalic anhydride, and "LiPO$_2$F$_2$" denotes lithium difluorophosphate.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

EXAMPLES AND COMPARATIVE EXAMPLES

For the examples and the comparative examples, an electrolyte solution was produced using the composition of Table 1, and the metal lithium foil was immersed using the aforementioned method. Then, it was stored for a day (24 hours) at a temperature of 60° C. After storing for a day (24 hours), the evaluation was performed on the basis of the aforementioned criteria. The result is shown in Table 2.

TABLE 1

| | Solvent | | | | | | | Lithium salt LiPF$_6$ |
|---|---|---|---|---|---|---|---|---|
| | AcN (vol %) | DEC (vol %) | DMC (vol %) | EMC (vol %) | EC (vol %) | VC (vol %) | PC (vol %) | (mol/1 L solvent) |
| Example 1 | 40 | 0 | 0 | 35 | 17 | 8 | 0 | 0.25 |
| Example 2 | 38 | 35 | 0 | 0 | 0 | 6 | 21 | 0.6 |
| Example 3 | 65 | 0 | 6 | 0 | 22 | 7 | 0 | 0.6 |
| Comparative Example 1 | 47 | 42 | 0 | 0 | 0 | 11 | 0 | 1.3 |
| Comparative Example 2 | 20 | 0 | 0 | 42 | 21 | 17 | 0 | 1 |

| | Lithium salt | | | Additive | |
|---|---|---|---|---|---|
| | LiBOB (mol/1 L solvent) | Imide salt Type | Content (mol/1 L solvent) | Cyclic acid anhydride (mass %) | LiPO$_2$F$_2$ (mass %) |
| Example 1 | 0 | LiN(SO$_2$F)$_2$ | 1.75 | SAH 0.2 | 0.1 |
| Example 2 | 0 | LiN(SO$_2$CF$_3$)$_2$ | 0.3 | MAH 0.15 | 0.5 |
| Example 3 | 0 | LiN(SO$_2$CF$_3$)$_2$ | 0.6 | PAH 0.5 | 0.05 |
| Comparative Example 1 | 0.1 | — | — | MAH 0.07 | — |
| Comparative Example 2 | 0 | — | — | — | 0.0005 |

<Lithium Foil Immersion Test>

A metal lithium foil having a thickness of 200 μm with a size of 5 mm by 5 mm was immersed into each electrolyte solution of 5 mL prepared as described above, and it was stored for a day (24 hours) at a temperature of 60° C. After storing for a day (24 hours), the state of the metal lithium foil immersed in each electrolyte solution was observed and evaluated on the basis of the following standard. If deformation of the metal lithium foil is recognized, a mark "x" was given. If the electrolyte solution is transparent without any color, and the metal lithium foil is not deformed, a mark "○" was given.

TABLE 2

| | Lithium foil immersion test (60° C., 24 hours) |
|---|---|
| Example 1 | ○ |
| Example 2 | ○ |
| Example 3 | ○ |
| Comparative Example 1 | x |
| Comparative Example 2 | x |

In Examples 1 to 3, discoloration of the non-aqueous electrolyte solution or deformation of the metal lithium foil were not observed. In comparison, in Comparative Examples 1 and 2, discoloration of the non-aqueous electrolyte solution or deformation of the metal lithium foil were observed. In Examples 1 to 3, it was recognized that the non-aqueous electrolyte solution contains acetonitrile of the non-aqueous solvent, lithium salt, $LiPO_2F_2$, and cyclic acid anhydride. Meanwhile, in the comparative examples, the non-aqueous electrolyte solution does not contain any one of $LiPO_2F_2$ and cyclic acid anhydride. As a result, it was recognized that, in the electrolyte solution containing acetonitrile, $LiPO_2F_2$ and cyclic acid anhydride act to reduction resistance. That is, it was recognized that, due to $LiPO_2F_2$ and cyclic acid anhydride, the SEI is formed on the surface of the metal lithium foil. As a result, it was recognized that, in a case where the electrolyte solution containing $LiPO_2F_2$ and cyclic acid anhydride is used in the non-aqueous secondary battery, the SEI can be formed on the negative electrode. For this reason, it is possible to suppress reduction of the electrolyte solution from being promoted at a high temperature, and suppress generation of gas caused by reductive decomposition of the electrolyte solution.

If $LiPO_2F_2$ and cyclic acid anhydride are contained in the electrolyte solution, the SEI formed on the negative electrode is reinforced. For this reason, when acetonitrile is contained as the non-aqueous solvent, the SEI of the negative electrode is not easily dissolved even under a high-temperature environment, so that it is possible to suppress reductive decomposition of acetonitrile.

Therefore, the lower limit of $LiPO_2F_2$ was set to 0.001 mass % or more, excluding Comparative Example 2, and the upper limit was set to 1 mass % or less on the basis of Example 2. In addition, the lower limit of the cyclic acid anhydride was set to 0.01 mass % or more, and the upper limit was set to 1 mass % or less on the basis of Example 3. By adjusting the contents of $LiPO_2F_2$ and cyclic anhydride, the SEI is further reinforced.

On the basis of the experimental results of the examples and the comparative examples, it was preferable that $PO_2F_2$ anions of 0.001 to 1 mass % and cyclic acid anhydride of 0.01 to 1 mass % are added to the electrolyte solution, and the cyclic acid anhydride includes at least one selected from a group consisting of succinic anhydride (SAH), maleic anhydride (MAH), and phthalic anhydride (PAH).

As a result, it was recognized that the SEI is appropriately formed. In addition, the SEI is further reinforced by further adjusting the contents of $LiPO_2F_2$ and cyclic acid anhydride.

From the experimental result of Example 1, it was preferable that the electrolyte solution contains acetonitrile, and the cyclic acid anhydride includes succinic anhydride.

Examples of the eighth and ninth embodiments will now be described.

<Manufacturing of Non-Aqueous Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm³) as the positive-electrode active material, graphite carbon powder (density: 2.26 g/cm³) having a number average particle diameter of 6.5 μm and acetylene black powder (density: 1.95 g/cm³) having a number average particle diameter of 48 nm as the conductive aid, and polyvinylidene fluoride (PVdF, density: 1.75 g/cm³) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 11.5 mg/cm², and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm³, so that a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm³) having a number average particle diameter of 12.7 μm and graphite carbon powder (density 2.27 g/cm³) having a number average particle diameter of 6.5 μm as the negative-electrode active material, a carboxymethyl cellulose (density: 1.60 g/cm³) solution (solid content concentration: 1.83 mass %) as the binder, and diene-based rubber (glass transition temperature: −5° C., number average particle diameter when dried: 120 nm, density: 1.00 g/cm³, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 6.9 mg/cm², and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.30 g/cm³, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply also referred to as "multi-layered laminate-type battery") was manufactured.

The multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, a battery was manufactured using the method described in the chapter (1-1) to (1-3), and evaluation was performed in the sequence of the chapters (2-1) and (2-2). Finally, the ionic conductivity was calculated at each temperature in the sequence described in the chapter (2-3).

Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) 85° C. Full-Charge Storage Test for Multi-Layered Laminate-Type Battery

For the battery subjected to the initial charging/discharging treatment as described above in the chapter (2-1), the battery was charged with a constant current of "1 C" to a voltage of 4.2 V by setting the battery ambient temperature to 25° C., and the battery was then charged with a constant voltage of 4.2 V for a total of 3 hours. Then, this non-aqueous secondary battery was stored in a thermostatic oven for 4 hours at 85° C. Then, the battery ambient temperature was recovered to 25° C.

(2-3) Ionic Conductivity Measurement

The electrolyte solution was put into a sealed cell (cell size: 24 mm diameter by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to 20° C. and 0° C., respectively, and the measurement was initiated after 1.5 hours from the temperature setting. As the measurement data, data at the time point that a change of the data measured repeatedly at every 5 minutes is lower than 0.1% was employed.

The obtained data was plotted on a Nyquist diagram including real parts Z' and imaginary parts Z" of impedance.

In addition, a Z' value (R) at Z"=0 was read, and the Li ionic conductivity was obtained using the following formula.

$$\text{Li ionic conductivity}(mS/cm)=d/(R\cdot S)$$

Here, "d" denotes a distance between electrodes (0.35 cm), and "S" denotes an area of the electrode (4.522 cm$^2$).

As the ionic conductivity, an initial ionic conductivity of the electrolyte solution and an ionic conductivity of the electrolyte solution collected in the glove box having a dew point controlled to −60° C. or lower after the 85° C. storage test were obtained at 20° C. and 0° C., respectively.

Example 4

Acetonitrile (AcN), ethyl methyl carbonate (EMC), ethylene carbonate (EC), and vinylene carbonate (VC) were mixed under an inert atmosphere at a volume ratio of "45:35:16:4" to obtain a mixed solvent. In addition, succinic anhydride (cyclic acid anhydride) was dissolved in this mixed solvent finally up to 0.15 mass % as an electrolyte solution. In this case, the temperature of the mixed liquid was 30° C. Then, LiPF$_6$ of 0.3 mol, lithium bis (fluorosulfonyl) imide (LiN(SO$_2$CF)$_2$) of 1.3 mol, and LiPO$_2$F$_2$ of 5000 ppm were added per 1 L of the mixed solvent, so that an electrolyte solution of Example 4 was obtained. In this case, the electrolyte solution was produced by receiving only the thermal history of 50° C. or lower. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Example 5

Acetonitrile (AcN), ethyl methyl carbonate (EMC), ethylene carbonate (EC), and vinylene carbonate (VC) were mixed under an inert atmosphere at a volume ratio of "45:35:16:4" to obtain a mixed solvent. In addition, succinic anhydride (cyclic acid anhydride) was dissolved in this mixed solvent finally up to 0.3 mass % as an electrolyte solution. In this case, the temperature of the mixed liquid was 30° C. Then, LiPF$_6$ of 0.4 mol, lithium bis (fluorosulfonyl) imide (LiN(SO$_2$F)$_2$) of 0.7 mol, and LiPO$_2$F$_2$ of 5000 ppm were added per 1 L of the mixed solvent, so that an electrolyte solution of Example 5 was obtained. In this case, the electrolyte solution was produced by receiving only a thermal history of 50° C. or lower. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Example 6

Acetonitrile (AcN), ethyl methyl carbonate (EMC), ethylene carbonate (EC), and vinylene carbonate (VC) were mixed under an inert atmosphere at a volume ratio of "35:40:21:4" to obtain a mixed solvent. In addition, maleic anhydride (cyclic acid anhydride) was dissolved in this mixed solvent finally up to 0.15 mass % as an electrolyte solution. In this case, the temperature of the mixed liquid was 31° C. Then, LiPF$_6$ of 1.0 mol, lithium bis (fluorosulfonyl) imide (LiN(SO$_2$F)$_2$) of 0.2 mol, and LiPO$_2$F$_2$ of 1000 ppm were added per 1 L of the mixed solvent, so that an electrolyte solution of Example 6 was obtained. In this case, the electrolyte solution was produced by receiving only the thermal history of 50° C. or lower. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Example 7

Acetonitrile (AcN), dimethyl carbonate (DMC), ethylene carbonate (EC), and vinylene carbonate (VC) were mixed under an inert atmosphere at a volume ratio of "65:6:22:7" to obtain a mixed solvent. In addition, phthalic anhydride (cyclic acid anhydride) was dissolved in this mixed solvent finally up to 0.5 mass % as an electrolyte solution. In this case, the temperature of the mixed liquid was 29° C. Then, LiPF$_6$ of 0.6 mol, lithium bis (trifluoromethane sulfonyl) imide (LiN(SO$_2$CF$_3$)$_2$) of 0.6 mol, and LiPO$_2$F$_2$ of 500 ppm were added per 1 L of the mixed solvent, so that an electrolyte solution of Example 7 was obtained. In this case, the electrolyte solution was produced by receiving only the thermal history of 50° C. or lower. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Example 8

Acetonitrile (AcN), ethyl methyl carbonate (EMC), dimethyl carbonate (DMC), ethylene carbonate (EC), and vinylene carbonate (VC) were mixed under an inert atmosphere at a volume ratio of "45:15:7:30:3" to obtain a mixed solvent. In addition, succinic anhydride (cyclic acid anhydride) was dissolved in this mixed solvent finally up to 0.2 mass % as an electrolyte solution. In this case, the temperature of the mixed solvent was 31° C. Then, LiPF$_6$ of 0.6 mol, lithium bis (trifluoromethane sulfonyl) imide (LiN(SO$_2$CF$_3$)$_2$) of 0.2 mol, and LiPO$_2$F$_2$ of 100 ppm were added per 1 L of the mixed solvent, so that an electrolyte solution of Example 8 was obtained. In this case, the temperature of the electrolyte solution was 42° C., and the electrolyte solution was produced by receiving only a thermal history of 50° C. or lower. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Comparative Example 3

Acetonitrile (AcN), ethyl methyl carbonate (EMC), ethylene carbonate (EC), and vinylene carbonate (VC) were mixed under an inert atmosphere at a volume ratio of "45:35:16:4" to obtain a mixed solvent. In this case, the temperature of the mixed solvent was 30° C. Then, LiPF$_6$ of 1.3 mol per 1 L of this mixed solvent was put into a container, and the mixed solvent was poured thereon. In addition, succinic anhydride (cyclic acid anhydride) of 0.05 mass % was dissolved, so that an electrolyte solution of Comparative Example 3 was obtained. In this case, the temperature of the electrolyte solution was 63° C., and the electrolyte solution was produced by receiving a thermal history of 50° C. or higher. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Comparative Example 4

Acetonitrile (AcN), diethyl carbonate (DEC), and vinylene carbonate (VC) were mixed under an inert atmosphere at a volume ratio of "47:42:11" to obtain a mixed solvent. In this case, the temperature of the mixed solvent was 30° C. Then, LiPF$_6$ of 2.0 mol per 1 L of this mixed solvent was put into a container, and the mixed solvent was poured thereon, so that an electrolyte solution of Comparative Example 4 was obtained. In this case, the temperature of the electrolyte solution was 68° C., and the electrolyte solution was produced by receiving a thermal history of 50° C. or higher. For the obtained electrolyte solution, it was visually inspected that all of the lithium salts are dissolved. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

Comparative Example 5

Acetonitrile (AcN), diethyl carbonate (DEC), ethylene carbonate (EC), and vinylene carbonate (VC) were mixed under an inert atmosphere at a volume ratio of "43:34:18:5" to obtain a mixed solvent. In this case, the temperature of the mixed solvent was 30° C. Then, LiPF$_6$ of 0.2 mol and lithium bis (trifluoromethane sulfonyl) imide (LiN(SO$_2$CF$_3$)$_2$) of 1.0 mol per 1 L of this mixed solvent was put into a container, and the mixed solvent was poured thereon, so that an electrolyte solution of Comparative Example 5 was obtained. In this case, the temperature of the electrolyte solution was 68° C., and the electrolyte solution was produced by receiving a thermal history of 50° C. or higher. For the obtained electrolyte solution, it was visually inspected that all of the lithium salts are dissolved. Note that cyclic acid anhydride is not added in Comparative Example 2. A battery was manufactured using this electrolyte solution on the basis of the method described above in the chapters (1-1) to (1-3), and evaluation was then performed in the sequence described in the chapters (2-1) and (2-2), so that, finally, the ionic conductivities at each temperature were calculated in the sequence described in the chapter (2-3).

The following Table 3 shows compositions of each non-aqueous electrolyte solution in Examples 4 to 8 and Comparative Examples 3 to 5.

TABLE 3

| | Solvent | | | | | | Lithium salt | | | Additive | | |
| | | | | | | | LiPF$_6$ | Imide salt | | Cyclic | | |
| | AcN (vol %) | DEC (vol %) | EMC (vol %) | DMC (vol %) | EC (vol %) | VC (vol %) | (mol/1 L solvent) | Type | Content (mol/1 L solvent) | acid anhydride (mass %) | LiPO$_2$F$_2$ (ppm) | Thermal history |
|---|---|---|---|---|---|---|---|---|---|---|---|---|
| Example 4 | 45 | 0 | 35 | 0 | 16 | 4 | 0.3 | LiN(SO$_2$F)$_2$ | 1.3 | SAH 0.15 | 5000 | ≤50° C. |
| Example 5 | 45 | 0 | 35 | 0 | 16 | 4 | 0.4 | LiN(SO$_2$F)$_2$ | 0.7 | SAH 0.3 | 5000 | ≤50° C. |
| Example 6 | 35 | 0 | 40 | 0 | 21 | 4 | 1.0 | LiN(SO$_2$F)$_2$ | 0.2 | MAH 0.15 | 1000 | ≤50° C. |
| Example 7 | 65 | 0 | 0 | 6 | 22 | 7 | 0.6 | LiN(SO$_2$CF$_3$)$_2$ | 0.6 | PAH 0.5 | 500 | ≤50° C. |
| Example 8 | 45 | 0 | 15 | 7 | 30 | 3 | 0.6 | LiN(SO$_2$CF$_3$)$_2$ | 0.2 | SAH 0.2 | 100 | ≤50° C. |
| Comparative Example 3 | 45 | 0 | 35 | 0 | 16 | 4 | 1.3 | — | — | SAH 0.05 | — | >60° C. |
| Comparative Example 4 | 47 | 42 | 0 | 0 | 0 | 11 | 2.0 | — | — | — | — | >60° C. |
| Comparative Example 5 | 43 | 34 | 0 | 0 | 18 | 5 | 0.2 | LiN(SO$_2$CF$_3$)$_2$ | 1 | — | — | >60° C. |

The following Table 4 shows the ionic conductivities in Examples 4 to 8 and Comparative Examples 3 to 5.

TABLE 4

| | Initial ion conductivity [mS/cm] | | Ion conductivity after 85° C. storage test [mS/cm] | |
|---|---|---|---|---|
| | 20° C. | 0° C. | 20° C. | 0° C. |
| Example 4 | 21.4 | 16.0 | 20.1 | 14.7 |
| Example 5 | 19.5 | 15.5 | 18.2 | 14.4 |
| Example 6 | 19.0 | 15.5 | 17.9 | 14.0 |
| Example 7 | 20.1 | 15.0 | 19.0 | 13.8 |
| Example 8 | 19.7 | 15.3 | 18.0 | 14.2 |
| Comparative Example 3 | 19.5 | 14.5 | 18.2 | 9.8 |
| Comparative Example 4 | 17.8 | 14.8 | 16.3 | 9.4 |
| Comparative Example 5 | 17.9 | 12.6 | 16.1 | 8.7 |

As shown in Table 4 described above, it was recognized that the initial ionic conductivity does not significantly change even when the temperature changes from 20° C. to 0° C. in Examples 4 to 8 and Comparative Examples 3 and 4, the 0° C. ionic conductivity is approximately 15 mS/cm or higher in Examples 4 to 8, and the 0° C. ionic conductivity is approximately 10 mS/cm or higher in Comparative Examples 3 to 5.

Meanwhile, for the ionic conductivity after the storage test for 4 hours at 85° C., there was a significant difference between Examples 4 to 8 and Comparative Examples 3 to 5. That is, in the examples, the 0° C. ionic conductivity after the storage test for 4 hours at 85° C. was 10 mS/cm or higher. Meanwhile, in the comparative examples, the 0° C. ionic conductivity after the storage test for 4 hours at 85° C. was lower than 10 mS/cm. In the examples, the 0° C. ionic conductivity after the storage test for 4 hours at 85° C. may be set to preferably 12 mS/cm or higher.

As shown in Table 3, the non-aqueous electrolyte solutions of Examples 4 to 8 contain acetonitrile, lithium salts, cyclic acid anhydride, and LiPF$_6$ and are produced with a thermal history of 50° C. or lower.

On the basis of the experimental results of the examples and the comparative examples, it was preferable that the electrolyte solution is preferably obtained by adding acetonitrile and cyclic acid anhydride and then adding LiPF$_6$. As a result, an abrupt temperature increase at the time of adding LiPF$_6$ is suppressed, and the cyclic acid anhydride reacts sacrificially, so that it is possible to suppress generation of HF that may cause an increase of the internal resistance.

On the basis of the examples, it was preferable that a temperature increase at the time of adding the LiPF$_6$ is suppressed to 50° C. or lower. As a result, it is possible to suppress thermal decomposition of LiPF$_6$ generated at 60° C. or higher.

Examples of the tenth to fourteenth embodiments will now be described.

<Evaluation on Low-Temperature Characteristics of Non-aqueous Electrolyte Solution>

(1-1) Measurement of Electrochemical Impedance Spectroscopy

The prepared electrolyte solution was put into a sealed cell (cell size: 24 mm diameter by 0.35 mm thickness) produced by TOYO Corporation, was sealed, and was inserted into a holder (SH1-Z), and wiring was performed. The cell was put into the thermostatic oven, and measurement of electrochemical impedance spectroscopy was performed. Gold was used in the electrode. An argon glove box having a dew point controlled to −60° C. or lower was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature was set to four levels, that is, −30° C., −10° C., 0° C., and 20° C., and the measurement was initiated after 1.5 hours from each temperature setting. As the measurement data, data at the time point that a change of the data measured repeatedly at every 5 minutes is lower than 0.1% was employed.

(1-2) Ionic Conductivity

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity(mS/cm)=$d/(R \cdot S)$

Here, "d" denotes a distance between electrodes (0.35 cm), and "S" denotes an area of the electrode (4.522 cm$^2$).

Example 9

Acetonitrile (AcN), diethyl carbonate (DEC), ethylene carbonate (EC), and vinylene carbonate (VC) were mixed under an inert atmosphere at a volume ratio of "50:28.5:20:1.5". In addition, succinic anhydride (SAH) of 0.4 mass % was dissolved. Furthermore, LiPF$_6$ of 0.4 mol and lithium bis (fluorosulfonyl) imide (LiN(SO$_2$F)$_2$) of 0.9 mol were added per 1 L of this mixed liquid, and LiPO$_2$F$_2$ of 50 ppm was dissolved, so as to obtain an electrolyte solution of Example 9. For the obtained electrolyte solution, it was visually inspected that all of the lithium salts are dissolved. For this electrolyte solution, the ionic conductivities at each temperature were calculated in the sequence described in the chapters (1-1) and (1-2).

Example 10

Acetonitrile (AcN), diethyl carbonate (DEC), ethylene carbonate (EC), and vinylene carbonate (VC) were mixed under an inert atmosphere at a volume ratio of "60:21:15:2". In addition, succinic anhydride (SAH) of 0.14 mass % was dissolved. Furthermore, LiPF$_6$ of 0.6 mol and lithium bis (trifluoromethane sulfonyl) imide (LiN(SO$_2$CF$_3$)$_2$) of 0.6 mol were added per 1 L of this mixed liquid, and LiPO$_2$F$_2$ of 500 ppm and 1-methyl-1H-benzotriazole (MBTA) of 0.5 mass % were dissolved, so as to obtain an electrolyte solution of Example 10. For the obtained electrolyte solution, it was visually inspected that all of the lithium salts are dissolved. For this electrolyte solution, the ionic conductivities at each temperature were calculated in the sequence described in the chapters (1-1) and (1-2).

Example 11

Acetonitrile (AcN), dimethyl carbonate (DMC), ethyl methyl carbonate (EMC), ethylene carbonate (EC), and vinylene carbonate (VC) were mixed under an inert atmosphere at a volume ratio of "40:10:20:28:2". In addition, succinic anhydride (SAH) of 0.2 mass % was dissolved. Furthermore, LiPF$_6$ of 0.3 mol and lithium bis (fluorosulfonyl) imide (LiN(SO$_2$F)$_2$) of 1.0 mol were added per 1 L of this mixed liquid, and LiPO$_2$F$_2$ of 2000 ppm and 1-methyl-1H-benzotriazole (MBTA) of 0.15 mass % were dissolved, so as to obtain an electrolyte solution of Example 11. For the obtained electrolyte solution, it was visually inspected that all of the lithium salts are dissolved. For this electrolyte solution, the ionic conductivities at each temperature were calculated in the sequence described in the chapters (1-1) and (1-2).

Comparative Example 6

Acetonitrile (AcN), diethyl carbonate (DEC), ethylene carbonate (EC), and vinylene carbonate (VC) were mixed under an inert atmosphere at a volume ratio of "8:53:31:8". In addition, succinic anhydride (SAH) of 0.4 mass % was dissolved. Furthermore, LiPF$_6$ of 1.4 mol was added per 1 L of this mixed liquid, and 1-methyl-1H-benzotriazole (MBTA) of 0.01 mass % was dissolved, so as to obtain an electrolyte solution of Comparative Example 6. In Comparative Example 6, LiPO$_2$F$_2$ is not added. For the obtained electrolyte solution, it was visually inspected that all of the lithium salts are dissolved. For this electrolyte solution, the ionic conductivities at each temperature were calculated in the sequence described in the chapters (1-1) and (1-2).

The following Table 5 shows compositions of each non-aqueous electrolyte solution in Examples 9 to 11 and Comparative Example 6.

TABLE 5

| | Solvent | | | | | | Lithium salt | |
|---|---|---|---|---|---|---|---|---|
| | | | | | | | LiPF$_6$ | |
| | AcN (vol %) | DEC (vol %) | EMC (vol %) | DMC (vol %) | EC (vol %) | VC (vol %) | (mol/1 L solvent) | Imide salt Type |
| Example 9 | 50 | 28.5 | 0 | 0 | 20 | 1.5 | 0.4 | LiN(SO$_2$F)$_2$ |
| Example 10 | 60 | 21 | 0 | 0 | 17 | 2 | 0.6 | LiN(SO$_2$CF$_3$)$_2$ |
| Example 11 | 40 | 0 | 10 | 20 | 28 | 2 | 0.3 | LiN(SO$_2$F)$_2$ |
| Comparative Example 6 | 8 | 53 | 0 | 0 | 31 | 8 | 1.4 | — |

| | Lithium salt | Additive | | | Linear |
|---|---|---|---|---|---|
| | Imide salt Content (mol/1 L solvent) | Cyclic acid anhydride (mass %) | LiPO$_2$F$_2$ (ppm) | Nitrogen-containing compound (mass %) | carbonate/AcN (molar ratio) |
| Example 9 | 0.9 | SAH 0.4 | 50 | — | 0.25 |
| Example 10 | 0.6 | SAH 0.14 | 500 | MBTA 0.5 | 0.15 |

TABLE 5-continued

| | | | | | | |
|---|---|---|---|---|---|---|
| Example 11 | 1.0 | SAH 0.2 | 2000 | MBTA 0.15 | 0.44 |
| Comparative Example 6 | — | SAH 0.4 | — | MBTA 0.01 | 2.87 |

The following Table 6 shows the ionic conductivities in Examples 9 to 11 and Comparative Example 6.

TABLE 6

| | Ion conductivity [mS/cm] | | | |
|---|---|---|---|---|
| | 20° C. | 0° C. | −10° C. | −30° C. |
| Example 9 | 21.9 | 15.5 | 12.5 | 7.1 |
| Example 10 | 11.8 | 8.7 | 7.2 | 3.1 |
| Example 11 | 20.6 | 14.8 | 11.9 | 6.5 |
| Comparative Example 6 | 12.6 | 7.8 | 4.3 | 1.3 |

As shown in Table 6 described above, it was recognized that the −10° C. ionic conductivity is 7 mS/cm or higher in Examples 9 to 11. In addition, it was recognized that the −30° C. ionic conductivity is 3 mS/cm or higher in Examples 9 to 11. Meanwhile, it was recognized that, in Comparative Example 6, the −10° C. ionic conductivity is 5 mS/cm or lower, and the −30° C. ionic conductivity is 2 mS/cm or lower.

On the basis of this experiment, it was preferable that the non-aqueous electrolyte solution preferably contains $LiPF_6$ as lithium salt, lithium bis (fluorosulfonyl) imide ($LiN(SO_2F)_2$) or lithium bis (trifluoromethane sulfonyl) imide ($LiN(SO_2CF_3)_2$) as imide salt, acetonitrile as a solvent, and cyclic acid anhydride and $LiPO_2F_2$ as an additive. In addition, it was preferable that a ratio of acetonitrile relative to linear carbonate is 0.15% or higher and 2% or lower. As a result, it is possible to maintain a high ionic conductivity even at a low temperature.

On the basis of the experimental results of the examples and the comparative examples, it was preferable that the non-aqueous electrolyte solution contains the additives of a total mass of less than 5%. Here, the "additive" includes those generally used as a protection film formation agent such as VC, MAH, SAH, PAH, and ES. As a result, the interface (film) resistance is suppressed to be low, so that it is possible to suppress cycle degradation at a low temperature.

On the basis of the experimental results of Examples 9 to 11, it was preferable that the non-aqueous electrolyte solution contains $LiPO_2F_2$ of 0.005 to 1 mass %, and the amount of vinylene carbonate is 4% or less. By setting the amount of $LiPO_2F_2$ and the amount of vinylene carbonate to a predetermined range, it is possible to provide a secondary battery having excellent high-temperature durability and excellent low-temperature performance.

Examples of the fifteenth to twentieth embodiments will now be described.

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture.

N-methyl-2-pyrrolidone as a solvent was added to the obtained positive electrode mixture until a solid content of 68 mass %, and they were further mixed to prepare positive electrode mixture-containing slurry.

This positive electrode mixture-containing slurry was coated on one surface of an aluminum foil having a thickness of 20 μm and a width of 200 mm, which will serve as a positive electrode current collector, using a doctor blade method while adjusting the basis weight to 24.0 mg/cm$^2$, and the solvent was dried and removed. Then, roll pressing was performed using a roll press machine to an actual electrode density of 2.90 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture.

Water as a solvent was added to the obtained negative electrode mixture until a solid content of 45 mass %, and they were further mixed to prepare negative electrode mixture-containing slurry.

This negative electrode mixture-containing slurry was coated on one surface of a copper foil having a thickness of 10 μm and a width of 200 mm, which will serve as a negative electrode current collector, using a doctor blade method while adjusting the basis weight to 10.6 mg/cm$^2$, and the solvent was dried and removed. Then, roll pressing was performed using a roll press machine to an actual electrode density of 1.50 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, glass fiber filter paper (glass fiber filtering sheet, GA-100 produced by Advantech Co., Ltd.) punched in a disk shape having a diameter of 16 mm was set thereon, and an electrolyte solution was injected by 150 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation on High-Temperature Characteristic of Coin Type Non-Aqueous Secondary Battery>

For the battery for evaluation obtained as described above, first, initial charging treatment was performed in the sequence of the following chapter (2-1). Then, each battery was evaluated in the sequence of the chapter (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current (2-1) Initial Charging/Discharging Treatment for Coin Type Non-Aqueous Secondary Battery The battery was charged with a constant current of 0.6 mA corresponding to "0.1 C" to a voltage of 4.2 V by setting the battery ambient temperature to 25° C., and was then charged with a constant voltage of 4.2 V for a total of 15 hours. Then, the battery was discharged to a voltage of 3.0 V with a constant current of 1.8 mA corresponding to "0.3 C". Initial efficiency was calculated by dividing the discharge capacity at this time by the charge capacity.

(2-2) 60° C. Full-Charge Storage Test of Coin Type Non-Aqueous Secondary Battery For the battery subjected to the initial charging/discharging treatment as described above in the chapter (2-1), the battery was charged with a constant current of 6 mA corresponding to "1 C" to a voltage of 4.2 V by setting the battery ambient temperature to 25° C., and was then charged with a constant voltage of 4.2 V for a total of 3 hours. Then, this non-aqueous secondary battery was stored in a thermostatic oven having a temperature of 60° C. for 720 hours. Then, the battery ambient temperature was recovered to 25° C.

(2-3) Measurement of Electrochemical Impedance Spectroscopy

The measurement of electrochemical impedance spectroscopy was performed using a frequency response analyzer 1400 (model name) produced by AMETEK, Inc. and potentio-galvanostat 1470E (model name) produced by AMETEK, Inc. An A.C. impedance value at 1 kHz was obtained by measuring impedance from a voltage/current response signal by applying an AC signal while changing the frequency 1000 kHz to 0.01 Hz. An amplitude of the applied AC voltage was set to "±5 mV". Furthermore, the battery ambient temperature at the time of measurement of electrochemical impedance spectroscopy was set to 25° C.

As a non-aqueous secondary battery to be measured, a coin type non-aqueous secondary battery not subjected to the 60° C. full-charge storage test and a coin type non-aqueous secondary battery subjected to the 60° C. full-charge storage test were employed using the method described above in the chapter (2-2).

The following resistance increase rates were calculated from such results.

Resistance increase rate=(resistance value after 60° C. full-charge storage test/resistance value before 60° C. full-charge storage test)×100[%]

<Evaluation on Low-temperature Characteristics of Non-aqueous Electrolyte Solution>

(3-1) Cell Assembly and Measurement of Electrochemical Impedance Spectroscopy

The electrolyte solution prepared as described above was put into a sealed cell (cell size: 24 mm diameter by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature was set to four levels, that is, −30° C., −10° C., 0° C., and 20° C., and the measurement was initiated after 1.5 hours from each temperature setting. As the measurement data, data at the time point that a change of the data measured repeatedly at every 5 minutes is lower than 0.1% was employed.

(3-2) Ionic Conductivity

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity(mS/cm)=$d/(R \cdot S)$

Here, "d" denotes a distance between electrodes (0.35 cm), and "S" denotes an area of the electrode (4.522 cm$^2$).

Example 12

Acetonitrile (AcN), diethyl carbonate (DEC), ethylene carbonate (EC), and vinylene carbonate (VC) were mixed under an inert atmosphere at a volume ratio of "50:35:10:5". In addition, maleic anhydride (MAH) of 0.2 mass % was dissolved. Furthermore, LiPF$_6$ of 0.3 mol and lithium bis (fluorosulfonyl) imide (LiN(SO$_2$F)$_2$) of 1.7 mol were added per 1 L of this mixed liquid, and LiPO$_2$F$_2$ of 0.8 mass % (8000 ppm) was dissolved, so as to obtain an electrolyte solution of Example 15. For the obtained electrolyte solution, it was visually inspected that all of the lithium salts are dissolved. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Example 13

Acetonitrile (AcN), dimethyl carbonate (DMC), ethylene carbonate (EC), and vinylene carbonate (VC) were mixed under an inert atmosphere at a volume ratio of "65:6:22:7". In addition, phthalic anhydride (PAH) of 0.5 mass % was dissolved. Furthermore, LiPF$_6$ of 0.5 mol and lithium bis (fluorosulfonyl) imide (LiN(SO$_2$F)$_2$) of 0.7 mol were added per 1 L of this mixed solvent, and LiPO$_2$F$_2$ of 0.1 mass %

(1000 ppm) was dissolved, so that an electrolyte solution of Example 13 was obtained. For the obtained electrolyte solution, it was visually inspected that all of the lithium salts are dissolved. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Example 14

Acetonitrile (AcN), dimethyl carbonate (DMC), ethyl methyl carbonate (EMC), ethylene carbonate (EC), and vinylene carbonate (VC) were mixed under an inert atmosphere at a volume ratio of "40:10:19:29:2". In addition, succinic anhydride (SAH) of 0.2 mass % was dissolved. Furthermore, $LiPF_6$ of 0.4 mol and lithium bis (fluorosulfonyl) imide ($LiN(SO_2F)_2$) of 0.8 mol were added per 1 L of this mixed solvent, and $LiPO_2F_2$ of 0.1 mass % (1000 ppm) was dissolved, so that an electrolyte solution of Example 14 was obtained. For the obtained electrolyte solution, it was visually inspected that all of the lithium salts are dissolved. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Example 15

Acetonitrile (AcN), ethyl methyl carbonate (EMC), ethylene carbonate (EC), and vinylene carbonate (VC) were mixed under an inert atmosphere at a volume ratio of "45:35:16:4". In addition, succinic anhydride (SAH) of 0.15 mass % was dissolved. Furthermore, $LiPF_6$ of 0.3 mol and lithium bis (fluorosulfonyl) imide ($LiN(SO_2F)_2$) of 1.3 mol were added per 1 L of this mixed solvent, and $LiPO_2F_2$ of 0.1 mass % (1000 ppm) was dissolved, so that an electrolyte solution of Example 15 was obtained. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Example 16

Acetonitrile (AcN), diethyl carbonate (DEC), ethylene carbonate (EC), and vinylene carbonate (VC) were mixed under an inert atmosphere at a volume ratio of "50:35:10:5". In addition, maleic anhydride (MAH) of 0.2 mass % was dissolved. Furthermore, $LiPF_6$ of 0.3 mol and lithium bis (fluorosulfonyl) imide ($LiN(SO_2F)_2$) of 1.0 mol were added per 1 L of the mixed solvent, and $LiPO_2F_2$ of 0.5 mass % (5000 ppm) was dissolved, so that an electrolyte solution of Example 16 was obtained. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Comparative Example 7

Acetonitrile (AcN), dimethyl carbonate (DMC), ethylene carbonate (EC), and vinylene carbonate (VC) were mixed under an inert atmosphere at a volume ratio of "46:26:26:2". In addition, $LiPF_6$ of 1.0 mol was added per 1 L of the mixed solvent, so that an electrolyte solution of Comparative Example 7 was obtained. In Comparative Example 7, both $LiPO_2F_2$ and cyclic acid anhydride are not added. For the obtained electrolyte solution, it was visually inspected that all of the lithium salts are dissolved. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Comparative Example 8

Acetonitrile (AcN), diethyl carbonate (DEC), and vinylene carbonate (VC) were mixed under an inert atmosphere at a volume ratio of "47:42:11". In addition, maleic anhydride (MAH) of 0.05 mass % was dissolved. Furthermore, $LiPF_6$ of 1.3 mol and lithium bis (trifluoromethane sulfonyl) imide ($LiN(SO_2CF_3)_2$) of 1.0 mol were added per 1 L of the mixed solvent, so that an electrolyte solution of Comparative Example 8 was obtained. In Comparative Example 8, $LiPO_2F_2$ is not added. For the obtained electrolyte solution, it was visually inspected that all of the lithium salts are dissolved. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

Comparative Example 9

Lithium bis (fluorosulfonyl) imide ($LiN(SO_2F)_2$) of 4.2 mol was dissolved to the acetonitrile (AcN) of 1 L under an inert atmosphere to obtain an electrolyte solution of Comparative Example 9. In Comparative Example 9, all of $LiPF_6$, $LiPO_2F_2$, and cyclic acid anhydride are not added. For the obtained electrolyte solution, it was visually inspected that all of the lithium salts are dissolved. A battery was manufactured using this electrolyte solution on the basis of the method described above in the chapters (1-1) to (1-3), and evaluation for the coin type non-aqueous secondary battery was then performed in the sequence described in the chapters (2-1) to (2-3), so that the ionic conductivities at each temperature were calculated in the sequence described in the chapters (3-1) and (3-2).

The following Table 7 shows compositions of each non-aqueous electrolyte solutions in Examples 12 to 16 and Comparative Examples 7 to 9.

TABLE 7

| | Solvent | | | | | | Lithium salt LiPF$_6$ (mol/1 L solvent) |
|---|---|---|---|---|---|---|---|
| | AcN (vol %) | DEC (vol %) | DMC (vol %) | EMC (vol %) | EC (vol %) | VC (vol %) | |
| Example 12 | 50 | 35 | 0 | 0 | 10 | 5 | 0.3 |
| Example 13 | 65 | 0 | 6 | 0 | 22 | 7 | 0.5 |
| Example 14 | 40 | 0 | 10 | 19 | 29 | 2 | 0.4 |
| Example 15 | 45 | 0 | 0 | 35 | 16 | 4 | 0.3 |
| Example 16 | 50 | 35 | 0 | 0 | 10 | 5 | 0.3 |
| Comparative Example 7 | 46 | 0 | 26 | 0 | 26 | 2 | 1.0 |
| Comparative Example 8 | 47 | 42 | 0 | 0 | 0 | 11 | 1.3 |
| Comparative Example 9 | 100 | 0 | 0 | 0 | 0 | 0 | 0 |

| | Lithium salt Imide salt | | Additive | | | Linear | |
|---|---|---|---|---|---|---|---|
| | Type | Content (mol/1 L solvent) | Cyclic acid anhydride (mass %) | LiPO$_2$F$_2$ (ppm) | LiPF$_6$/ AcN (molar ratio) | carbonate/ AcN (molar ratio) | |
| Example 12 | LiN(SO$_2$F)$_2$ | 1.7 | MAH 0.2 | 8000 | 0.03 | 0.30 | |
| Example 13 | LiN(SO$_2$F)$_2$ | 0.7 | PAH 0.5 | 1000 | 0.04 | 0.06 | |
| Example 14 | LiN(SO$_2$F)$_2$ | 0.8 | SAH 0.2 | 1000 | 0.05 | 0.40 | |
| Example 15 | LiN(SO$_2$F)$_2$ | 1.3 | SAH 0.15 | 1000 | 0.03 | 0.40 | |
| Example 16 | LiN(SO$_2$F)$_2$ | 1.0 | MAH 0.2 | 5000 | 0.03 | 0.30 | |
| Comparative Example 7 | — | — | — | — | 0.11 | 0.35 | |
| Comparative Example 8 | LiN(SO$_2$CF$_3$)$_2$ | 1.0 | MAH 0.05 | — | 0.15 | 0.39 | |
| Comparative Example 9 | LiN(SO$_2$F)$_2$ | 4.2 | — | — | 0.00 | 0.00 | |

The following Table 8 shows the resistance increase rates in the full-charge storage test in Examples 12 to 16 and Comparative Examples 7 to 9.

TABLE 8

| | A.C. impedance value at 1 kHz [Ω] | | Resistance increase rate [%] | Determination |
|---|---|---|---|---|
| | Before storage test | After storage test | | |
| Example 12 | 3.1 | 6.3 | 203 | ○ |
| Example 13 | 3.0 | 7.2 | 240 | ○ |
| Example 14 | 2.7 | 6.1 | 226 | ○ |
| Example 15 | 2.5 | 5.7 | 228 | ○ |
| Example 16 | 3.1 | 6.3 | 203 | ○ |
| Comparative Example 7 | 3.0 | 16.9 | 563 | x |
| Comparative Example 8 | 3.0 | 15.2 | 507 | x |
| Comparative Example 9 | 3.9 | 20.1 | 515 | x |

The following Table 9 shows ionic conductivities in Examples 12 to 16 and Comparative Examples 7 to 9.

TABLE 9

| | Ion conductivity [mS/cm] | | | |
|---|---|---|---|---|
| | 20° C. | 0° C. | −10° C. | 30° C. |
| Example 12 | 19.0 | 15.5 | 12.5 | 6.6 |
| Example 13 | 20.0 | 15.5 | 12.0 | 6.2 |
| Example 14 | 20.1 | 15.7 | 12.2 | 6.5 |
| Example 15 | 21.0 | 16.0 | 13.5 | 7.1 |
| Example 16 | 19.0 | 15.5 | 12.5 | 6.6 |
| Comparative Example 7 | 17.5 | 12.0 | 5.7 | 1.6 |
| Comparative Example 8 | 20.5 | 15 | 8.2 | 2.9 |
| Comparative Example 9 | 19.6 | 12.9 | 6.2 | 2.0 |

As shown in Table 8 described above, it was recognized that the resistance increase rates are lower than 400% in all of Examples 12 to 16. In addition, it was recognized that the resistance increase rates are lower than 300% and 250% in all of Examples 12 to 16.

As shown in Table 9 described above, it was recognized that the −10° C. ionic conductivity is 10 mS/cm or higher in Examples 12 to 16. In addition, it was recognized that the −10° C. ionic conductivity is 12 mS/cm or higher in Examples 12 to 16. Furthermore, it was recognized that the −10° C. ionic conductivity is 12.5 mS/cm or higher in Examples 12, 15, and 16.

As shown in Table 9 described above, it was recognized that the −30° C. ionic conductivity is 5 mS/cm or higher in Examples 12 to 16. In addition, it was recognized that the −30° C. ionic conductivity is 6 mS/cm or higher in Examples 12 to 16. Furthermore, it was recognized that the −30° C. ionic conductivity is 6.5 mS/cm or higher in Examples 12, and 14 to 16.

On the basis of the aforementioned description, it was recognized that the $LiPF_6$ acetonitrile electrolyte solution preferably contains $LiPO_2F_2$, cyclic acid anhydride, and imide salt. As a result, it is possible to suppress a resistance increase during high-temperature heating and obtain an excellent low-temperature characteristic.

On the basis of the experimental results of the examples and the comparative examples, it was recognized that $LiPO_2F_2$ of 0.005 to 1 mass % and cyclic acid anhydride of 0.01 to 1 mass % are preferably added to the $LiPF_6$-based acetonitrile electrolyte solution, and the imide salt is preferably added with a molarity relationship of "$LiPF_6$≤imide salt". As a result, it is possible to reinforce the positive electrode film due to $LiPO_2F_2$ and imide salt and suppress a resistance increase during high-temperature heating. The imide salt itself exhibits excellent low-temperature characteristics.

In Examples 13 to 16, $LiPO_2F_2$ of 0.005 to 1 mass % with respect to the acetonitrile electrolyte solution is added, and cyclic acid anhydride of 0.01 to 1 mass % with respect to the electrolyte solution is added. In addition, the content of imide salt is 0.5 to 3 mol relative to the non-aqueous solvent of "1 L". As a result, it is possible to reinforce the positive electrode film due to the $LiPO_2F_2$ and the imide salt and suppress a resistance increase during high-temperature heating. In addition, it is possible to exhibit excellent low-temperature characteristics due to the imide salt.

Examples of the twenty first to twenty third embodiments will now be described.

<Heated NMR Measurement for Electrolyte Solution>

Inside an argon box, the electrolyte solutions of the examples and the comparative examples were collected in an inner tube of an NMR tube (having a diameter of 3 mm), were capped, and were sealed with a parafilm. The inner tube of the NMR tube was taken out of the argon box, and was inserted into an outer tube containing a DMSO-d6 solution added with $C_6H_2F_4$, so that NMR measurement based on a dual tube method was performed. As the NMR measurement device, ECS400 produced by JEOL RESONANCE, Ltd. was employed. As the measurement condition, a pulse width was set to 45° C., the number of integrations was set to 256, a standby time for a temperature rise to 25° C. was set to 5 seconds, a standby time to 60° C. was set to 7 seconds, and a standby time to 85° C. was set to 10 seconds. The test result is shown in Table 11.

Example 17

An electrolyte solution was prepared by mixing a predetermined amount of various solvents and additives as shown in the following Table 10. That is, acetonitrile (AcN), diethyl carbonate (DEC), ethylene carbonate (EC), and vinylene carbonate (VC) were added and mixed at a volume ratio of "47:19:30:4". In addition, maleic anhydride (MAH) of 0.2 mass % was added. Furthermore, $LiPF_6$ of 0.5 mol, lithium bis (trifluoromethane sulfonyl) imide ($LiN(SO_2CF_3)_2$) of 0.6 mol, and $LiPO_2F_2$ of 50 ppm were added per 1 L of the non-aqueous solvent of this mixed liquid, so as to obtain an electrolyte solution of Example 17. For this electrolyte solution, the heated NMR measurement described above was performed.

Example 18

An electrolyte solution was prepared by mixing a predetermined amount of various solvents and additives as shown in the following Table 10. That is, acetonitrile (AcN), dimethyl carbonate (DMC), ethyl methyl carbonate (EMC), ethylene carbonate (EC), and vinylene carbonate (VC) were added and mixed at a volume ratio of "35:19:15:28:3". In addition, succinic anhydride (SAH) of 0.2 mass % was added. Furthermore, $LiPF_6$ of 0.5 mol, lithium bis (fluorosulfonyl) imide ($LiN(SO_2F)_2$) of 0.8 mol, and $LiPO_2F_2$ of 100 ppm were added per 1 L of the non-aqueous solvent of this mixed liquid, so as to obtain an electrolyte solution of Example 18. For this electrolyte solution, the heated NMR measurement described above was performed.

Comparative Example 10

An electrolyte solution was prepared by mixing a predetermined amount of various solvents and additives as shown in the following Table 10. That is, acetonitrile (AcN), vinylene carbonate (VC), and propylene carbonate (PC) were added and mixed at a volume ratio of "60:10:30". In addition, $LiPF_6$ of 1.0 mol was added per 1 L of the non-aqueous solvent of this mixed liquid, so as to obtain an electrolyte solution of Comparative Example 10. For this electrolyte solution, the heated NMR measurement described above was performed.

Comparative Example 11

An electrolyte solution was prepared by mixing a predetermined amount of various solvents and additives as shown in the following Table 11. That is, acetonitrile (AcN), vinylene carbonate (VC), and propylene carbonate (PC) were added and mixed at a volume ratio of "46:4:50". In addition, $LiPF_6$ of 1.0 mol was added per 1 L of the non-aqueous solvent of this mixed liquid, so as to obtain an electrolyte solution of Comparative Example 11. For this electrolyte solution, the heated NMR measurement described above was performed.

Comparative Example 12

An electrolyte solution was prepared by mixing a predetermined amount of various solvents and additives as shown in the following Table 10. That is, acetonitrile (AcN), ethylene carbonate (EC), vinylene carbonate (VC), and propylene carbonate (PC) were added and mixed at a volume ratio of "38:30:2:30". In addition, LiPF$_6$ of 1.0 mol was added per 1 L of the non-aqueous solvent of this mixed liquid, so as to obtain an electrolyte solution of Comparative Example 12. For this electrolyte solution, the heated NMR measurement described above was performed.

On the basis of the experimental results of the examples and the comparative examples, it was preferable that the LiPF$_6$-based acetonitrile electrolyte solution is diluted with a non-aqueous solvent that does not have saturated tertiary carbon. Since a proton can be easily released from carbonate having saturated secondary carbon (for example, propylene carbonate), it tends to promote generation of HF at a temperature of 50 to 60° C. However, if it is diluted with a non-aqueous solvent that does not have saturated tertiary carbon, it is possible to suppress generation of HF.

A twenty third embodiment will now be described.
<Manufacturing of Non-Aqueous Secondary Battery>
<Fabrication of Positive Electrode>

A composite oxide (LiNi$_{0.5}$Mn$_{0.3}$Co$_{0.2}$O$_2$) of lithium, nickel, manganese, and cobalt as the positive-electrode

TABLE 10

| | Solvent | | | | | | | Lithium salt | | Additive | |
|---|---|---|---|---|---|---|---|---|---|---|---|
| | | | | | | | | LiPF$_6$, | Imide salt | Cyclic acid | |
| | AcN (vol %) | DEC (vol %) | DMC (vol %) | EMC (vol %) | EC (vol %) | VC (vol %) | PC (vol %) | (mol/1 L solvent) | Type (mol/1 L solvent) | anhydride (mass %) | LiPO$_2$F$_2$ (ppm) |
| Example 17 | 47 | 19 | 0 | 0 | 30 | 4 | 0 | 0.5 | LiN(SO$_2$CF$_3$)$_2$ 0.6 | MAH 0.2 | 50 |
| Example 18 | 35 | 0 | 19 | 15 | 28 | 3 | 0 | 0.5 | LiN(SO$_2$F)$_2$ 0.8 | SAH 0.2 | 100 |
| Comparative Example 10 | 60 | 0 | 0 | 0 | 0 | 10 | 30 | 1 | — | — | — |
| Comparative Example 11 | 46 | 0 | 0 | 0 | 0 | 4 | 50 | 1 | — | — | — |
| Comparative Example 12 | 38 | 0 | 0 | 0 | 30 | 2 | 30 | 1 | — | — | — |

In an experiment, the HF generation amount was measured at temperatures of 25° C., 60° C., and 85° C. for Examples 17 and 18 and Comparative Examples 10 to 12. The experimental results thereof are shown in Table 11 described above.

TABLE 11

| | HF generation amount (ppm) | | |
|---|---|---|---|
| | 25° C. | 60° C. | 85° C. |
| Example 17 | 21 | 36 | 61 |
| Example 18 | 22 | 35 | 60 |
| Comparative Example 10 | 28 | 216 | 360 |
| Comparative Example 11 | 24 | 235 | 352 |
| Comparative Example 12 | 25 | 182 | 298 |

As shown in Table 11, it was recognized that the HF generation amount is sufficiently reduced in the examples, compared to the comparative examples.

From this experimental result, it was recognized that the LiPF$_6$-based acetonitrile electrolytic solution containing LiPO$_2$F$_2$ and cyclic acid anhydride is preferably diluted with a carbonate solvent. As a result, it is possible to reinforce the negative electrode SEI due to the LiPO$_2$F$_2$ and the cyclic acid anhydride and reduce the HF generation amount at a temperature of 50 to 60° C.

active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to approximately 95.0 g/m$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.74 g/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.
<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to approximately 61.0 g/m². When the negative electrode mixture-containing slurry was coated on the copper foil, an uncoated region was formed so as to expose a part of the copper foil. Then, roll pressing was performed using a roll press machine until the negative-electrode active material layer has a density of 1.20 g/cm³, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described below was injected into the package, and the package was sealed, so that a single-layered laminate type (pouch type) non-aqueous secondary battery (hereinafter, simply also referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, first, initial charging treatment was performed in the sequence of the following chapter (1-1). Then, each battery was evaluated in the sequence of the chapter (1-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 2.5 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for a total of 1.5 hours. Then, the battery was discharged with a constant current of 6.9 mA corresponding to "0.3 C" to a voltage of 2.5 V. Initial efficiency was calculated by dividing the discharge capacity at this time by the charge capacity.

(1-2) −10° C. Charging/Discharging Cycle Test for Single-Layered Laminate-Type Battery A cycle test was performed for the battery subjected to the initial charging/discharging treatment using the method described in the aforementioned chapter (1-1). Note that the cycle test was initiated 3 hours later after the battery ambient temperature is set to −10° C. First, the battery was charged with a constant current of 4.6 mA corresponding to "0.2 C" to a voltage of 4.2 V, and was then charged with a constant voltage of 4.2 V for a total of 3 hours. Then, the battery was discharged with a constant current of 4.6 mA to a voltage of 2.5 V. By setting one charge operation and one discharge operation as a single cycle, the charging/discharging was performed for 20 cycles. The discharge capacity of the twentieth cycle was set as a capacity retention rate by assuming that the discharge capacity of the first cycle is 100%.

<Evaluation on Low-temperature Characteristic of Non-aqueous Electrolyte Solution>

(2-1) Measurement of Electrochemical Impedance Spectroscopy

The electrolyte solution prepared as described above was put into a sealed cell (cell size: 24 mm diameter by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box having a dew point controlled to −60° C. or lower was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature was set to four levels, that is, −30° C., −10° C., 0° C., and 20° C., and the measurement was initiated after 1.5 hours from each temperature setting. As the measurement data, data at the time point that a change of the data measured repeatedly at every 5 minutes is lower than 0.1% was employed.

(2-2) Ionic Conductivity

The obtained data was plotted on a Nyquist diagram including real parts Z' and imaginary parts Z" of impedance. In addition, a Z' value (R) at Z"=0 was read, and the Li ionic conductivity was obtained using the following formula.

$$\text{Li ionic conductivity}(mS/cm) = d/(R \cdot S)$$

Here, "d" denotes a distance between electrodes (0.35 cm), and "S" denotes an area of the electrode (4.522 cm²).

Example 19

Acetonitrile (AcN), ethyl methyl carbonate (EMC), ethylene carbonate (EC), and vinylene carbonate (VC) were mixed under an inert atmosphere at a volume ratio of "50:28:20:2". In addition, succinic anhydride (SAH) of 0.2 mass % was dissolved. Furthermore, LiPF$_6$ of 0.3 mol and lithium bis (fluorosulfonyl) imide (LiN(SO$_2$F)$_2$) of 1.0 mol were added per 1 L of the mixed liquid, and LiPO$_2$F$_2$ of 0.1 mass % (1000 ppm) was added, so as to obtain an electrolyte solution of Example 19. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Example 20

Acetonitrile (AcN), ethyl methyl carbonate (EMC), ethylene carbonate (EC), and vinylene carbonate (VC) were mixed under an inert atmosphere at a volume ratio of "70:13:15:2". In addition, succinic anhydride (SAH) of 0.2 mass % was dissolved. Furthermore, $LiPF_6$ of 0.4 mol and lithium bis (fluorosulfonyl) imide ($LiN(SO_2F)_2$) of 0.9 mol were added per 1 L of the mixed liquid, and $LiPO_2F_2$ of 0.1 mass % (1000 ppm) was added, so as to obtain an electrolyte solution of Example 20. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Example 21

Acetonitrile (AcN), diethyl carbonate (DEC), ethylene carbonate (EC), and vinylene carbonate (VC) were mixed under an inert atmosphere at a volume ratio of "50:28.5:20:1.5". In addition, succinic anhydride (SAH) of 0.4 mass % was dissolved. Furthermore, $LiPF_6$ of 0.4 mol and lithium bis (fluorosulfonyl) imide ($LiN(SO_2F)_2$) of 0.9 mol were added per 1 L of the mixed liquid, and $LiPO_2F_2$ of 50 ppm was added, so as to obtain an electrolyte solution of Example 21. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Example 22

Acetonitrile (AcN), diethyl carbonate (DEC), ethylene carbonate (EC), and vinylene carbonate (VC) were mixed under an inert atmosphere at a volume ratio of "49:28:21:2". In addition, succinic anhydride (SAH) of 0.2 mass % was dissolved. Furthermore, $LiPF_6$ of 0.3 mol and lithium bis (fluorosulfonyl) imide ($LiN(SO_2F)_2$) of 1.0 mol were added per 1 L of the mixed liquid, and $LiPO_2F_2$ of 50 ppm and 1-methyl-1H-benzotriazole (MBTA) of 0.25 mass % were dissolved, so as to obtain an electrolyte solution of Example 22. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Example 23

Acetonitrile (AcN), diethyl carbonate (DEC), ethylene carbonate (EC), and vinylene carbonate (VC) were mixed under an inert atmosphere at a volume ratio of "60:21:17:2". In addition, succinic anhydride (SAH) of 0.14 mass % was dissolved. Furthermore, $LiPF_6$ of 0.6 mol and lithium bis (trifluoromethane sulfonyl) imide ($LiN(SO_2CF_3)_2$) of 0.6 mol were added per 1 L of the mixed liquid, and $LiPO_2F_2$ of 500 ppm and 1-methyl-1H-benzotriazole (MBTA) of 0.5 mass % were dissolved, so as to obtain an electrolyte solution of Example 23. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Comparative Example 13

Acetonitrile (AcN), diethyl carbonate (DEC), ethylene carbonate (EC), and vinylene carbonate (VC) were mixed under an inert atmosphere at a volume ratio of "41:30:22:7". In addition, succinic anhydride (SAH) of 1.5 mass % was dissolved. Furthermore, $LiPF_6$ of 1.5 mol and lithium bis (trifluoromethane sulfonyl) imide ($LiN(SO_2CF_3)_2$) of 0.8 mol were added per 1 L of the mixed liquid, so as to obtain an electrolyte solution of Comparative Example 13. In Comparative Example 13, the $LiPO_2F_2$ is not added. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Comparative Example 14

Acetonitrile (AcN), diethyl carbonate (DEC), ethylene carbonate (EC), and vinylene carbonate (VC) were mixed under an inert atmosphere at a volume ratio of "8:53:31:8". In addition, succinic anhydride (SAH) of 0.4 mass % was dissolved. Furthermore, $LiPF_6$ of 1.4 mol was added per 1 L of the mixed liquid, and 1-methyl-1H-benzotriazole (MBTA) of 0.01 mass % were dissolved, so as to obtain an electrolyte solution of Comparative Example 14. In Comparative Example 14, the imide salt and the $LiPO_2F_2$ are not added. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

Comparative Example 15

Acetonitrile (AcN), diethyl carbonate (DEC), dimethyl carbonate (DMC), ethylene carbonate (EC), and vinylene carbonate (VC) were mixed under an inert atmosphere at a volume ratio of "17:23:20:31:9". In addition, succinic anhydride (SAH) of 0.4 mass % was dissolved. Furthermore, $LiPF_6$ of 1.4 mol was added per 1 L of the mixed liquid, and $LiPO_2F_2$ of 50 ppm were added, so as to obtain an electrolyte solution of Comparative Example 15. In Comparative Example 15, the imide salt is not added. For the obtained electrolyte solution, it was visually inspected that all of the lithium salts are dissolved. A battery was manufactured using this electrolyte solution on the basis of the method described above in the chapter (1-1), and evaluation of the coin type non-aqueous secondary battery was performed in the sequence described above in the chapter (1-2). Furthermore, the ionic conductivity at each temperature was calculated for the produced electrolyte solution in the sequence described in the chapters (2-1) and (2-2).

In the following description, compositions of each non-aqueous electrolyte solution of Examples 19 to 23 and Comparative Examples 13 to 15 will be described.

TABLE 12

| | Solvent | | | | | | Lithium salt $LiPF_6$ | |
|---|---|---|---|---|---|---|---|---|
| | AcN (vol %) | DEC (vol %) | DMC (vol %) | EMC (vol %) | EC (vol %) | VC (vol %) | (mol/1 L solvent) | Imide salt Type |
| Example 19 | 50 | 0 | 0 | 28 | 20 | 2 | 0.3 | $LiN(SO_2F)_2$ |
| Example 20 | 70 | 0 | 0 | 13 | 15 | 2 | 0.4 | $LiN(SO_2F)_2$ |
| Example 21 | 50 | 28.5 | 0 | 0 | 20 | 1.5 | 0.4 | $LiN(SO_2F)_2$ |
| Example 22 | 49 | 28 | 0 | 0 | 21 | 2 | 0.3 | $LiN(SO_2F)_2$ |
| Example 23 | 60 | 21 | 0 | 0 | 17 | 2 | 0.6 | $LiN(SO_2CF_3)_2$ |
| Comparative Example 13 | 41 | 30 | 0 | 0 | 22 | 7 | 1.5 | $LiN(SO_2CF_3)_2$ |
| Comparative Example 14 | 8 | 53 | 0 | 0 | 31 | 8 | 1.4 | — |
| Comparative Example 15 | 17 | 23 | 20 | 0 | 31 | 9 | 1.4 | — |

| | Lithium salt Imide salt Content (mol/1 L solvent) | Additive Cyclic acid anhydride (mass %) | $LiPO_2F_2$ (ppm) | Nitrogen-containing compound (mass %) | Linear carbonate/AcN (molar ratio) |
|---|---|---|---|---|---|
| Example 19 | 1.0 | SAH 0.2 | 1000 | 0 | 0.29 |
| Example 20 | 0.9 | SAH 0.2 | 1000 | — | 0.10 |
| Example 21 | 0.9 | SAH 0.4 | 50 | — | 0.25 |
| Example 22 | 1.0 | SAH 0.2 | 50 | MBTA 0.25 | 0.25 |
| Example 23 | 0.6 | SAH 0.14 | 500 | MBTA 0.5 | 0.15 |
| Comparative Example 13 | 0.8 | SAH 1.5 | — | — | 0.32 |
| Comparative Example 14 | — | SAH 0.4 | — | MBTA 0.01 | 2.87 |
| Comparative Example 15 | — | SAH 0.4 | 50 | — | 1.32 |

The following Table 13 shows the ionic conductivities in Examples 19 to 23 and Comparative Examples 13 to 15.

TABLE 13

|  | Ion conductivity [mS/cm] | | | |
| --- | --- | --- | --- | --- |
|  | 20° C. | 0° C. | −10° C. | −30° C. |
| Example 19 | 22.0 | 15.6 | 13.2 | 7.5 |
| Example 20 | 23.4 | 16.5 | 13.7 | 7.8 |
| Example 21 | 21.9 | 15.5 | 12.5 | 7.1 |
| Example 22 | 21.7 | 15.3 | 12.4 | 7.1 |
| Example 23 | 11.8 | 8.7 | 7.2 | 3.1 |
| Comparative Example 13 | 16.9 | 10.5 | 5.8 | 1.8 |
| Comparative Example 14 | 12.6 | 7.8 | 4.3 | 1.3 |
| Comparative Example 15 | 15.7 | 9.7 | 5.2 | 1.6 |

TABLE 14

|  | −10° C. cycle test |
| --- | --- |
| Example 19 | 96% |
| Example 20 | 97% |
| Example 21 | 97% |
| Example 22 | 95% |
| Example 23 | 94% |
| Comparative Example 13 | 35% |
| Comparative Example 14 | 20% |
| Comparative Example 15 | 31% |

As shown in Table 13, it was recognized that the −10° C. ionic conductivity is 7 mS/cm or higher in Examples 19 to 23. In addition, it was recognized that the −10° C. ionic conductivity is 10 mS/cm or higher in Examples 19 to 22.

As shown above in Table 14, it was recognized the capacity retention rate after the cycle test is 90% or higher in Examples 19 to 23.

In this experiment, it was preferable that the non-aqueous electrolyte solution contains $LiPF_6$ as the lithium salt, lithium bis (fluorosulfonyl) imide ($LiN(SO_2F)_2$) or lithium bis (trifluoromethane sulfonyl) imide ($LiN(SO_2CF_3)_2$) as the imide salt, acetonitrile as the solvent, and cyclic acid anhydride and $LiPO_2F_2$ as the additive. As a result, since the interface (film) resistance is suppressed to be low, it is possible to suppress cycle degradation at a low temperature.

On the basis of the experimental results of the examples and the comparative examples, it was preferable that the non-aqueous electrolyte solution contains the additives of a total mass of less than 5%. Here, the "additive" includes those generally used as a protection film formation agent such as VC, MAH, SAH, PAH, and ES. As a result, the interface (film) resistance is suppressed to be low, so that it is possible to suppress cycle degradation at a low temperature.

On the basis of Examples 19 to 23, it was preferable that the non-aqueous electrolyte solution contains $LiPO_2F_2$ of 0.005 to 1 mass % and vinylene carbonate of 4% or less. By setting the amount of $LiPO_2F_2$ and the amount of vinylene carbonate to a predetermined range, it is possible to provide a secondary battery having excellent high-temperature durability and excellent low-temperature performance.

Examples of the twenty fourth to twenty sixth embodiments will now be described.

<Evaluation on Low-temperature Characteristic of Non-aqueous Electrolyte Solution>

(1-1) Measurement of Electrochemical Impedance Spectroscopy

The prepared electrolyte solution was put into a sealed cell (cell size: 24 mm diameter by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature was set to four levels, that is, −30° C., −10° C., 0° C., and 20° C., and the measurement was initiated after 1.5 hours from each temperature setting. As the measurement data, data at the time point that a change of the data measured repeatedly at every 5 minutes is lower than 0.1% was employed.

(2-2) Ionic Conductivity

The obtained data was plotted on a Nyquist diagram including real parts Z' and imaginary parts Z" of impedance. In addition, a Z' value (R) at Z"=0 was read, and the Li ionic conductivity was obtained using the following formula.

$$\text{Li ionic conductivity}(mS/cm) = d/(R \cdot S)$$

Here, "d" denotes a distance between electrodes (0.35 cm), and "S" denotes an area of the electrode (4.522 $cm^2$).

Example 24

Acetonitrile (AcN), diethyl carbonate (DEC), ethylene carbonate (EC), and vinylene carbonate (VC) were mixed under an inert atmosphere at a volume ratio of "50:30:18:2". In addition, phthalic anhydride (PAH) of 0.2 mass % was dissolved. Furthermore, $LiPF_6$ of 0.3 mol and lithium bis (fluorosulfonyl) imide ($LiN(SO_2F)_2$) of 1.0 mol were added per 1 L of the mixed liquid, and $LiPO_2F_2$ of 500 ppm was dissolved, so as to obtain an electrolyte solution of Example 24. For the obtained electrolyte solution, it was visually inspected that all of the lithium salts are dissolved. For this electrolyte solution, the ionic conductivities at each temperature were calculated in the sequence described in the chapters (1-1) and (1-2).

Example 25

Acetonitrile (AcN), diethyl carbonate (DEC), ethylene carbonate (EC), and vinylene carbonate (VC) were mixed under an inert atmosphere at a volume ratio of "60:32:5:3". In addition, maleic anhydride (MAH) of 0.1 mass % was dissolved. Furthermore, $LiPF_6$ of 0.5 mol and lithium bis (fluorosulfonyl) imide ($LiN(SO_2F)_2$) of 0.6 mol were added per 1 L of the mixed liquid, and $LiPO_2F_2$ of 1000 ppm was dissolved, so as to obtain an electrolyte solution of Example 25. For the obtained electrolyte solution, it was visually inspected that all of the lithium salts are dissolved. For this electrolyte solution, the ionic conductivities at each temperature were calculated in the sequence described in the chapters (1-1) and (1-2).

Comparative Example 16

Ethyl methyl carbonate (EMC) and ethylene carbonate (EC) were mixed under an inert atmosphere at a volume ratio of "70:30". In addition, $LiPF_6$ of 1.0 mol was added per 1 L of the mixed liquid, so as to obtain an electrolyte solution of Comparative Example 16. In Comparative Example 16, the $LiPO_2F_2$ is not added. For the obtained electrolyte solution, it was visually inspected that all of the lithium salts are dissolved. For this electrolyte solution, the ionic conductivities at each temperature were calculated in the sequence described in the chapters (1-1) and (1-2).

Comparative Example 17

Acetonitrile (AcN), dimethyl carbonate (DMC), ethylene carbonate (EC), and vinylene carbonate (VC) were mixed under an inert atmosphere at a volume ratio of "10:30:50: 10", so as to obtain an electrolyte solution of Comparative Example 17. In Comparative Example 17, the $LiPO_2F_2$ is not added. For the obtained electrolyte solution, it was visually inspected that all of the lithium salts are dissolved. For this electrolyte solution, the ionic conductivities at each temperature were calculated in the sequence described in the chapters (1-1) and (1-2).

The following description shows compositions of each non-aqueous electrolyte solution in Examples 24 and 25 and Comparative Examples 16 and 17.

TABLE 15

| | Solvent | | | | | | Lithium salt $LiPF_6$ |
|---|---|---|---|---|---|---|---|
| | AcN (vol %) | DEC (vol %) | DMC (vol %) | EMC (vol %) | EC (vol %) | VC (vol %) | (mol/1 L solvent) |
| Example 24 | 50 | 30 | 0 | 0 | 18 | 2 | 0.3 |
| Example 25 | 60 | 32 | 0 | 0 | 5 | 3 | 0.5 |
| Comparative Example 16 | 0 | 0 | 0 | 70 | 30 | 0 | 1.0 |
| Comparative Example 17 | 10 | 0 | 30 | 0 | 50 | 10 | 1.3 |

| | Lithium salt | | Additive | | | Linear carbonate/ |
| | Imide salt | | Cyclic | | | |
| | Type | Content (mol/1 L solvent) | acid anhydride (mass %) | $LiPO_2F_2$ (ppm) | $LiPF_6$/AcN (molar ratio) | AcN (molar ratio) |
|---|---|---|---|---|---|---|
| Example 24 | $LiN(SO_2F)_2$ | 1.0 | PAH 0.2 | 500 | 0.14 | 0.25 |
| Example 25 | $LiN(SO_2F)_2$ | 0.6 | MAH 0.1 | 1000 | 0.04 | 0.24 |
| Comparative Example 16 | — | — | — | 0 | 0.00 | 0.00 |
| Comparative Example 17 | — | — | — | 0 | 0.68 | 1.75 |

The following Table 16 shows ionic conductivities in Examples 24 and 25 and Comparative Examples 16 and 17.

TABLE 16

| | Ion conductivity [mS/cm] | | | |
|---|---|---|---|---|
| | 20° C. | 0° C. | −10° C. | −30° C. |
| Example 24 | 21.6 | 15.3 | 12.3 | 7.0 |
| Example 25 | 17.6 | 13.4 | 9.1 | 5.3 |

TABLE 16-continued

| | Ion conductivity [mS/cm] | | | |
|---|---|---|---|---|
| | 20° C. | 0° C. | −10° C. | −30° C. |
| Comparative Example 16 | 8.7 | 5.5 | 4.0 | 1.8 |
| Comparative Example 17 | 9.1 | 4.9 | 2.4 | 0.9 |

As shown in Table 16 described above, it was recognized that the 0° C. ionic conductivity is 10 mS/cm or higher, and preferably 13 mS/cm or higher in Examples 24 and 25. In addition, as shown in Table 16 described above, it was recognized that the −10° C. ionic conductivity is 9 mS/cm or higher in Examples 24 and 25. Furthermore, it was recognized that the −30° C. ionic conductivity is 5 mS/cm or higher in Examples 24 and 25.

In this experiment, it was recognized that the non-aqueous electrolyte solution containing $LiPF_6$ or $LiPO_2F_2$ as the lithium salt, acetonitrile as the solvent, and cyclic acid anhydride as the additive has a 0° C. ionic conductivity of 10 mS/cm or higher. As a result, the 0° C. ionic conductivity is higher than the 20° C. ionic conductivity of the existing electrolyte solution (8.7 to 9.1 mS/cm).

On the basis of the experimental results of the examples and the comparative examples, it is preferable that a particular ratio "$LiPF_6$/AcN" (affecting the amount of the aggregate) and a particular ratio "linear carbonate/AcN" (affecting the solubility) are satisfied at the same time.

Specifically, from Examples 24 and 25, it is preferable that the electrolyte solution contains $LiPF_6$ and non-aqueous solvent, the content of $LiPF_6$ is 1.5 mol or less with respect to the non-aqueous solvent of "1 L", the non-aqueous solvent contains acetonitrile and linear carbonate, the molar mixing ratio of $LiPF_6$ relative to acetonitrile is 0.08 or higher and 0.4 or less, and the molar mixing ratio of linear carbonate relative to acetonitrile is 0.3 or higher and 2 or lower. As a result, it is possible to address a tradeoff problem between prevention of association of $LiPF_6$ (by increasing linear carbonate) and suppression of reduction of the ionic conductivity at a low-temperature range (by increasing acetonitrile).

Examples of the twenty seventh and twenty eighth embodiments will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 17. Note that, in Table 17, "AcN" denotes acetonitrile, "DEC" denotes diethyl carbonate, "EMC" denotes ethyl methyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "SAH" denotes succinic anhydride, "MAH" denotes maleic anhydride, "PAH" denotes phthalic anhydride, and "$LiPO_2F_2$" denotes lithium difluorophosphate.

Preparation was performed such that each component other than the lithium salt is a non-aqueous solvent, and a total amount of each non-aqueous solvent becomes "1 L". The content of lithium salt is a molar quantity with respect to the non-aqueous solvent of 1 L.

<Measurement of Electrochemical Impedance Spectroscopy>

The prepared electrolyte solution was put into a sealed cell (cell size: 24 mm diameter by 0.35 mm thickness) produced by TOYO Corporation, was sealed, and was inserted into a holder (SH1-Z), and wiring was performed. In addition, the cell was put into the thermostatic oven, and measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to five levels, that is, −20° C., −10° C., 0° C., 10° C. and 20° C., and the measurement was initiated after 1.5 hours from each temperature setting. As the measurement data, data at the time point that a change of the data measured repeatedly at every 5 minutes is lower than 0.1% was employed.

<Ionic Conductivity>

The obtained data was plotted on a Nyquist diagram including real parts Z' and imaginary parts Z" of impedance. In addition, a Z' value (R) at Z"=0 was read, and the Li ionic conductivity was obtained using the following formula.

$$\text{Li ionic conductivity}(mS/cm) = d/(R \cdot S)$$

Here, "d" denotes a distance between electrodes (0.35 cm), and "S" denotes an area of the electrode (4.522 $cm^2$).

<Arrhenius Plot of Ionic Conductivity>

Using the Li ionic conductivities at each temperature obtained from the aforementioned formulas, the inclinations of the Arrhenius plot at −20 to 0° C. and at 0 to 20° C. were obtained on the basis of the Arrhenius equation: $\sigma = A\exp(-EA/kT)$, ("$\sigma$" denotes an ionic conductivity, "A" denotes a frequency factor, "k" denotes the Boltzmann constant, and "T" denotes the absolute temperature).

An electrolyte solution having the composition of Table 17 was prepared at a temperature of 25° C., and the cell was assembled using the aforementioned method, so that the measurement of electrochemical impedance spectroscopy was performed. A Nyquist diagram was created from the obtained data, and the Z' value was read. From the aforementioned formulas, the ionic conductivity was calculated for Examples 26 to 28 and Comparative Example 18. The inclinations of the Arrhenius plot at −20 to 0° C. and at 0 to 20° C. were obtained using the calculated ionic conductivity, and activation energy (Ea) was obtained from the inclinations of the Arrhenius plot. The result is shown in the following Table 18.

TABLE 17

| | Solvent | | | | | Lithium salt | | Additive | |
| | | | | | | $LiPF_6$ | Imide salt | | Cyclic acid |
| | AcN (vol %) | DEC (vol %) | EMC (vol %) | EC (vol %) | VC (vol %) | (mol/1 Lsolvent) | Type | Content (mol/1 L solvent) | anhydride (mass %) | $LiPO_2F_2$ (mass %) |
|---|---|---|---|---|---|---|---|---|---|---|
| Example 26 | 47 | 28 | 0 | 21 | 4 | 0.3 | $LiN(SO_2F)_2$ | 1.0 | PAH 0.3 | 0.1 |
| Example 27 | 38 | 0 | 60 | 0 | 2 | 0.3 | $LiN(SO_2F)_2$ | 2.0 | SAH 0.5 | 0.5 |
| Example 28 | 65 | 0 | 16 | 8 | 11 | 0.2 | $LiN(SO_2CF_3)_2$ | 0.8 | MAH 0.1 | 0.05 |
| Comparative Example 18 | 0 | 0 | 33 | 67 | 0 | 1 | — | — | — | — |
| Comparative Example 19 | 47 | 28 | 0 | 21 | 4 | 1.3 | — | — | — | — |

TABLE 18

| | Activation energy (kJ/mol) | | |
| | $Ea_1$ (−20-0° C.) | $Ea_2$ (0-20° C.) | $Ea_2/Ea_1$ |
|---|---|---|---|
| Example 26 | 13.5 | 11.5 | 0.852 |
| Example 27 | 11.8 | 10.0 | 0.847 |
| Example 28 | 12.9 | 11.0 | 0.853 |
| Comparative Example 18 | 19.9 | 15.9 | 0.799 |
| Comparative Example 19 | 16.0 | 16.0 | 0.516 |

As shown in Table 18, in all the comparative examples, it was recognized that the activation energies $Ea_1$ and $Ea_2$ at −20 to 0° C. and 0 to 20° C. are much higher than 15 kJ/mol. In comparison, in all the examples, it was recognized that the activation energy $Ea_1$ at −20 to 0° C. is equal to or lower than 15 kJ/mol. In addition, in the examples, it was recognized that the activation energy $Ea_2$ at 0 to 20° C. is equal to or lower than 15 kJ/mol. Furthermore, the value obtained by dividing the activation energy $Ea_2$ at 0 to 20° C. by the activation energy $Ea_1$ at −20 to 0° C. ($Ea_2/Ea_1$) was much smaller than "1" in the comparative examples, compared to the examples. That is, in the comparative examples, the $Ea_1$ and $Ea_2$ are remarkably different. As a result, the electrolyte solution is not stabilized energetically, and the ionic conductivity suffers from a discontinuous change in the comparative examples, compared to the examples. In comparison, in the examples, it was recognized that the $Ea_2/Ea_1$ is stabilized energetically in the vicinity of "1", and the ionic conductivity is stabilized even in a low-temperature range equal to or lower than 0° C.

In Examples 26 and 27, the electrolyte solution contains acetonitrile and $LiPO_2F_2$ and $LiN(SO_2F)_2$ (imide salt) as the lithium salt. In addition, in Example 28, the electrolyte solution contains acetonitrile and $LiPO_2F_2$ and $LiN(SO_2CF_3)_2$ (imide salt) as the lithium salt.

In Examples 26 to 28, the content of $LiPO_2F_2$ is 0.01 mass % or more and 1 mass % or less with respect to the electrolyte solution. In addition, in the electrolyte solutions of Examples 26 to 28, it was recognized that a percentage of the molar quantity of imide salt relative to a total molar quantity of the lithium salts contained in the electrolyte solution is 50% or higher. That is, it was recognized that the main component of the lithium salt of the electrolyte solutions of Examples 26 to 28 is imide salt.

Since the electrolyte solution of Comparative Example 19 contains acetonitrile, the electrode of the sealed cell using the electrolyte solution was stained. In comparison, in the electrolyte solutions of Examples 26 to 28, although they contain acetonitrile, the electrode of the sealed cell using the electrolyte solution was not stained. This is because $LiPO_2F_2$ is contained.

Examples of the twenty ninth and thirtieth embodiments will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 19. Note that, in Table 19, "AcN" denotes acetonitrile, "DEC" denotes diethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "SAH" denotes succinic anhydride, "$LiPO_2F_2$" denotes lithium difluorophosphate, and "MBTA" denotes 1-methyl-1H-benzotriazole.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 19

| | Solvent | | | | Lithium salt | | | Additive | | |
|---|---|---|---|---|---|---|---|---|---|---|
| | | | | | $LiPF_6$ | Imide salt | | Cyclic acid anhydride | $LiPO_2F_2$ | Nitrogen-containing compound |
| | AcN (vol %) | DEC (vol %) | EC (vol %) | VC (vol %) | (mol/1 L solvent) | Type | Content (mol/1 Lsolvent) | (mass %) | (mass %) | (mass %) |
| Example 29 | 45 | 30 | 21 | 4 | 0.3 | $LiN(SO_2F)_2$ | 1.0 | SAH 0.15 | 0.1 | MBTA 0.3 |
| Example 30 | 45 | 30 | 21 | 4 | 0.4 | $LiN(SO_2CF_3)_2$ | 0.6 | SAH 0.15 | 0.1 | MBTA 0.3 |
| Comparative Example 20 | 45 | 30 | 21 | 4 | 0.3 | $LiN(SO_2CF_3)_2$ | 1.0 | SAH 0.15 | — | — |
| Comparative Example 21 | 45 | 30 | 21 | 4 | 1.3 | — | — | SAH 0.15 | — | — |

<Manufacturing of Battery>
<Fabrication of Positive Electrode>

A composite oxide ($LiNi_{0.5}Mn_{0.3}Co_{0.2}O_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to approximately 95.0 g/m². When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.50 g/cm³, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This negative electrode mixture-containing slurry was coated on one surface of a copper foil having a thickness of 10 μm while adjusting the basis weight to 60.0 g/m². When the negative electrode mixture-containing slurry was coated on the copper foil, an uncoated region was formed so as to expose a part of the copper foil. Then, roll pressing was performed using a roll press machine until the negative-electrode active material layer has a density of 1.35 g/cm³, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply also referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, first, initial charging treatment was performed in the sequence of the following chapter (1-1). Then, each battery was evaluated in the sequence of the chapter (1-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for 1.5 hours. Then, the battery was discharged with a constant current of 6.9 mA corresponding to "0.3 C" to a voltage of 3.0 V. Initial efficiency was calculated by dividing the discharge capacity at this time by the charge capacity.

(1-2) 50° C. Charging/Discharging Cycle Test for Single-Layered Laminate-Type Battery A cycle test was performed for the battery subjected to the initial charging/discharging treatment using the method described in the aforementioned chapter (1-1). Note that the cycle test was initiated 3 hours later after the battery ambient temperature is set to 50° C. First, the battery was charged with a constant current of 23 mA corresponding to "1 C" to a voltage of 4.2 V, and was then charged with a constant voltage of 4.2 V for a total of 3 hours. Then, the battery was discharged with a constant current of 23 mA to a voltage of 3.0 V. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%.

(2) Measurement of Transition Metal Elution Amount

An X-ray photoelectron spectroscopy (XPS) analysis was performed to measure the transition metal elution amount. As an XPS analyzer, Versa Probell produced by ULVAC-PHI, Inc. was employed. As an analysis condition, an excitation source was set to mono AlKα 15kV×3.3 mA, an analysis size was set to approximately 200 μm diameter, and a photoelectron emission angle was set to 45°. In addition, the measurement sample was disassembled from the battery before the test, and the obtained negative electrode was immersed in acetonitrile for approximately 1 minute to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box having a dew point controlled to −60° C. or lower. The sample was delivered to the XPS device without exposure to the atmosphere using a dedicated tool. A relative element concentration of each element was obtained using the area intensity of each obtained peak (C1S, O1s, F1s, P2p, N1s, S2p, Li1s, Mn3p, Ni3p, and Co3p) and a relative sensitivity coefficient of the device. Here, peak splitting was performed on the Ni3p, Co3p, and Mn3p spectra observed at approximately 40 to 80 eV to derive the area intensity, so that a Ni—concentration, a Co-concentration, and a Mn-concentration were obtained.

TABLE 20

| | 50° C. cycle test capacity retention rate [%] | Transition metal elution amount [ppm] | | |
|---|---|---|---|---|
| | | Mn | Ni | Co |
| Example 29 | 89 | 0.3 | 0.2 | 0.2 |
| Example 30 | 88 | 0.3 | 0.2 | 0.2 |
| Comparative Example 20 | 71 | 1.2 | 1.0 | 0.3 |
| Comparative Example 21 | 68 | 1.4 | 1.2 | 0.4 |

As shown in Table 20, it was possible to obtain a capacity retention rate of 75% or higher in all of the examples. In addition, in the examples, it was possible to suppress the transition metal elution amount of Mn, Ni, and Co to be smaller than that of the comparative examples.

On the basis of the examples and the comparative examples, it was preferable that the electrolyte solution contains $LiPO_2F_2$ of 0.005 to 1 mass %, a nitrogen-containing cyclic compound of 0.01 to 1 mass %, and cyclic acid anhydride of 0.01 to 1 mass %. In this manner, since the nitrogen-containing cyclic compound is contained, elution of metals derived from the positive-electrode active material is suppressed. Therefore, it is possible to suppress an increase of the positive electrode interface resistance. Furthermore, since a certain amount of $LiPO_2F_2$ and cyclic acid anhydride are contained, it is possible to suppress a growth of the transition metal precipitated on the negative electrode.

On the basis of Examples 29 and 30, it was preferable that the nitrogen-containing cyclic compound is 1-methyl-1H-benzotriazole (MBTA). In this manner, the nitrogen-containing cyclic compound without N—H bond is contained, it is possible to prevent hydrogen from being released in a high-temperature cycle and suppress generation of gas.

An example of the thirty first embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 21.

Note that, in Table 21, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "LiPO$_2$F$_2$" denotes lithium difluorophosphate, "SAH" denotes succinic anhydride, "MAH" denotes maleic anhydride, and "PAH" denotes phthalic anhydride.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 21

| | Solvent | | | | | | Lithium salt | | Additive |
|---|---|---|---|---|---|---|---|---|---|
| | | | | | | | LiPF$_6$ | Imide salt | Cyclic |
| | AcN (vol %) | DEC (vol %) | EMC (vol %) | DMC (vol %) | EC (vol %) | VC (vol %) | Content (mol/1 L solvent) | Type | Content (mol/1 L solvent) | acid anhydride (mass %) |
| Example 101 | 49 | 28 | 0 | 0 | 21 | 2 | 0.4 | LiN(SO$_2$F)$_2$ | 0.9 | MAH 0.15 |
| Example 102 | 49 | 28 | 0 | 0 | 21 | 2 | 0.3 | LiN(SO$_2$F)$_2$ | 1.0 | PAH 0.15 |
| Example 103 | 62 | 0 | 18 | 0 | 18 | 2 | 0.6 | LiN(SO$_2$CF$_3$)$_2$ | 0.6 | MAH 0.15 |
| Example 104 | 49 | 0 | 18 | 10 | 21 | 2 | 0.3 | LiN(SO$_2$F)$_2$ | 1.0 | SAH 0.15 |
| Example 105 | 47 | 0 | 30 | 0 | 21 | 2 | 0.3 | LiN(SO$_2$F)$_2$ | 1.0 | SAH 0.15 |
| Comparative Example 101 | 0 | 45 | 16 | 0 | 35 | 4 | 1.2 | — | — | — |
| Comparative Example 102 | 0 | 0 | 20 | 45 | 33 | 2 | 1.6 | — | — | — |
| Comparative Example 103 | 0 | 0 | 20 | 48 | 27 | 5 | 1.5 | — | — | — |

| | Additive LiPO$_2$F$_2$ (ppm) | Battery type | Positive-electrode active material | BET value [m2/g] | Positive electrode current collector | Negative-electrode active material | Negative electrode current collector | Separator |
|---|---|---|---|---|---|---|---|---|
| Example 101 | 1000 | Layered laminate cell | LiNi$_{0.5}$Mn$_{0.3}$Co$_{0.2}$O$_2$ | 0.5 | Aluminum foil | Graphite | Copper foil | Polyethylene microporous membrane |
| Example 102 | 5000 | Layered laminate cell | LiNi$_{0.5}$Mn$_{0.3}$Co$_{0.2}$O$_2$ | 0.6 | Aluminum foil | Graphite | Copper foil | Polyethylene microporous membrane |
| Example 103 | 1000 | Layered laminate cell | LiNi$_{0.5}$Mn$_{0.3}$Co$_{0.2}$O$_2$ | 0.5 | Aluminum foil | Graphite | Copper foil | Polyethylene microporous membrane |
| Example 104 | 1000 | Layered laminate cell | LiNi$_{0.5}$Mn$_{0.3}$Co$_{0.2}$O$_2$ | 0.7 | Aluminum foil | Graphite | Copper foil | Polyethylene microporous membrane |
| Example 105 | 5000 | Layered laminate cell | LiFePO4 | 14.6 | Aluminum foil | Graphite | Copper foil | non-woven fabric |
| Comparative Example 101 | — | Layered laminate cell | LiNi$_{0.5}$Mn$_{0.3}$Co$_{0.2}$O$_2$ | 0.5 | Aluminum foil | Graphite | Copper foil | Polyethylene microporous membrane |
| Comparative Example 102 | — | Layered laminate cell | LiNi$_{0.5}$Mn$_{0.3}$Co$_{0.2}$O$_2$ | 0.4 | Aluminum foil | Graphite | Copper foil | Polyethylene microporous membrane |
| Comparative Example 103 | — | Layered laminate cell | LiNi$_{0.5}$Mn$_{0.3}$Co$_{0.2}$O$_2$ | 0.2 | Aluminum foil | Graphite | Copper foil | Polyethylene microporous membrane |

A non-aqueous secondary battery using the positive-electrode active material, the negative-electrode active material, the separator, and the electrolyte solution shown in Table 21 was manufactured.

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=5/3/2 (element ratio)) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100: 4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 12.8 mg/cm$^2$, and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm$^3$, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 5.4 mg/cm$^2$, and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.50 g/cm$^3$, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply also referred to as "multi-layered laminate-type battery") was manufactured.

This multi-layered laminate-type battery has a design capacity value of approximately 1.5 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Subsequently, the measurement of electrochemical impedance spectroscopy (−30° C.) was performed. Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

<Initial Charging/Discharging Treatment>

As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

<Measurement of Electrochemical Impedance Spectroscopy>

For the battery subjected to the initial charging/discharging treatment using the method described above in the chapter (2-1), the measurement of electrochemical impedance spectroscopy was performed. The measurement of electrochemical impedance spectroscopy was performed using a frequency response analyzer 1400 (model name) produced by AMETEK, Inc. and potentio-galvanostat 1470E (model name) produced by AMETEK, Inc. The impedance was measured from a voltage/current response signal by applying an AC signal while changing the frequency 1000 kHz to 0.01 Hz. A value intersecting with an abscissa of a complex impedance plot (cole-cole plot) was obtained as a bulk resistance, and a value obtained by adding the bulk resistance to a width of an arc of the high frequency side was obtained as an internal resistance. In addition, all the resistance values were obtained using a value of a real part (abscissa). Furthermore, an amplitude of the applied AC voltage was set to "±5 mV". Furthermore, the battery ambient temperature at the time of measurement of electrochemical impedance spectroscopy was set to −30° C., and the measurement started after 1.5 hours from each temperature setting. The following values were calculated from such results.

TABLE 22

|  | Bulk resistance (Ω) | | Bulk resistance/ internal resistance |
|---|---|---|---|
|  | Bulk resistance (−30° C.) | Internal resistance (−30° C.) |  |
| Example 101 | 0.06 | 1.30 | 0.05 |
| Example 102 | 0.07 | 1.20 | 0.06 |
| Example 103 | 0.07 | 1.37 | 0.05 |
| Example 104 | 0.06 | 1.18 | 0.05 |
| Example 105 | 0.05 | 0.93 | 0.05 |
| Comparative Example 101 | 0.08 | 3.72 | 0.02 |
| Comparative Example 102 | 0.09 | 2.61 | 0.03 |
| Comparative Example 103 | 0.10 | 3.80 | 0.03 |

In Examples 101, and 103 to 105, a value obtained by dividing the bulk resistance by the internal resistance was "0.05". In Example 102, a value obtained by dividing the bulk resistance by the internal resistance was "0.06". In addition, in Comparative Example 101, a value obtained by dividing the bulk resistance by the internal resistance was "0.02". In Comparative Example 102, a value obtained by dividing the bulk resistance by the internal resistance was "0.03". In Comparative Example 103, a value obtained by dividing the bulk resistance by the internal resistance was "0.03".

From the ranges of the examples, it was defined that the value obtained by dividing the bulk resistance by the internal resistance in the measurement of electrochemical impedance spectroscopy at a temperature of −30° C. preferably has a range of 0.05 to 0.7.

An example of the thirty second embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 23. Note that, in Table 23, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "LiPO$_2$F$_2$" denotes lithium difluorophosphate, "SAH" denotes succinic anhydride, "MAH" denotes maleic anhydride, "PAH" denotes phthalic anhydride, and "MBTA" denotes 1-methyl-1H-benzotriazole.

Preparation was performed such that each component other than the lithium salts and the additives is a non-aqueous solvent, and a total amount of each non-aqueous solvent becomes "1 L". The content of lithium salt is a molar quantity with respect to the non-aqueous solvent of 1 L.

TABLE 23

| | Solvent | | | | | | LiPF$_6$ | Lithium salt | | Additive Nitrogen- |
|---|---|---|---|---|---|---|---|---|---|---|
| | | | | | | | | Imide salt | | |
| | AcN (vol %) | DEC (vol %) | EMC (vol %) | EMC (vol %) | EC (vol %) | VC (vol %) | (mol/1 L solvent) | Type | Content (mol/1 L solvent) | containing compound (mass %) |
| Example 106 | 47 | 35 | 0 | 0 | 16 | 2 | 0.3 | LiN(SO$_2$F)$_2$ | 1.0 | — |
| Example 107 | 47 | 0 | 34 | 0 | 16 | 3 | 0.5 | LiN(SO$_2$F)$_2$ | 0.6 | MBTA 0.5 |
| Example 108 | 37 | 0 | 40 | 0 | 21 | 2 | 0.5 | LiN(SO$_2$CF$_3$)$_2$ | 0.6 | MBTA 0.3 |
| Comparative Example 104 | 44 | 32 | 0 | 0 | 15 | 9 | 1.2 | — | — | — |
| Comparative Example 105 | 57 | 0 | 19 | 0 | 18 | 6 | 1.0 | — | — | MBTA 0.01 |
| Comparative Example 106 | 43 | 0 | 0 | 35 | 18 | 4 | 1.2 | — | — | MBTA 3 |

| | Additive | | | | | | | | |
|---|---|---|---|---|---|---|---|---|---|
| | Cyclic acid anhydride (mass %) | LiPO$_2$F$_2$ (ppm) | Battery type | Positive-electrode active material | Positive electrode current collector | Negative-electrode material | Negative electrode current collector | Separator |
| Example 106 | MAH 0.2 | 3000 | Layered laminate cell | LiNi$_{0.5}$Mn$_{0.3}$Co$_{0.2}$O$_2$ | Aluminum foil | Graphite | Copper foil | Polyethylene microporous membrane |
| Example 107 | PAH 0.2 | 3000 | Layered laminate cell | LiNi$_{0.5}$Mn$_{0.3}$Co$_{0.2}$O$_2$ | Aluminum foil | Graphite | Copper foil | Polyethylene microporous membrane |

TABLE 23-continued

| Example 108 | SAH 0.2 | 3000 | Layered laminate cell | $LiNi_{0.5}Mn_{0.3}Co_{0.2}O_2$ | Aluminum foil | Graphite | Copper foil | Polyethylene microporous membrane |
|---|---|---|---|---|---|---|---|---|
| Comparative Example 104 | SAH 2.5 | — | Layered laminate cell | $LiNi_{0.5}Mn_{0.3}Co_{0.2}O_2$ | Aluminum foil | Graphite | Copper foil | Polyethylene microporous membrane |
| Comparative Example 105 | — | — | Layered laminate cell | $LiNi_{0.5}Mn_{0.3}Co_{0.2}O_2$ | Aluminum foil | Graphite | Copper foil | Polyethylene microporous membrane |
| Comparative Example 106 | SAH 2.5 | — | Layered laminate cell | $LiNi_{0.5}Mn_{0.3}Co_{0.2}O_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 µm, nickel, manganese and cobalt (Ni/Mn/Co=5/3/2 (element ratio)) as the positive-electrode active material, graphite carbon powder (density: 2.26 g/cm$^3$) having a number average particle diameter of 6.5 µm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100: 4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 µm and a width of 200 mm, which will serve as a positive electrode current collector, using a doctor blade method while adjusting the basis weight of one surface to 12.8 mg/cm$^2$, and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm$^3$, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm$^3$) having a number average particle diameter of 12.7 µm and graphite carbon powder (density: 2.27 g/cm$^3$) having a number average particle diameter of 6.5 µm as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 µm and a width of 200 mm, which will serve as a negative electrode current collector, using a doctor blade method while adjusting the basis weight of one surface to 5.4 mg/cm$^2$, and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.50 g/cm$^3$, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Manufacturing of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply also referred to as "multi-layered laminate-type battery") was manufactured.

The multi-layered laminate-type battery has a design capacity value of approximately 1.5 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Subsequently, the measurement of electrochemical impedance spectroscopy (−30° C.), and the 50° C. cycle test were performed. Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Note that, for the multi-layered laminate-type battery having a designated aging condition, the initial charging was performed as described in the condition of Table 24. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

<50° C. Charging/Discharging Cycle Test>

A cycle test was performed for the battery subjected to the initial charging/discharging treatment using the method described in the aforementioned chapter (2-1). Note that the cycle test was initiated 3 hours later after the battery ambient temperature is set to 50° C. First, the battery was charged with a constant current of 1.5 A corresponding to "1 C" to a voltage of 4.2 V, and was then charged with a constant voltage of 4.2 V for a total of 3 hours. Then, the battery was discharged with a constant current of 1.5 A to a voltage of 2.7 V. By setting one charge operation and one discharge operation as a single cycle, the charging/discharging was performed for 200 cycles. The discharge capacity of the two hundredth cycle was set as a capacity retention rate by assuming that the discharge capacity of the first cycle is 100%.

<Measurement of Electrochemical Impedance Spectroscopy>

For the battery subjected to the initial charging/discharging treatment using the method described above in the chapter (2-1), the measurement of electrochemical impedance spectroscopy was performed. The measurement of electrochemical impedance spectroscopy was performed using a frequency response analyzer 1400 (model name) produced by AMETEK, Inc. and potentio-galvanostat 1470E (model name) produced by AMETEK, Inc. The impedance was measured from a voltage/current response signal by applying an AC signal while changing the frequency 1000 kHz to 0.01 Hz. A value intersecting with an abscissa of a complex impedance plot (cole-cole plot) was obtained as a bulk resistance, and a value obtained by adding the bulk resistance to a width of an arc of the high frequency side was obtained as an internal resistance. In addition, all the resistance values were obtained using a value of a real part (abscissa). Furthermore, an amplitude of the applied AC voltage was set to "±5 mV". Furthermore, the battery ambient temperature at the time of measurement of electrochemical impedance spectroscopy was set to −30° C., and the measurement started after 1.5 hours from each temperature setting. The following values were calculated from such results. Table 25 shows the experimental results.

TABLE 24

| | Aging voltage [V] | Aging temperature [° C.] | Aging time [h] |
|---|---|---|---|
| Example 106 | 3.5 | 40.0 | 36 |
| Example 107 | 2.8 | 50.0 | 48 |
| Example 108 | 3.1 | 55.0 | 6 |
| Comparative Example 104 | — | — | — |
| Comparative Example 105 | — | — | — |
| Comparative Example 106 | 3.8 | 85.0 | 12 |

TABLE 25

| | —N═, —NH$_4$, —N═O, C—N—N—C, —(NO$_3$) [atomic %] | Bulk resistance (Ω) | | Bulk resistance/ internal resistance | Capacity retention rate in 50° C. cycle test [%] |
|---|---|---|---|---|---|
| | | Bulk resistance (−30° C.) | Internal resistance (−30° C.) | | |
| Example 106 | 5.5 | 0.06 | 1.30 | 0.05 | 80 |
| Example 107 | 13.4 | 0.06 | 1.25 | 0.05 | 83 |
| Example 108 | 7.9 | 0.07 | 1.29 | 0.05 | 84 |
| Comparative Example 104 | 0.2 | 0.07 | 2.59 | 0.03 | 73 |
| Comparative Example 105 | 0.4 | 0.08 | 2.10 | 0.04 | 75 |
| Comparative Example 106 | 24.5 | 0.10 | 4.98 | 0.02 | 39 |

On the basis of this experimental result, it was preferable that the non-aqueous secondary battery contains a compound having at least one functional group selected from a group consisting of —N═, —NH$_4$, —N═O, —NH—NH—, and (NO$_3$)—, and the value obtained by dividing the bulk resistance by the internal resistance value in the measurement of electrochemical impedance spectroscopy at a temperature of −30° C. has a range of 0.05 to 0.7.

In this example, it was recognized that a capacity retention rate of 80% or higher can be obtained in the 50° C. cycle test.

In this example, an X-ray photoelectron spectroscopy (XPS) analysis was performed for a surface portion of the positive electrode in the battery. As an XPS analyzer, Versa Probell produced by ULVAC-PHI, Inc. was employed. As an analysis condition, an excitation source was set to mono. AlKα 15kV×3.3 mA, an analysis size was set to approximately 200 μm diameter, and a photoelectron emission angle was set to 45°±20°. In addition, the measurement sample was disassembled from the battery before the test, and the obtained electrode was immersed in acetonitrile for approximately one minute to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box (a dew point of −60° C. or lower). The sample was delivered to the XPS device without exposure to the atmosphere using a dedicated tool. A relative element concentration of each element was obtained using the area intensity of each obtained peak (C1S, O1s, F1s, P2p, N1s, S2p, Li1s, Mn3p, Ni3p, and Co3p) and a relative sensitivity coefficient of the device. Here, peak splitting was performed on the N1s spectrum observed at approximately 394 to 408 eV to derive the area intensity, so that an N—concentration was obtained. In addition, within the aforementioned peak range, the peaks observed at approximately 399 eV to 400 eV have —NH$_4$, —NH—NH—, (NO$_3$)—, and —N=O bonds. The "atomic %" shown in Table 25 refers to an oxygen concentration in atomic % when peak splitting of the photoelectron spectrum is performed.

In this example, it was defined that the positive electrode of the battery preferably contains a compound containing at least functional group selected from a group consisting of —N=, —NH$_4$, —N=O, —NH—NH—, and (NO$_3$)— by 0.5 to 20 atomic %. This is based on the value obtained by dividing the bulk resistance by the internal resistance and the result of the 50° C. cycle test in Examples 106 to 108 and Comparative Examples 104 to 106.

On the basis of the experimental results of Examples 106 to 108, it was preferable that the positive electrode of the battery contains a compound containing at least one functional group selected from a group consisting of —N=, —NH$_4$, —N=O, —NH—NH—, and (NO$_3$)— by 0.5 to 20 atomic %, and there is a thermal history of 40° C. or higher at the initial charging. In this manner, if the component of the positive electrode film has a compound containing at least one functional group selected from a group consisting of —N=, —NH$_4$, —N=O, —NH—NH—, and (NO$_3$)—, it is possible to suppress elution of metal derived from the positive-electrode active material and improve a cycle life and safety.

Examples of the thirty third and thirty fifth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 26. Note that, in Table 26, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "LiPO$_2$F$_2$" denotes lithium difluorophosphate, "SAH" denotes succinic anhydride, "MAH" denotes maleic anhydride, "PAH" denotes phthalic anhydride, and "MBTA" denotes 1-methyl-1H-benzotriazole.

Preparation was performed such that each component other than the lithium salts and the additives is a non-aqueous solvent, and a total amount of each non-aqueous solvent becomes "1 L". The content of lithium salt is a molar quantity with respect to the non-aqueous solvent of 1 L.

TABLE 26

| | Solvent | | | | | | Lithium salt | | Additive |
|---|---|---|---|---|---|---|---|---|---|
| | | | | | | | LiPF$_6$ | Imide salt | Nitrogen-containing |
| | AcN (vol %) | DEC (vol %) | EMC (vol %) | DMC (vol %) | EC (vol %) | VC (vol %) | (mol/1 L solvent) | Type / Content (mol/1 L solvent) | compound (mass %) |
| Example 109 | 41 | 30 | 0 | 0 | 27 | 2 | 0.4 | LiN(SO$_2$F)$_2$ / 1.0 | — |
| Example 110 | 60 | 0 | 22 | 0 | 15 | 3 | 0.6 | LiN(SO$_2$CF$_3$)$_2$ / 0.6 | MBTA 0.2 |
| Example 111 | 51 | 0 | 22 | 0 | 25 | 2 | 0.3 | LiN(SO$_2$F)$_2$ / 1.0 | — |
| Comparative Example 107 | 0 | 0 | 67 | 0 | 30 | 3 | 1.0 | — / — | — |
| Comparative Example 108 | 0 | 72 | 0 | 0 | 25 | 3 | 1.3 | — / — | — |
| Comparative Example 109 | 0 | 39 | 0 | 30 | 28 | 3 | 1.2 | — / — | — |

| | Additive | | | | | | | | |
|---|---|---|---|---|---|---|---|---|---|
| | Cyclic acid anhydride (mass %) | LiPO$_2$F$_2$ (ppm) | Battery type | Positive-electrode active material | Positive electrode current collector | Negative-electrode active material | Negative electrode current collector | Separator |
| Example 109 | PAH 0.2 | 3000 | Layered laminate cell | LiNi$_{0.5}$Mn$_{0.3}$Co$_{0.2}$O$_2$ | Aluminum foil | Graphite | Copper foil | Polyethylene microporous membrane |
| Example 110 | MAH 0.15 | 1000 | Layered laminate cell | LiNi$_{0.5}$Mn$_{0.3}$Co$_{0.2}$O$_2$ | Aluminum foil | Graphite | Copper foil | Polyethylene microporous membrane |
| Example 111 | SAH 0.3 | 3000 | Layered laminate cell | LiNi$_{0.5}$Mn$_{0.3}$Co$_{0.2}$O$_2$ | Aluminum foil | Graphite | Copper foil | Polyethylene microporous membrane |
| Comparative Example 107 | — | — | Layered laminate cell | LiNi$_{0.5}$Mn$_{0.3}$Co$_{0.2}$O$_2$ | Aluminum foil | Graphite | Copper foil | Polyethylene microporous membrane |

TABLE 26-continued

| | | | | | | | | |
|---|---|---|---|---|---|---|---|---|
| Comparative Example 108 | — | — | Layered laminate cell | $LiNi_{0.5}Mn_{0.3}Co_{0.2}O_2$ | Aluminum foil | Graphite | Copper foil | Polyethylene microporous membrane |
| Comparative Example 109 | — | — | Layered laminate cell | $LiNi_{0.5}Mn_{0.3}Co_{0.2}O_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=5/3/2 (element ratio)) as the positive-electrode active material, graphite carbon powder (density: 2.26 g/cm³) having a number average particle diameter of 6.5 μm and acetylene black powder (density: 1.95 g/cm³) having a number average particle diameter of 48 nm as the conductive aid, and polyvinylidene fluoride (PVdF, density: 1.75 g/cm³) as the binder were mixed at a mass ratio of "100: 4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 12.8 mg/cm², and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm³, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm³) having a number average particle diameter of 12.7 μm and graphite carbon powder (density: 2.27 g/cm³) having a number average particle diameter of 6.5 μm as the negative-electrode active material, a carboxymethyl cellulose (density: 1.60 g/cm³) solution (solid content concentration: 1.83 mass %) as the binder, and diene-based rubber (glass transition temperature: −5° C., number average particle diameter when dried: 120 nm, density: 1.00 g/cm³, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 5.4 mg/cm², and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.50 g/cm³, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply also referred to as "multi-layered laminate-type battery") was manufactured.

The multi-layered laminate-type battery has a design capacity value of approximately 1.5 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Subsequently, the measurement of electrochemical impedance spectroscopy (−30° C.) and the 50° C. cycle test were performed. Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

<Measurement of Electrochemical Impedance Spectroscopy>

For the battery subjected to the initial charging/discharging treatment using the method described above in the chapter (2-1), the measurement of electrochemical impedance spectroscopy was performed. The measurement of electrochemical impedance spectroscopy was performed using a frequency response analyzer 1400 (model name) produced by AMETEK, Inc. and potentio-galvanostat 1470E (model name) produced by AMETEK, Inc. The impedance was measured from a voltage/current response signal by applying an AC signal while changing the frequency 1000 kHz to 0.01 Hz. A value intersecting with an abscissa of a complex impedance plot (cole-cole plot) was obtained as a bulk resistance. In addition, all the resistance values were obtained using a value of a real part (abscissa). Furthermore, an amplitude of the applied AC voltage was set to "±5 mV". Moreover, the battery ambient temperature at the time of measurement of electrochemical impedance spectroscopy was set to 25° C. and −30° C., and the measurement started after 1.5 hours from each temperature setting. The following values of Table 27 were calculated from such results.

TABLE 27

| | Bulk resistance (Ω) (−25° C.) | Bulk resistance (Ω) (−30° C.) |
|---|---|---|
| Example 109 | 0.021 | 0.06 |
| Example 110 | 0.023 | 0.07 |
| Example 111 | 0.020 | 0.06 |
| Comparative Example 107 | 0.031 | 0.09 |
| Comparative Example 108 | 0.033 | 0.10 |
| Comparative Example 109 | 0.030 | 0.11 |

On the basis of this experimental result, it was preferable that the negative-electrode active material layer contains a compound containing at least one selected from a group consisting of imide salt and $(SO_4)^{2-}$, the imide salt is at least one selected from a group consisting of lithium salt and onium salt, and the non-aqueous secondary battery has a bulk resistance of 0.025 ohm or smaller at a temperature of 25° C. in the measurement of electrochemical impedance spectroscopy. As a result, a decomposition product derived from the imide salt forms a film on the negative-electrode active material layer, so that it is possible to improve durability of acetonitrile. Furthermore, since the bulk resistance at a temperature of 25° C. is 0.025 ohm or smaller, it is possible to obtain both high output power and high durability.

On the basis of the examples and the comparative examples, it is preferable that the negative-electrode active material layer contains a compound containing at least one selected from a group consisting of imide salt and $(SO_4)^{2-}$, the imide salt is at least one selected from a group consisting of lithium salt and onium salt, and the non-aqueous secondary battery has a bulk resistance of 0.07 ohm or smaller at a temperature of −30° C. in the measurement of electrochemical impedance spectroscopy. As a result, a decomposition product derived from the imide salt forms a film on the negative-electrode active material layer, so that it is possible to obtain a film having a small interface resistance. Furthermore, since the bulk resistance at a temperature of −30° C. is 0.07 ohm or smaller, it is possible to provide a secondary battery having very excellent balance between a lithium ion diffusion reaction and an interface reaction and high low-temperature performance.

On the basis of Examples 109 to 111, it was preferable that a film formed of $LiPO_2F_2$ and cyclic acid anhydride is formed on the surface of the negative-electrode active material. As a result, it is possible to suppress an increase of the resistance in a low temperature range.

An example of the thirty fourth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 28. Note that, in Table 28, "AcN" denotes acetonitrile, "DEC" denotes diethyl carbonate, "EMC" denotes ethyl methyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "$LiPO_2F_2$" denotes lithium difluorophosphate, "SAH" denotes succinic anhydride, "MAH" denotes maleic anhydride, and "PAH" denotes phthalic anhydride.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 28

| | Solvent | | | | | Lithium salt | | | Additive |
|---|---|---|---|---|---|---|---|---|---|
| | | | | | | $LiPF_6$ | Imide salt | | Cyclic acid anhydride |
| | AcN (vol %) | DEC (vol %) | EMC (vol %) | EC (vol %) | VC (vol %) | (mol/1 L solvent) | Type | Content (mol/1 L solvent) | (mass %) |
| Example 112 | 45 | 35 | 0 | 18 | 2 | 0.3 | $LiN(SO_2F)_2$ | 1.0 | SAH 0.2 |
| Example 113 | 46 | 0 | 35 | 17 | 2 | 0.5 | $LiN(SO_2F)_2$ | 0.6 | MAH 0.15 |
| Example 114 | 35 | 0 | 40 | 23 | 2 | 0.5 | $LiN(SO_2CF_3)_2$ | 0.6 | PAH 0.5 |
| Comparative Example 110 | 35 | 32 | 0 | 24 | 9 | 1.2 | — | — | SAH 3.0 |

TABLE 28-continued

| | | | | | | | | |
|---|---|---|---|---|---|---|---|---|
| Comparative Example 111 | 46 | 0 | 23 | 20 | 11 | 1.5 | — | — | SAH 2.5 |

| | Additive LiPO$_2$F$_2$ (ppm) | Battery type | Positive-electrode active material | Positive electrode current collector | Negative-electrode active material | Negative electrode current collector | Separator |
|---|---|---|---|---|---|---|---|
| Example 112 | 5000 | Layered laminate cell | LiNi$_{0.5}$Mn$_{0.3}$Co$_{0.2}$O$_2$ | Aluminum foil | Graphite | Copper foil | Polyethylene microporous membrane |
| Example 113 | 5000 | Layered laminate cell | LiNi$_{0.5}$Mn$_{0.3}$Co$_{0.2}$O$_2$ | Aluminum foil | Graphite and Li$_2$O powder of 0.05 mass % mixing | Copper foil | Polyethylene microporous membrane |
| Example 114 | 1000 | Layered laminate cell | LiNi$_{0.5}$Mn$_{0.3}$Co$_{0.2}$O$_2$ | Aluminum foil | Graphite | Copper foil | Polyethylene microporous membrane |
| Comparative Example 110 | — | Layered laminate cell | LiNi$_{0.5}$Mn$_{0.3}$Co$_{0.2}$O$_2$ | Aluminum foil | Graphite | Copper foil | Polyethylene microporous membrane |
| Comparative Example 111 | — | Layered laminate cell | LiNi$_{0.5}$Mn$_{0.3}$Co$_{0.2}$O$_2$ | Aluminum foil | Graphite | Copper foil | Polyethylene microporous membrane |

A non-aqueous secondary battery using the positive-electrode active material, the negative-electrode active material, the separator, and the electrolyte solution shown in Table 28 was manufactured.

<Manufacturing of Non-aqueous Electrolyte Battery>

(1-1) Fabrication of Positive Electrode

A composite oxide of lithium having a number average particle diameter of 11 μm, nickel, manganese and cobalt (Ni/Mn/Co=5/3/2 (element ratio)) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100: 4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 12.8 mg/cm$^2$, and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm$^3$, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 um as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. Note that the Li$_2$O powder mixture coat was obtained by mixing Li$_2$O powder (density: 2.01 g/cm$^3$) to match a predetermined amount described in the tables relative to a solid content mass of 100% of the slurry subjected to the slurry adjustment. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 5.4 mg/cm$^2$, and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.50 g/cm$^3$, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply also referred to as "multi-layered laminate-type battery") was manufactured.

The multi-layered laminate-type battery has a design capacity value of approximately 1.5 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Subsequently, the measurement of electrochemical impedance spectroscopy (−30° C.) and the 50° C. cycle test were performed. Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the multi-layered laminate-type battery ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

<Measurement of Electrochemical Impedance Spectroscopy>

For the battery subjected to the initial charging/discharging treatment using the method described above in the chapter (2-1), the measurement of electrochemical impedance spectroscopy was performed. The measurement of electrochemical impedance spectroscopy was performed using a frequency response analyzer 1400 (model name) produced by AMETEK, Inc. and potentio-galvanostat 1470E (model name) produced by AMETEK, Inc. The impedance was measured from a voltage/current response signal by applying an AC signal while changing the frequency 1000 kHz to 0.01 Hz. A value intersecting with an abscissa of a complex impedance plot (cole-cole plot) was obtained as a bulk resistance, and a value obtained by adding the bulk resistance to a straight line length of an arc intersecting with the abscissa of the high frequency side was obtained as an internal resistance. In addition, all the resistance values were obtained using a value of a real part (abscissa). An amplitude of the applied AC voltage was set to "±5 mV". Furthermore, the battery ambient temperature at the time of measurement of electrochemical impedance spectroscopy was set to −30° C., and the measurement started after 1.5 hours from each temperature setting. The following values were calculated from such results. In addition, the values of the following Table 29 were calculated from such results.

TABLE 29

| | Organic acid or salt thereof, $LiO_2$ [atomic %] | Bulk resistance (Ω) Bulk resistance (−30° C.) | Internal resistance (−30° C.) | Bulk resistance/ internal resistance |
|---|---|---|---|---|
| Example 112 | 15.1 | 0.06 | 1.31 | 0.05 |
| Example 113 | 24.0 | 0.06 | 1.30 | 0.05 |
| Example 114 | 21.4 | 0.06 | 1.29 | 0.05 |
| Comparative Example 110 | 39.0 | 0.08 | 2.65 | 0.03 |
| Comparative Example 111 | 40.2 | 0.08 | 3.24 | 0.02 |

In Examples 112 to 114, the value obtained by dividing the bulk resistance by the internal resistance was "0.05". From the ranges of the examples, it was defined that the value obtained by dividing the bulk resistance by the internal resistance at a temperature of −30° C. in the measurement of electrochemical impedance spectroscopy preferably has a range of 0.05 to 0.7. In addition, it was preferable that the battery contains at least one compound selected from a group consisting of organic acid (such as acetic acid, oxalic acid, and formic acid), salt thereof, acid anhydride, and $Li_2O$.

In this example, an X-ray photoelectron spectroscopy (XPS) analysis was performed for a surface portion of the negative electrode in the battery. As an XPS analyzer, Versa Probell produced by ULVAC-PHI, Inc. was employed. As an analysis condition, an excitation source was set to mono. AlKα 15kV×3.3 mA, an analysis size was set to approximately 200 μm diameter, and a photoelectron emission angle was set to 45°±20°. In addition, the measurement sample was disassembled from the battery before the test, and the obtained electrode was immersed in acetonitrile for approximately one minute to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box (a dew point of −60° C. or lower). The sample was delivered to the XPS device without exposure to the atmosphere using a dedicated tool. A relative element concentration of each element was obtained using the area intensity of each peak (C1s, O1s, F1s, P2p, N1s, S2p, Li1s, Mn3p, Ni3p, and Co3p) and a relative sensitivity coefficient of the device. Here, peak splitting was performed on the O1s spectrum observed at approximately 524 to 540 eV to derive the area intensity, so that an O—concentration was obtained. Within the aforementioned peak range, the peaks observed at approximately 528 eV have $Li_2O$, and the peaks observed at approximately 530 to 535 eV have an organic product or salt thereof. The "atomic %" shown in Table 29 refers to an oxygen concentration in atomic % when peak splitting of the photoelectron spectrum is performed.

On the basis of the examples and the comparative examples, it was preferable that the negative electrode of the battery contains at least one compound selected from a group consisting of organic acid (such as acetic acid, oxalic acid, and formic acid), salt thereof, acid anhydride, and $Li_2O$ by 1 to 35 atomic %. As a result, a negative electrode SEI having excellent ionic conductivity is formed, so that it is possible to suppress an increase of the internal resistance of the battery using the acetonitrile electrolytic solution and improve cycle performance.

On the basis of Examples 112 to 114, it was preferable that the negative electrode of the battery contains at least one compound selected from a group consisting of organic acid (such as acetic acid, oxalic acid, and formic acid), salt thereof, acid anhydride, and $Li_2O$ by 10 to 25 atomic %. As a result, an SEI having high acetonitrile resistance is formed, so that it is possible to reduce the addition amount of VC in the acetonitrile electrolytic solution. As a result, it is possible to suppress an increase of the internal resistance and improve output power performance.

An example of the thirty sixth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 30. Note that, in Table 30, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "$LiPO_2F_2$" denotes lithium difluorophosphate, "SAH" denotes succinic anhydride, "MAH" denotes maleic anhydride, "PAH" denotes phthalic anhydride, and "MBTA" denotes 1-methyl-1H-benzotriazole.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 30

| | Solvent | | | | | | Lithium salt | | Additive |
| --- | --- | --- | --- | --- | --- | --- | --- | --- | --- |
| | | | | | | | $LiPF_6$ | Imide salt | Nitrogen- containing |
| | AcN (vol %) | DEC (vol %) | EMC (vol %) | DMC (vol %) | EC (vol %) | VC (vol %) | (mol/1 L solvent) | Type | Content (mol/1 L solvent) | compound (mass %) |
| Example 115 | 45 | 35 | 0 | 0 | 16 | 4 | 0.3 | $LiN(SO_2F)_2$ | 1.3 | — |
| Example 116 | 45 | 0 | 35 | 0 | 16 | 4 | 0.4 | $LiN(SO_2F)_2$ | 1.0 | MBTA 0.2 |
| Example 117 | 35 | 0 | 40 | 0 | 21 | 4 | 0.4 | $LiN(SO_2F)_2$ | 0.9 | MBTA 0.1 |
| Example 118 | 65 | 0 | 0 | 6 | 22 | 7 | 0.6 | $LiN(SO_2CF_3)_2$ | 0.6 | Methyl succinonitrile 0.2 |
| Example 119 | 45 | 30 | 0 | 0 | 23 | 2 | 1.0 | $LiN(SO_2F)_2$ | — | MBTA 0.3 |
| Example 120 | 50 | 0 | 30 | 0 | 18 | 2 | 0.3 | $LiN(SO_2F)_2$ | 1.0 | — |
| Comparative Example 112 | 47 | 42 | 0 | 0 | 0 | 11 | 1.3 | $LiN(SO_2F)_2$ | 0.03 | — |
| Comparative Example 113 | 47 | 49 | 0 | 0 | 0 | 4 | 1.3 | $LiN(SO_2CF_3)_2$ | 0.03 | — |
| Comparative Example 114 | 47 | 49 | 0 | 0 | 0 | 4 | 0.3 | $LiN(SO_2CF_3)_2$ | 1 | MBTA 2.5 |

| | Additive | | | | | | | | |
| --- | --- | --- | --- | --- | --- | --- | --- | --- | --- |
| | Cyclic acid anhydride (mass %) | $LiPO_2F_2$ (ppm) | Battery type | Positive- electrode active material | Positive electrode current collector | Negative- electrode active material | Negative electrode current collector | Separator |
| Example 115 | SAH 0.15 | 3000 | Coin (CR2032) | $LiNi_{1/3}Mn_{1/3}Co_{1/3}O_2$ | Aluminum foil | Graphite | Copper foil | Polyethylene microporous membrane |
| Example 116 | SAH 0.3 | 1500 | Coin (CR2032) | $LiNi_{1/3}Mn_{1/3}Co_{1/3}O_2$ | Aluminum foil | Graphite | Copper foil | Polyethylene microporous membrane |
| Example 117 | MAH 0.15 | 1500 | Coin (CR2032) | $LiNi_{1/3}Mn_{1/3}Co_{1/3}O_2$ | Aluminum foil | Graphite | Copper foil | Polyethylene microporous membrane |
| Example 118 | PAH 0.2 | 500 | Coin (CR2032) | $LiNi_{1/3}Mn_{1/3}Co_{1/3}O_2$ | Aluminum foil | Graphite | Copper foil | Polyethylene microporous membrane |
| Example 119 | PAH 0.2 | 1500 | Coin (CR2032) | $LiNi_{1/3}Mn_{1/3}Co_{1/3}O_2$ | Aluminum foil | Graphite | Copper foil | Polyethylene microporous membrane |
| Example 120 | SAH 0.2 | 3000 | Coin (CR2032) | $LiNi_{1/3}Mn_{1/3}Co_{1/3}O_2$ | Aluminum foil | Graphite | Copper foil | Polyethylene microporous membrane |

TABLE 30-continued

| | | | | | | | | |
|---|---|---|---|---|---|---|---|---|
| Comparative Example 112 | MAH 0.01 | — | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 113 | SAH 0.05 | — | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 114 | SAH 2.5 | — | Coin (CR2032) | LiNi$_{1/3}$Mn$_{1/3}$Co$_{1/3}$O$_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, so that a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. Note that the Li$_2$O powder mixture coat was obtained by mixing Li$_2$O powder (density: 2.01 g/cm$^3$) to match a predetermined amount described in the tables relative to a solid content mass of 100% of the slurry subjected to the slurry adjustment. This negative electrode mixture-containing slurry was coated on one surface of a copper foil having a thickness of 10 μm and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. A polyethylene microporous membrane punched in a disk shape having a diameter of 19 mm was set thereon, and an electrolyte solution was injected by 100 μL. Then, the negative electrode obtained as described above and punched in a disk shape having a diameter of 16 mm was set thereon while the negative-electrode active material layer faces downward. In addition, a spacer and a spring were set, and then a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging treatment was performed in a respective sequence described in the examples and the comparative examples. Then, each battery was evaluated in the sequence of the chapters (2-1) and (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) 85° C. Full-Charge Storage Test for Coin Type Non-Aqueous Secondary Battery The battery subjected to the initial charging/discharging treatment (aging treatment of the initial discharging will be described in each example or comparative example) was charged with a constant current of 3 mA corresponding to "1 C" to a voltage of 4.2 V by setting the battery ambient temperature to 25° C., and was then charged with a constant voltage of 4.2 V for a total of 3 hours. Then, this non-aqueous secondary battery was stored in a thermostatic oven at a temperature of 85° C. for 4 hours. Then, the battery ambient temperature was recovered to 25° C.

(2-2) Output Power Test for Coin Type Non-Aqueous Secondary Battery

The battery subjected to the 85° C. full-charge storage test as described above in the chapter (2-1) was charged with a constant current of 3 mA corresponding to "1 C" to a voltage of 4.2 V by setting the battery ambient temperature to 25° C., and was then charged with a constant voltage of 4.2 V for a total of 3 hours. Then, the battery was discharged with a current value of 3 mA corresponding to "1 C" to a voltage of 3.0 V. Then, the charging/discharging was performed as described above by changing the current value for the constant current discharging to 15 mA corresponding to "5 C", and the following capacity retention rate was calculated.

Capacity Retention Rate=(capacity for "5 C" discharge/capacity for "1 C" discharge)×100[%]

In this example, an X-ray photoelectron spectroscopy (XPS) analysis was performed for a surface portion of the positive electrode in the battery. As an XPS analyzer, Versa Probell produced by ULVAC-PHI, Inc. was employed. As an analysis condition, an excitation source was set to mono. AlKα 15kV×3.3 mA, an analysis size was set to approximately 200 μm diameter, and a photoelectron emission angle was set to 45°±20°. In addition, the measurement sample was disassembled from the battery before the test, and the obtained electrode was immersed in acetonitrile for approximately one minute to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box (a dew point of −60° C. or lower). The sample was delivered to the XPS device without exposure to the atmosphere using a dedicated tool. A relative element concentration of each element was obtained using the area intensity of each peak (C1s, O1s, F1s, P2p, N1s, S2p, Li1s, Mn3p, Ni3p, and Co3p) and a relative sensitivity coefficient of the device. Here, peak splitting was performed on the N1s spectrum observed at approximately 394 to 408 eV to derive the area intensity and obtain the N—concentration. Within the aforementioned peak range, the peaks observed at approximately 399 to 402 eV have —NH$_4$, —NH—NH—, (NO$_3$)—, and —N=O bonds.

Note that the following Table 31 shows the aging conditions, and Table 32 shows the experimental results.

TABLE 31

| | Aging voltage [V] | Aging temperature [° C.] | Aging time [h] |
|---|---|---|---|
| Example 115 | 2.8 | 55.0 | 6 |
| Example 116 | 2.8 | 45.0 | 72 |
| Example 117 | 3.0 | 55.0 | 6 |
| Example 118 | 3.0 | 60.0 | 6 |
| Example 119 | 3.3 | 55.0 | 24 |
| Example 120 | 3.2 | 50.0 | 48 |
| Comparative Example 112 | — | — | — |
| Comparative Example 113 | 2.8 | 25.0 | 72 |
| Comparative Example 114 | 4.2 | 85.0 | 24 |

TABLE 32

| | —N=, —NH$_4$, —N=O, C—N—N—C, —(NO$_3$) [atomic %] | Capacity retention rate [%] in output power test after storage test of 85° C. and 4 h |
|---|---|---|
| Example 115 | 5.2 | 79 |
| Example 116 | 10.1 | 78 |
| Example 117 | 7.6 | 77 |
| Example 118 | 4.4 | 78 |
| Example 119 | 12.1 | 79 |
| Example 120 | 4.9 | 77 |
| Comparative Example 112 | 0.4 | 63 |
| Comparative Example 113 | 0.3 | 62 |
| Comparative Example 114 | 20.5 | 41 |

On the basis of this experimental result, it was preferable that the non-aqueous secondary battery contains a compound containing at least one functional group selected from a group consisting of —N=, —NH$_4$, —N=O, —NH—NH—, and (NO$_3$)—, and the non-aqueous secondary battery has a capacity retention rate of 70% or higher, where the capacity retention rate is calculated by dividing a 5 C discharge capacity by a 1 C discharge capacity after a storage test for 4 hours at 85° C.

It was recognized that resistance of a thermal history can be obtained because an increase of the internal resistance on the positive electrode interface is suppressed by controlling the aging condition at the time of the initial charging.

Specifically, on the basis of the examples and the comparative examples, it was preferable that a nitrogen-containing compound is contained, and aging is performed at a voltage of 3.5 V or lower at the time of the initial charging. As a result, before ionization of the transition metal derived from the positive-electrode active material, the compound containing at least a functional group selected from a group consisting of —N=, —NH$_4$, —N=O, —NH—NH—, and (NO$_3$)— can protect the surface of the positive electrode. As a result, it is possible to suppress an increase of the internal resistance over time caused by a thermal history.

In Examples 115 to 120, it was preferable that the aging temperature is set to 35° C. or higher and lower than 60° C. By applying a thermal history at a temperature lower than 60° C., the protective film can inactivate the activation point of the positive electrode surface at an early stage and suppress an increase of the internal resistance under a high temperature condition.

An example of the thirty seventh embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 33. Note that, in Table 33, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "LiPO$_2$F$_2$" denotes lithium difluorophosphate, "SAH" denotes succinic anhydride, "MAH" denotes maleic anhydride, "PAH" denotes phthalic anhydride, and "MBTA" denotes 1-methyl-1H-benzotriazole.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 33

| | Solvent | | | | | | Lithium salt | | | Additive |
| --- | --- | --- | --- | --- | --- | --- | --- | --- | --- | --- |
| | | | | | | | LiPF$_6$ | Imide salt | | Nitrogen-containing compound (mass %) |
| | AcN (vol %) | DEC (vol %) | EMC (vol %) | DMC (vol %) | EC (vol %) | VC (vol %) | (mol/1 L solvent) | Type | Content (mol/1 L solvent) | |
| Example 121 | 40 | 37 | 0 | 0 | 19 | 4 | 0.5 | LiN(SO$_2$F)$_2$ | 1.0 | — |
| Example 122 | 45 | 5 | 30 | 0 | 15 | 5 | 0.6 | LiN(SO$_2$CF$_3$)$_2$ | 0.6 | MBTA 0.2 |
| Example 123 | 29 | 0 | 35 | 11 | 21 | 4 | 0.3 | LiN(SO$_2$F)$_2$ | 1.0 | — |
| Example 124 | 65 | 0 | 0 | 9 | 20 | 6 | 0.5 | LiN(SO$_2$CF$_3$)$_2$ | 0.2 | — |
| Example 125 | 43 | 28 | 0 | 0 | 27 | 2 | 0.4 | LiN(SO$_2$F)$_2$ | 0.6 | — |
| Example 126 | 51 | 0 | 27 | 0 | 19 | 3 | 0.4 | LiN(SO2F)$_2$ | 0.7 | — |
| Comparative Example 115 | 47 | 41 | 0 | 0 | 0 | 12 | 1.2 | — | — | — |
| Comparative Example 116 | 47 | 45 | 0 | 0 | 0 | 8 | 1.2 | — | — | — |
| Comparative Example 117 | 47 | 43 | 0 | 0 | 0 | 10 | 0.5 | LiN(SO$_2$CF$_3$)$_2$ | 0.8 | — |

| | Additive | | | | | | | |
| --- | --- | --- | --- | --- | --- | --- | --- | --- |
| | Cyclic acid anhydride (mass %) | LiPO$_2$F$_2$ (ppm) | Battery type | Positive-electrode active material | Positive electrode current collector | Negative-electrode active material | Negative electrode current collector | Separator |
| Example 121 | SAH 0.15 | 500 | Coin (CR2032) | LiNi$_{1/3}$Mn$_{1/3}$Co$_{1/3}$O$_2$ | Aluminum foil | Graphite | Copper foil | Polyethylene microporous membrane |
| Example 122 | MAH 0.15 | 1000 | Coin (CR2032) | LiNi$_{1/3}$Mn$_{1/3}$Co$_{1/3}$O$_2$ | Aluminum foil | Graphite and Li2O powder of 0.05 mass % mixing | Copper foil | Polyethylene microporous membrane |
| Example 123 | MAH 0.15 | 3000 | Coin (CR2032) | LiNi$_{1/3}$Mn$_{1/3}$Co$_{1/3}$O$_2$ | Aluminum foil | Graphite | Copper foil | Polyethylene microporous membrane |
| Example 124 | PAH 0.5 | 100 | Coin (CR2032) | LiNi$_{1/3}$Mn$_{1/3}$Co$_{1/3}$O$_2$ | Aluminum foil | Graphite | Copper foil | Polyethylene microporous membrane |
| Example 125 | SAH 0.2 | 1000 | Coin (CR2032) | LiNi$_{1/3}$Mn$_{1/3}$Co$_{1/3}$O$_2$ | Aluminum foil | Graphite and Li$_2$O powder of 0.01 mass % mixing | Copper foil | Polyethylene microporous membrane |
| Example 126 | — | 500 | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 115 | MAH 3.3 | — | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 116 | SAH 5.0 | — | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 117 | PAH 2.5 | — | Coin (CR2032) | LiNi$_{1/3}$Mn$_{1/3}$Co$_{1/3}$O$_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, so that a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on one surface of a copper foil having a thickness of 10 μm and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. A polyethylene microporous membrane punched in a disk shape having a diameter of 19 mm was set thereon, and an electrolyte solution was injected by 100 μL. Then, the negative electrode obtained as described above and punched in a disk shape having a diameter of 16 mm was set thereon while the negative-electrode active material layer faces downward. In addition, a spacer and a spring were set, and then a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging treatment was performed in a respective sequence described in the examples and the comparative examples. Then, each battery was evaluated in the sequence of the chapters (2-1) and (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) 85° C. Full-Charge Storage Test for Coin Type Non-Aqueous Secondary Battery The battery subjected to the initial charging/discharging treatment (aging treatment of the initial discharging will be described in each example or comparative example) was charged with a constant current of 3 mA corresponding to "1 C" to a voltage of 4.2 V by setting the battery ambient temperature to 25° C., and was then charged with a constant voltage of 4.2 V for a total of 3 hours. Then, this non-aqueous secondary battery was stored in a thermostatic oven at a temperature of 85° C. for 4 hours. Then, the battery ambient temperature was recovered to 25° C.

(2-2) Output Power Test for Coin Type Non-Aqueous Secondary Battery

The battery subjected to the 85° C. full-charge storage test as described above in the chapter (2-1) was charged with a constant current of 3 mA corresponding to "1 C" to a voltage of 4.2 V by setting the battery ambient temperature to 25° C., and was then charged with a constant voltage of 4.2 V for a total of 3 hours. Then, the battery was discharged with a current value of 3 mA corresponding to "1 C" to a voltage of 3.0 V. Then, the charging/discharging was performed as described above by changing the current value for the constant current discharging to 15 mA corresponding to "5 C", and the following capacity retention rate was calculated.

Capacity Retention Rate=(capacity for "5 C" discharge/capacity for "1 C" discharge)×100[%]

In this example, an X-ray photoelectron spectroscopy (XPS) analysis was performed for a surface portion of the negative electrode in the battery. As an XPS analyzer, Versa Probell produced by ULVAC-PHI, Inc. was employed. As an analysis condition, an excitation source was set to mono. AlKα 15kV×3.3 mA, an analysis size was set to approximately 200 μm diameter, and a photoelectron emission angle was set to 45°±20°. In addition, the measurement sample was disassembled from the battery before the test, and the obtained electrode was immersed in acetonitrile for approximately one minute to wash the electrolyte solution adhering to the sample. Then, the sample was air-dried for 12 hours. The dried sample was cut into small pieces of 3 mm square and was used as an XPS analysis sample. A series of operations for sample fabrication was carried out in an argon glove box (a dew point of −60° C. or lower). The sample was delivered to the XPS device without exposure to the atmosphere using a dedicated tool. A relative element concentration of each element was obtained using the area intensity of each peak (C1s, O1s, F1s, P2p, N1s, S2p, Li1s, Mn3p, Ni3p, and Co3p) and a relative sensitivity coefficient of the device. Here, peak splitting was performed on the O1s spectrum observed at approximately 524 to 540 eV to derive the area intensity and obtain the 0-concentration. Within the aforementioned peak range, the peaks observed at approximately 528 eV have Li$_2$O, and the peaks observed at approximately 530 to 535 eV have an organic product or salt thereof.

Note that the following Table 34 shows the aging conditions, and Table 35 shows the experimental results.

TABLE 34

|  | Aging voltage [V] | Aging temperature [° C.] | Aging time [h] |
| --- | --- | --- | --- |
| Example 121 | 2.8 | 55.0 | 6 |
| Example 122 | 2.8 | 45.0 | 72 |
| Example 123 | 3.0 | 55.0 | 6 |
| Example 124 | 3.0 | 60.0 | 6 |
| Example 125 | 3.3 | 55.0 | 24 |
| Example 126 | 3.2 | 50.0 | 48 |
| Comparative Example 115 | — | — | — |
| Comparative Example 116 | 2.8 | 25.0 | 72 |
| Comparative Example 117 | 4.2 | 85.0 | 24 |

TABLE 35

|  | Organic acid or salt thereof, Li2O [atomic %] | Capacity retention rate [%] in ouput power test after storage test of 85° C. and 4 h |
| --- | --- | --- |
| Example 121 | 15.1 | 82 |
| Example 122 | 22.3 | 79 |
| Example 123 | 23.6 | 75 |
| Example 124 | 26.9 | 80 |
| Example 125 | 18.4 | 77 |
| Example 126 | 17.9 | 75 |
| Comparative Example 115 | 38.0 | 55 |
| Comparative Example 116 | 39.5 | 38 |
| Comparative Example 117 | 41.1 | 49 |

On the basis of this experimental result, it was preferable that the non-aqueous secondary battery contains at least a compound selected from a group consisting of organic acid, salt thereof, acid anhydride, and $Li_2O$, the organic acid contains at least one selected from a group consisting of acetic acid, oxalic acid, and formic acid, and the non-aqueous secondary battery has a capacity retention rate of 70% or higher, where the capacity retention rate is calculated by dividing a 5 C discharge capacity by a 1 C discharge capacity after a storage test for 4 hours at 85° C.

It was recognized that resistance of a thermal history can be obtained because an increase of the internal resistance is suppressed by controlling the aging condition at the time of the initial charging.

Specifically, on the basis of the examples and the comparative examples, it was preferable that cyclic acid anhydride is contained, and aging is performed at a voltage of 3.5 V or lower at the time of the initial charging. As a result, since the negative electrode SEI film contains at least a compound selected from a group consisting of organic acid (such as acetic acid, oxalic acid, or formic acid), salt thereof, acid anhydride, and $Li_2O$, it is possible to suppress an increase of the internal resistance over time caused by a thermal history.

In Examples 121 to 126, it was preferable that the aging temperature is set to 35° C. or higher and lower than 60° C. It is possible to suppress thermal decomposition of $LiPF_6$ generated at a temperature of 60° C. or higher.

An example of the thirty eighth embodiment will now be described.

<Preparation of Electrolyte Solution>

Example 127

Acetonitrile (AcN), ethyl methyl carbonate (EMC), ethylene carbonate (EC), and vinylene carbonate (VC) were mixed under an inert atmosphere at a volume ratio of "45:36:16:3" to obtain a mixed solvent. In addition, succinic anhydride (SAH) was dissolved in this mixed solvent finally up to 0.18 mass % as an electrolyte solution.

Then, $LiPF_6$ of 0.5 mol, lithium bis (fluorosulfonyl) imide ($LiN(SO_2F)_2$) of 1.0 mol, and $LiPO_2F_2$ of 3000 ppm were added per 1 L of the mixed solvent, so as to obtain an electrolyte solution of Example 127. In this case, the electrolyte solution was produced by receiving only the thermal history of 50° C. or lower. For the obtained electrolyte solution, it was visually inspected that all of the lithium salts are dissolved.

Example 128

Acetonitrile (AcN), ethyl methyl carbonate (EMC), ethylene carbonate (EC), and vinylene carbonate (VC) were mixed under an inert atmosphere at a volume ratio of "55:25:16:4" to obtain a mixed solvent. In addition, succinic anhydride (SAH) was dissolved in this mixed solvent finally up to 0.12 mass % as an electrolyte solution. Furthermore, 1-methyl-1H-benzotriazole (MBTA) was dissolved in this mixed solvent finally up to 0.3 mass % as an electrolyte solution. In this case, the temperature of the mixed liquid was 30° C. Then, $LiPF_6$ of 0.3 mol, lithium bis (fluorosulfonyl) imide ($LiN(SO_2F)_2$) of 0.7 mol, and $LiPO_2F_2$ of 3000 ppm were added per 1 L of the mixed solvent, so that an electrolyte solution of Example 128 was obtained. In this case, the electrolyte solution was produced by receiving only the thermal history of 50° C. or lower. For the obtained electrolyte solution, it was visually inspected that all of the lithium salts are dissolved.

Example 129

Acetonitrile (AcN), ethyl methyl carbonate (EMC), ethylene carbonate (EC), and vinylene carbonate (VC) were mixed under an inert atmosphere at a volume ratio of "31:45:21:3" to obtain a mixed solvent. In addition, maleic anhydride (MAH) was dissolved in this mixed solvent finally up to 0.1 mass % as an electrolyte solution. Then, $LiPF_6$ of 0.5 mol, lithium bis (fluorosulfonyl) imide ($LiN(SO_2F)_2$) of 0.6 mol, and $LiPO_2F_2$ of 5000 ppm were added per 1 L of the mixed solvent, so that an electrolyte solution of Example 129 was obtained. In this case, the electrolyte solution was produced by receiving only the thermal history of 50° C. or lower. For the obtained electrolyte solution, it was visually inspected that all of the lithium salts are dissolved.

Example 130

Acetonitrile (AcN), dimethyl carbonate (DMC), ethylene carbonate (EC), and vinylene carbonate (VC) were mixed under an inert atmosphere at a volume ratio of "65:10:22:3" to obtain a mixed solvent. In addition, phthalic anhydride (PAH) was dissolved in this mixed solvent finally up to 0.45 mass % as an electrolyte solution. Furthermore, adiponitrile was dissolved in this mixed solvent finally up to 0.2 mass % as an electrolyte solution. In this case, the temperature of the mixed liquid was 29° C. Then, $LiPF_6$ of 0.6 mol, lithium bis (fluorosulfonyl) imide ($LiN(SO_2F)_2$) of 0.6 mol, and $LiPO_2F_2$ of 50 ppm were added per 1 L of the mixed solvent, so that an electrolyte solution of Example 130 was obtained. In this case, the temperature of the electrolyte solution was 41° C., and the electrolyte solution was produced by receiving only the thermal history of 50° C. or lower. For the obtained electrolyte solution, it was visually inspected that all of the lithium salts are dissolved.

Comparative Example 116

Acetonitrile (AcN), ethyl methyl carbonate (EMC), ethylene carbonate (EC), and vinylene carbonate (VC) were mixed under an inert atmosphere at a volume ratio of "45:35:17:3" to obtain a mixed solvent. In this case, the temperature of the mixed solvent was 30° C. Then, succinic anhydride (SAH) of 0.02 mass % and LiPF$_6$ of 1.3 mol were added, and 1-methyl-1H-benzotriazole (MBTA) of 0.02 mass % was dissolved, so as to obtain an electrolyte solution of Comparative Example 116. In this case, the temperature of the electrolyte solution was 63° C., and the electrolyte solution was produced by receiving a thermal history of 50° C. or higher. For the obtained electrolyte solution, it was visually inspected that all of the lithium salts are dissolved.

Comparative Example 117

Acetonitrile (AcN), diethyl carbonate (DEC), and vinylene carbonate (VC) were mixed under an inert atmosphere at a volume ratio of "41:48:11" to obtain a mixed solvent. Furthermore, adiponitrile was dissolved in this mixed solvent finally up to 3 mass % as an electrolyte solution. In this case, the temperature of the mixed solvent was 30° C. Moreover, LiPF$_6$ of 2.0 mol was added, so that an electrolyte solution of Comparative Example 117 was obtained. In this case, the temperature of the electrolyte solution was 68° C., and the electrolyte solution was produced by receiving a thermal history of 50° C. or higher. For the obtained electrolyte solution, it was visually inspected that all of the lithium salts are dissolved.

Compositions of each non-aqueous electrolyte solution of Examples 127 to 130 and Comparative Examples 116 and 117 are shown in Table 36. Note that, in Table 36, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, "LiN(SO$_2$CF$_3$)$_2$" denotes lithium bis(trifluoromethane sulfonyl) imide, "LiPO$_2$F$_2$" denotes lithium difluorophosphate, "SAH" denotes succinic anhydride, "MAH" denotes maleic anhydride, "PAH" denotes phthalic anhydride, and "MBTA" denotes 1-methyl-1H-benzotriazole. Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 36

| | Solvent | | | | | | Lithium salt | | Additive | |
|---|---|---|---|---|---|---|---|---|---|---|
| | | | | | | | LiPF$_6$ | Imide salt | Nitrogen-containing | Cyclic acid |
| | AcN (vol %) | DEC (vol %) | EMC (vol %) | DMC (vol %) | EC (vol %) | VC (vol %) | (mol/1 L solvent) | Type | Content (mol/1 L solvent) | compound (mass %) | anhydride (mass %) |
| Example 127 | 45 | 0 | 36 | 0 | 16 | 3 | 0.5 | LiN(SO$_2$F)$_2$ | 1.0 | — | SAH 0.18 |
| Example 128 | 55 | 0 | 25 | 0 | 16 | 4 | 0.3 | LiN(SO$_2$F)$_2$ | 0.7 | MBTA 0.3 | SAH 0.12 |
| Example 129 | 36 | 0 | 45 | 0 | 21 | 3 | 0.5 | LiN(SO$_2$F)$_2$ | 0.6 | — | MAH 0.1 |
| Example 130 | 51 | 0 | 0 | 10 | 22 | 3 | 0.6 | LiN(SO$_2$F)$_2$ | 0.6 | Adiponitrile 0.2 | PAH 0.45 |
| Comparative Example 116 | 45 | 0 | 35 | 0 | 17 | 3 | 1.3 | — | — | MBTA 0.02 | SAH 0.02 |
| Comparative Example 117 | 41 | 48 | 0 | 0 | 0 | 11 | 2.0 | — | — | Adiponitrile 3.0 | — |

| | Additive | | | Positive-electrode | Positive electrode | Negative-electrode | Negative electrode | |
|---|---|---|---|---|---|---|---|---|
| | LiPO$_2$F$_2$ (ppm) | Thermal history | Battery type | active material | current collector | active material | current collector | Separator |
| Example 127 | 3000 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Example 128 | 3000 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Example 129 | 5000 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Example 130 | 50 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |

TABLE 36-continued

| | | | | | | | | |
|---|---|---|---|---|---|---|---|---|
| Comparative Example 116 | — | >60° C. | Layered laminate cell | $LiNi_{1/3}Mn_{1/3}Co_{1/3}O_2$ | Aluminum foil | Graphite | Copper foil | Polyethylene microporous membrane |
| Comparative Example 117 | — | >60° C. | Layered laminate cell | $LiNi_{1/3}Mn_{1/3}Co_{1/3}O_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm³) as the positive-electrode active material, graphite carbon powder (density: 2.26 g/cm³) having a number average particle diameter of 6.5 μm and acetylene black powder (density: 1.95 g/cm³) having a number average particle diameter of 48 nm as the conductive aid, and polyvinylidene fluoride (PVdF, density: 1.75 g/cm³) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 11.5 mg/cm², and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm³, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm³) having a number average particle diameter of 12.7 μm and graphite carbon powder (density: 2.27 g/cm³) having a number average particle diameter of 6.5 μm as the negative-electrode active material, a carboxymethyl cellulose (density: 1.60 g/cm³) solution (solid content concentration: 1.83 mass %) as the binder, and diene-based rubber (glass transition temperature: −5° C., number average particle diameter when dried: 120 nm, density: 1.00 g/cm³, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 6.9 mg/cm², and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.30 g/cm³, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply also referred to as "multi-layered laminate-type battery") was manufactured.

This multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, a battery was manufactured using the method described in the chapters (1-1) to (1-3), and evaluation was performed in the sequence described above in the chapters (2-1) and (2-2). Finally, the ionic conductivities at each temperature were calculated in the sequence described in the chapter (2-3).

Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the multi-layered laminate-type battery ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) 85° C. Full-Charge Storage Test for Multi-Layered Laminate-Type Battery

For the battery subjected to the initial charging/discharging treatment as described above in the chapter (2-1), the battery was charged with a constant current of "1 C" to a voltage of 4.2 V by setting the battery ambient temperature to 25° C., and the battery was then charged with a constant voltage of 4.2 V for a total of 3 hours. Then, this non-aqueous secondary battery was stored in a thermostatic oven for 4 hours at 85° C. Then, the battery ambient temperature was recovered to 25° C.

(2-3) Ionic Conductivity Measurement

The electrolyte solution was put into a sealed cell (cell size: 24 mm diameter, by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to 20° C. and 0° C., and the measurement was initiated after 1.5 hours from the temperature setting. As the measurement data, data at the time point that a change of the data measured repeatedly at every 5 minutes is lower than 0.1% was employed.

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity(mS/cm)=$d/(R \cdot S)$

Here, "d" denotes a distance between electrodes (0.35 cm), and "S" denotes an area of the electrode (4.522 cm$^2$).

As the ionic conductivity, an initial ionic conductivity of the electrolyte solution and an ionic conductivity of the electrolyte solution collected in the glove box having a dew point controlled to −60° C. or lower after the 85° C. storage test were obtained at 20° C. and 0° C., respectively. The experimental results thereof are shown in Table 37.

As shown in Table 37, in the examples, it was recognized that the 0° C. ionic conductivity after the storage test for 4 hours at 85° C. is 10 mS/cm or higher.

In this example, an X-ray photoelectron spectroscopy (XPS) analysis was performed for a surface portion of the positive electrode in the battery. As an XPS analyzer, Versa Probell produced by ULVAC-PHI, Inc. was employed. As an analysis condition, an excitation source was set to mono. AlKα 15kV×3.3 mA, an analysis size was set to approximately 200 μm diameter, and a photoelectron emission angle was set to 45°±20°. In addition, the measurement sample was disassembled from the battery before the test, and the obtained electrode was immersed in acetonitrile for approximately one minute to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box (a dew point of −60° C. or lower). The sample was delivered to the XPS device without exposure to the atmosphere using a dedicated tool. A relative element concentration of each element was obtained using the area intensity of each peak (C1S, O1s, F1s, P2p, N1s, S2p, Li1s, Mn3p, Ni3p, and Co3p) and a relative sensitivity coefficient of the device. Here, peak splitting was performed on the Nis spectrum observed at approximately 394 to 408 eV to derive the area intensity, so that an N—concentration was obtained. In addition, within the aforementioned peak range, the peaks observed at approximately 399 eV to 402 eV have —NH$_4$, —NH—NH—, (NO$_3$)—, and —N=O bonds.

It was recognized that a decomposition product of the nitrogen-containing compound is suppressed by defining a mixing sequence of the non-aqueous electrolyte solution, and the non-aqueous electrolyte solution effectively functions as a protection film formation agent of the positive electrode.

On the basis of the examples and the comparative examples, it is preferable that the non-aqueous secondary battery is manufactured using the electrolyte solution containing acetonitrile and a nitrogen-containing compound. As a result, since a protection film is formed on the positive electrode, it is possible to suppress generation of HF that may cause an increase of the internal resistance.

On the basis of Examples 127 to 130, it was preferable that a temperature increase at the time of adding the nitrogen-containing compound is suppressed to 50° C. or lower. As a result, it is possible to suppress thermal decomposition of the nitrogen-containing compound generated at 60° C. or higher.

An example of the thirty ninth embodiment will now be described.

Example 131

Acetonitrile (AcN), ethyl methyl carbonate (EMC), ethylene carbonate (EC), and vinylene carbonate (VC) were mixed under an inert atmosphere at a volume ratio of "47:35:16:2" to obtain a mixed solvent. In addition, maleic anhydride (MAH) was dissolved in this mixed solvent finally up to 0.10 mass % as an electrolyte solution. Then, LiPF$_6$ of 0.3 mol, lithium bis (fluorosulfonyl) imide (LiN(SO$_2$F)$_2$) of 1.3 mol, and LiPO$_2$F$_2$ of 5000 ppm were added per 1 L of the mixed solvent, so that an electrolyte solution of Example 131 was obtained. In this case, the electrolyte solution was produced by receiving only a thermal history of

TABLE 37

| | —N=, —NH$_4$, —N=O, C—N—N—C, —(NO$_3$) [atomic %] | Initial ion conductivity [mS/cm] | | Ion conductivity after 85° C. storage test [mS/cm] | |
|---|---|---|---|---|---|
| | | 20° C. | 0° C. | 20° C. | 0° C. |
| Example 127 | 5.2 | 21.1 | 15.8 | 20.6 | 14.9 |
| Example 128 | 11.9 | 20.1 | 15.3 | 19.6 | 14.8 |
| Example 129 | 4.5 | 19.0 | 14.4 | 17.9 | 13.9 |
| Example 130 | 10.4 | 20.9 | 14.9 | 19.4 | 14.3 |
| Comparative Example 116 | 0.2 | 19.2 | 15.3 | 18.0 | 9.4 |
| Comparative Example 117 | 25.1 | 16.9 | 14.2 | 15.8 | 9.2 |

50° C. or lower. For the obtained electrolyte solution, it was visually inspected that all of the lithium salts are dissolved.

Example 132

Acetonitrile (AcN), ethyl methyl carbonate (EMC), ethylene carbonate (EC), and vinylene carbonate (VC) were mixed under an inert atmosphere at a volume ratio of "45:36:16:3" to obtain a mixed solvent. In addition, succinic anhydride (SAH) was dissolved in this mixed solvent finally up to 0.30 mass % as an electrolyte solution. Then, $LiPF_6$ of 0.5 mol, lithium bis (fluorosulfonyl) imide ($LiN(SO_2F)_2$) of 0.8 mol, and $LiPO_2F_2$ of 2000 ppm were added per 1 L of the mixed solvent, so that an electrolyte solution of Example 132 was obtained. In this case, the temperature of the electrolyte solution is 43° C., and the electrolyte solution was produced by receiving only the thermal history of 50° C. or lower. For the obtained electrolyte solution, it was visually inspected that all of the lithium salts are dissolved.

Example 133

Acetonitrile (AcN), ethyl methyl carbonate (EMC), ethylene carbonate (EC), and vinylene carbonate (VC) were mixed under an inert atmosphere at a volume ratio of "36:40:20:4" to obtain a mixed solvent. In addition, maleic anhydride (MAH) was dissolved in this mixed solvent finally up to 0.2 mass % as an electrolyte solution. Then, $LiPF_6$ of 0.3 mol, lithium bis (fluorosulfonyl) imide ($LiN(SO_2F)_2$) of 0.6 mol, and $LiPO_2F_2$ of 2000 ppm were added per 1 L of the mixed solvent, and 1-methyl-1H-benzotriazole (MBTA) of 0.35 mass % were dissolved, so that an electrolyte solution of Example 133 was obtained. In this case, the electrolyte solution was produced by receiving only the thermal history of 50° C. or lower. For the obtained electrolyte solution, it was visually inspected that all of the lithium salts are dissolved.

Example 134

Acetonitrile (AcN), dimethyl carbonate (DMC), ethylene carbonate (EC), and vinylene carbonate (VC) were mixed under an inert atmosphere at a volume ratio of "63:10:22:5" to obtain a mixed solvent. In addition, phthalic anhydride (PAH) was dissolved in this mixed solvent finally up to 0.5 mass % as an electrolyte solution. Then, $LiPF_6$ of 0.6 mol, lithium bis (fluorosulfonyl) imide ($LiN(SO_2F)_2$) of 0.6 mol, and $LiPO_2F_2$ of 100 ppm were added per 1 L of the mixed solvent, so that an electrolyte solution of Example 134 was obtained. In this case, the electrolyte solution was produced by receiving only the thermal history of 50° C. or lower. For the obtained electrolyte solution, it was visually inspected that all of the lithium salts are dissolved.

Comparative Example 118

Acetonitrile (AcN), ethyl methyl carbonate (EMC), ethylene carbonate (EC), and vinylene carbonate (VC) were mixed under an inert atmosphere at a volume ratio of "45:35:16:4" to obtain a mixed solvent. In this case, the temperature of the mixed solvent was 30° C. Then, phthalic anhydride (PAH) of 2.5 mass % was dissolved. Furthermore, $LiPF_6$ of 1.3 mol was added per 1 L of the mixed solvent, so that an electrolyte solution of Example 118 was obtained. In this case, the temperature of the electrolyte solution was 63° C., and the electrolyte solution was produced by receiving a thermal history of 50° C. or higher. For the obtained electrolyte solution, it was visually inspected that all of the lithium salts are dissolved.

Comparative Example 119

Acetonitrile (AcN), diethyl carbonate (DEC), and vinylene carbonate (VC) were mixed under an inert atmosphere at a volume ratio of "47:42:11" to obtain a mixed solvent. In this case, the temperature of the mixed solvent was 30° C. Then, maleic anhydride (MAH) of 2.0 mass % was dissolved. Furthermore, $LiPF_6$ of 2.0 mol was added per 1 L of this mixed solvent, so that an electrolyte solution of Comparative Example 119 was obtained. In this case, the temperature of the electrolyte solution was 63° C., and the electrolyte solution was produced by receiving a thermal history of 50° C. or higher. For the obtained electrolyte solution, it was visually inspected that all of the lithium salts are dissolved.

Compositions of each non-aqueous electrolyte solution of Examples 131 to 134 and Comparative Examples 118 and 119 are shown in Table 38. Note that, in Table 38, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "$LiPO_2F_2$" denotes lithium difluorophosphate, "SAH" denotes succinic anhydride, "MAH" denotes maleic anhydride, "PAH" denotes phthalic anhydride, and "MBTA" denotes 1-methyl-1H-benzotriazole.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

TABLE 38

| | Solvent | | | | | | Lithium salt | | Additive | |
|---|---|---|---|---|---|---|---|---|---|---|
| | | | | | | | | Imide salt | | Nitrogen- | Cyclic |
| | | | | | | | $LiPF_6$ | | Content | containing | acid |
| | AcN (vol %) | DEC (vol %) | EMC (vol %) | DMC (vol %) | EC (vol %) | VC (vol %) | (mol/1 L solvent) | Type | (mol/1 L solvent) | compound (mass %) | anhydride (mass %) |
| Example 131 | 47 | 0 | 35 | 0 | 16 | 2 | 0.3 | $LiN(SO_2F)_2$ | 1.3 | — | MAH 0.10 |
| Example 132 | 45 | 0 | 36 | 0 | 16 | 3 | 0.5 | $LiN(SO_2F)_2$ | 0.8 | — | SAH 0.30 |

TABLE 38-continued

| | | | | | | | | | | |
|---|---|---|---|---|---|---|---|---|---|---|
| Example 133 | 36 | 0 | 40 | 0 | 20 | 4 | 0.3 | LiN(SO$_2$F)$_2$ 0.6 | MBTA 0.35 | MAH 0.2 |
| Example 134 | 63 | 0 | 0 | 10 | 22 | 5 | 0.6 | LiN(SO$_2$F)$_2$ 0.6 | — | PAH 0.5 |
| Comparative Example 118 | 45 | 0 | 35 | 0 | 16 | 4 | 1.3 | — | — | PAH 2.5 |
| Comparative Example 119 | 47 | 42 | 0 | 0 | 0 | 11 | 2.0 | — | — | MAH 2.0 |

| | Additive LiPO$_2$F$_2$ (ppm) | Thermal history | Battery type | Positive-electrode active material | Positive electrode current collector | Negative-electrode active material | Negative electrode current collector | Separator |
|---|---|---|---|---|---|---|---|---|
| Example 131 | 5000 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Example 132 | 2000 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Example 133 | 2000 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Example 134 | 100 | ≤50° C. | Layered laminate cell | LiNi$_{1/3}$Mn$_{1/3}$Co$_{1/3}$O$_2$ | Aluminum foil | Graphite | Copper foil | Polyethylene microporous membrane |
| Comparative Example 118 | — | >60° C. | Layered laminate cell | LiNi$_{1/3}$Mn$_{1/3}$Co$_{1/3}$O$_2$ | Aluminum foil | Graphite | Copper foil | Polyethylene microporous membrane |
| Comparative Example 119 | — | >60° C. | Layered laminate cell | LiNi$_{1/3}$Mn$_{1/3}$Co$_{1/3}$O$_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 11.5 mg/cm$^2$, and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm$^3$, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm$^3$) having a number average particle diameter of 12.7 μm and graphite carbon powder (density 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature: −5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 6.9 mg/cm$^2$, and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.30 g/cm$^3$, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Layered Laminate Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply referred to as "multi-layered laminate-type battery") was manufactured.

This multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, initial charging/discharging treatment was performed in the sequence described in the chapter (2-1). Subsequently, the battery was evaluated in the sequence of the chapters (2-2) and (2-3). Furthermore, the electrolyte solution was evaluated in the sequence of the chapter (2-4).

Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) 85° C. Full-Charge Storage Test for Multi-Layered Laminate-Type Battery

For the battery subjected to the initial charging/discharging treatment as described above in the chapter (2-1), the battery was charged with a constant current of "1 C" to a voltage of 4.2 V by setting the battery ambient temperature to 25° C., and the battery was then charged with a constant voltage of 4.2 V for a total of 3 hours. Then, this non-aqueous secondary battery was stored in a thermostatic oven for 4 hours at 85° C. Then, the battery ambient temperature was recovered to 25° C.

(2-3) Ionic Conductivity Measurement

The electrolyte solution was put into a sealed cell (cell size: 24 mm diameter by 0.35 mm thickness) produced by TOYO Corporation, was sealed, and was inserted into a holder (SH1-Z), and wiring was performed.

In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The obtained data was plotted on a Nyquist diagram including real parts Z' and imaginary parts Z" of impedance.

In addition, a Z' value (R) at Z"=0 was read, and the Li ionic conductivity was obtained using the following formula.

Li ionic conductivity(mS/cm)=$d/(R \cdot S)$

Here, "d" denotes a distance between electrodes (0.35 cm), and "S" denotes an area of the electrode (4.522 cm$^2$).

As the ionic conductivity, an initial ionic conductivity of the electrolyte solution and an ionic conductivity of the electrolyte solution collected in the glove box having a dew point controlled to −60° C. or lower after the 85° C. storage test were obtained at 20° C. and 0° C., respectively. The experimental results thereof are shown in Table 39.

TABLE 39

| | Organic acid or salt thereof, LiO$_2$ | Initial ion conductivity [mS/cm] | | Ion conductivity after 85° C. storage test [mS/cm] | |
|---|---|---|---|---|---|
| | [atomic %] | 20° C. | 0° C. | 20° C. | 0° C. |
| Example 131 | 11.5 | 21.6 | 16.5 | 20.5 | 15.0 |
| Example 132 | 17.2 | 20.5 | 15.7 | 18.3 | 14.6 |
| Example 133 | 15.4 | 18.6 | 13.7 | 18.0 | 13.1 |
| Example 134 | 18.9 | 21.0 | 15.2 | 20.1 | 14.2 |
| Comparative Example 118 | 38.1 | 18.5 | 14.7 | 17.3 | 8.7 |
| Comparative Example 119 | 39.6 | 16.8 | 13.9 | 14.6 | 8.1 |

As shown in Table 39, in the examples, it was recognized that the 0° C. ionic conductivity after the storage test for 4 hours at 85° C. is 10 mS/cm or higher.

In this example, an X-ray photoelectron spectroscopy (XPS) analysis was performed for a surface portion of the negative electrode in the battery. As an XPS analyzer, Versa Probell produced by ULVAC-PHI, Inc. was employed. As an analysis condition, an excitation source was set to mono. AlKα 15kV×3.3 mA, an analysis size was set to approximately 200 μm diameter, and a photoelectron emission angle was set to 45°±20°. In addition, the measurement sample was disassembled from the battery before the test, and the obtained electrode was immersed in acetonitrile for approximately one minute to wash the electrolyte solution adhering to the sample. Then, the sample was air-dried for 12 hours. The dried sample was cut into small pieces of 3 mm square and was used as an XPS analysis sample. A series of operations for sample fabrication was carried out in an argon glove box (a dew point of −60° C. or lower). The sample was delivered to the XPS device without exposure to the atmosphere using a dedicated tool. A relative element concentration of each element was obtained using the area intensity of each peak (C1S, O1s, F1s, P2p, N1s, S2p, Li1s, Mn3p, Ni3p, and Co3p) and a relative sensitivity coefficient of the device. Here, peak splitting was performed on the O1s spectrum observed at approximately 524 to 540 eV to derive the area intensity, so that an O-concentration was obtained. In addition, within the aforementioned peak range, the peaks observed at approximately 528 eV have Li$_2$O, and the peaks observed at approximately 530 to 535 eV have an organic product or salt thereof. The "atomic %" of Table 39 refers to an oxygen concentration in atomic % when peak splitting of the photoelectron spectrum is performed.

It was recognized that a decomposition product of the LiPF$_6$ is suppressed and resistance of the thermal history can be obtained by defining a mixing sequence of the non-aqueous electrolyte solution.

On the basis of the examples and the comparative examples, it is preferable that the non-aqueous secondary battery is manufactured using the electrolyte solution obtained by adding acetonitrile and cyclic acid anhydride and then adding $LiPF_6$. As a result, it is possible to suppress an abrupt temperature increase at the timing of adding $LiPF_6$, and suppress generation of HF that may cause an increase of the internal resistance due to a sacrificial response of the cyclic acid anhydride.

On the basis of Examples 131 to 134, it was preferable that a temperature increase at the time of adding $LiPF_6$ is suppressed to 50° C. or lower. As a result, it is possible to suppress thermal decomposition of $LiPF_6$ generated at 60° C. or higher.

ole, "SAH" denotes succinic anhydride, and "$LiPO_2F_2$" denotes lithium difluorophosphate.

Preparation was performed such that each component other than the lithium salt and the additives is a non-aqueous solvent, and a total amount of each non-aqueous solvent becomes "1 L". The content of lithium salt is a molar quantity with respect to the non-aqueous solvent of 1 L.

A non-aqueous secondary battery using the positive-electrode active material, the negative-electrode active material, and electrolyte solution of Table 40 was manufactured.

TABLE 40

| | Solvent | | | | | | $LiPF_6$ | Lithium salt Imide salt | | Additive Nitrogen-containing |
|---|---|---|---|---|---|---|---|---|---|---|
| | AcN (vol %) | DEC (vol %) | EMC (vol %) | DMC (vol %) | EC (vol %) | VC (vol %) | (mol/1 L solvent) | Type | Content (mol/1 L solvent) | compound (mass %) |
| Example 135 | 51 | 24 | 0 | 0 | 21 | 4 | 0.5 | $LiN(SO_2F)_2$ | 0.6 | MBTA 0.2 |
| Example 136 | 25 | 23 | 28 | 0 | 21 | 3 | 0.3 | $LiN(SO_2F)_2$ | 1.0 | MBTA 0.4 |
| Example 137 | 60 | 0 | 0 | 18 | 18 | 4 | 0.5 | $LiN(SO_2CF_3)_2$ | 0.7 | MBTA 0.2 |
| Comparative Example 120 | 0 | 47 | 16 | 0 | 34 | 3 | 1.2 | — | — | — |
| Comparative Example 121 | 0 | 0 | 20 | 45 | 33 | 2 | 0.3 | $LiN(SO_2F)_2$ | 0.9 | — |

| | Additive | | | | | | | |
|---|---|---|---|---|---|---|---|---|
| | Cyclic acid anhydride (mass %) | $LiPO_2F_2$ (ppm) | Battery type | Positive-electrode active material | Positive electrode current collector | Negative-electrode active material | negative electrode current collector | Separator |
| Example 135 | SAH 0.1 | 5000 | Single-layered laminate | $LiNi_{0.8}Mn_{0.1}Co_{0.1}O_2$ | Aluminum foil | Black lead | Copper foil | Polyethylene microporous membrane |
| Example 136 | SAH 0.2 | 2000 | Single-layered laminate | $LiNi_{0.8}Mn_{0.1}Co_{0.1}O_2$ | Aluminum foil | Black lead | Copper foil | Polyethylene microporous membrane |
| Example 137 | SAH 0.1 | 2000 | Single-layered laminate | $LiNi_{0.8}Mn_{0.1}Co_{0.1}O_2$ | Aluminum foil | Black lead | Copper foil | Polyethylene microporous membrane |
| Comparative Example 120 | — | — | Single-layered laminate | $LiNi_{0.8}Mn_{0.1}Co_{0.1}O_2$ | Aluminum foil | Black lead | Copper foil | Polyethylene microporous membrane |
| Comparative Example 121 | — | — | Single-layered laminate | $LiNi_{0.8}Mn_{0.1}Co_{0.1}O_2$ | Aluminum foil | Black lead | Copper foil | Polyethylene microporous membrane |

An example of the fortieth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 40. Note that, in Table 40, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "MBTA" denotes 1-methyl-1H-benzotriaz- <Fabrication of Positive Electrode>

A composite oxide ($LiNi_{0.8}Mn_{0.1}Co_{0.1}O_2$) of lithium, nickel, manganese, and cobalt as the positive-electrode active material, acetylene black powder as the conductive aid, and polyvinylidene fluoride (PVDF) as the binder were mixed at a mass ratio of "100:4.3:4.3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 180 g/m². When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.80 mg/cm$^3$, so that a positive electrode having the positive-electrode active material layer and the positive electrode current collector was obtained.

Then, this positive electrode was cut such that the positive electrode mixture layer has an area of 14 mm by 20 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, acetylene black powder as the conductive aid, polyvinylidene fluoride (PVDF) as the binder were mixed at a mass ratio of "100:2.2:5.4" to obtain a negative electrode mixture. N-methyl-2-pyrrolidone as a solvent was added to the obtained negative electrode mixture, and they were further mixed to prepare negative electrode mixture-containing slurry. This slurry was coated on one surface of a copper foil having a thickness of 10 μm to a constant thickness while adjusting the basis weight to approximately 110.0 g/m$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.5 g/cm$^3$, so that a negative electrode having the negative-electrode active material layer and the negative electrode current collector was obtained.

Then, this negative electrode was cut such that the negative electrode mixture layer has an area of 15 mm by 21 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 7.5 mAh and a rated voltage value of 4.2 V.

<Evaluation of Single-Layered Laminate-Type Battery>

Each battery for evaluation obtained as described above was evaluated in the following sequence.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 2.5 V at a constant current.

<4.2V Cycle Test for Single-Layered Laminate-Type Battery>

The battery was charged to a voltage 4.2 V with a constant current of 7.5 mA corresponding to "1 C" by setting the battery ambient temperature to 25° C., and was then discharged with a constant current of 7.5 mA to a voltage of 2.7 V. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%.

<4.3V Cycle Test for Single-Layered Laminate-Type Battery>

The battery was charged to a voltage 4.3 V with a constant current of 7.5 mA corresponding to "1 C" by setting the battery ambient temperature to 25° C., and was then discharged to a voltage of 2.7 V with a constant current of 7.5 mA. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%. The experimental results thereof are shown in Table 41.

TABLE 41

|  | Capacity retention rate in 4.2 V cycle test | Capacity retention rate in 4.3 V cycle test |
| --- | --- | --- |
| Example 135 | 99% | 94% |
| Example 136 | 99% | 94% |
| Example 137 | 98% | 93% |
| Comparative Example 120 | 38% | 55% |
| Comparative Example 121 | 39% | 57% |

In the examples, it was recognized that the capacity retention rate of the hundredth cycle is 90% or higher, and a high capacity retention rate is maintained.

On the basis of the experimental results of these examples and comparative examples, it was preferable that the non-aqueous secondary battery includes a positive electrode having a positive-electrode active material layer formed on one or both sides of a current collector, a negative electrode having a negative-electrode active material layer formed on one or both sides of a current collector, and a non-aqueous electrolyte solution containing acetonitrile and lithium salt. As a result, since the electrolyte solution containing acetonitrile and a nitrogen-containing compound is employed, an increase of the internal resistance caused by the electrolyte solution is negligible even when a high-voltage charging/discharging cycle is performed. In particular, it is possible to suppress an increase of the interface resistance.

On the basis of these examples and comparative examples, it was preferable that the content of the nickel element in the positive-electrode active material is more than 50%. Using the electrolyte solution containing acetonitrile and the nitrogen-containing compound, it is possible to suppress capacity degradation caused by an unstable crystal structure even when the nickel content increases.

On the basis of Examples 135 to 137, in the non-aqueous secondary battery obtained by using the high nickel positive electrode as the positive-electrode active material, it was preferable that the charging voltage is set to 4.3 V or higher. As a result, it is possible to set the design capacity to 150 Ah/L or larger.

Next, an example of the forty first embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 42. Note that, in Table 42, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "MBTA" denotes 1-methyl-1H-benzotriazole, "LiPO$_2$F$_2$" denotes lithium difluorophosphate, "SAH" denotes succinic anhydride, "MAH" denotes maleic anhydride, "PAH" denotes phthalic anhydride, and "LiPO$_2$F$_2$" denotes lithium difluorophosphate.

Preparation was performed such that each component other than lithium salts and additives is a non-aqueous solvent, and a total amount of each non-aqueous solvent becomes "1 L".

TABLE 42

| | Solvent | | | | | | LiPF$_6$ | Lithium salt Imide salt | | Additive Nitrogen-containing |
|---|---|---|---|---|---|---|---|---|---|---|
| | AcN (vol %) | DEC (vol %) | EMC (vol %) | DMC (vol %) | EC (vol %) | VC (vol %) | (mol/1 L solvent) | Type | Content (mol/1 L solvent) | compound (mass %) |
| Example 138 | 45 | 30 | 0 | 0 | 21 | 4 | 0.7 | LiN(SO$_2$CF$_3$)$_2$ | 0.3 | — |
| Example 139 | 47 | 28 | 0 | 0 | 21 | 4 | 0.3 | LiN(SO$_2$F)$_2$ | 1.0 | — |
| Example 140 | 65 | 0 | 0 | 13 | 18 | 4 | 0.6 | LiN(SO2CF3)$_2$ | 0.6 | MBTA 0.2 |
| Example 141 | 47 | 0 | 30 | 0 | 20 | 3 | 0.6 | LiN(SO$_2$F)$_2$ | 0.6 | MBTA 0.2 |
| Comparative Example 122 | 0 | 72 | 0 | 0 | 24 | 4 | 1.2 | — | — | — |
| Comparative Example 123 | 0 | 0 | 66 | 0 | 32 | 2 | 1.0 | LiN(SO$_2$CF$_3$)$_2$ | 0.6 | MBTA 0.2 |
| Comparative Example 124 | 0 | 25 | 0 | 48 | 25 | 2 | 0.7 | LiN(SO$_2$F)$_2$ | 0.5 | — |

| | Additive | | | | | | | |
|---|---|---|---|---|---|---|---|---|
| | Cyclic acid anhydride (mass %) | LiPO$_2$F$_2$ (ppm) | Battery type | Positive-electrode active material | Positive electrode current collector | Negative-electrode active material | Negative electrode current collector | Separator |
| Example 138 | MAH 0.2 | 8000 | Layered laminate cell | LiNi$_{0.5}$Mn$_{0.3}$Co$_{0.2}$O$_2$ | Aluminum foil | Graphite | Copper foil | Polyethylene microporous membrane |
| Example 139 | PAH 0.6 | 100 | Layered laminate cell | LiNi$_{0.5}$Mn$_{0.3}$Co$_{0.2}$O$_2$ | Aluminum foil | Graphite | Copper foil | Polyethylene microporous membrane |
| Example 140 | SAH 0.6 | 100 | Layered laminate cell | LiNi$_{0.5}$Mn$_{0.3}$Co$_{0.2}$O$_2$ | Aluminum foil | Graphite | Copper foil | Polyethylene microporous membrane |
| Example 141 | MAH 0.8 | 5000 | Layered laminate cell | LiNi$_{0.5}$Mn$_{0.3}$Co$_{0.2}$O$_2$ | Aluminum foil | Graphite | Copper foil | Polyethylene microporous membrane |
| Comparative Example 122 | — | — | Layered laminate cell | LiNi$_{0.5}$Mn$_{0.3}$Co$_{0.2}$O$_2$ | Aluminum foil | Graphite | Copper foil | Polyethylene microporous membrane |
| Comparative Example 123 | SAH 1.5 | — | Layered laminate cell | LiNi$_{0.5}$Mn$_{0.3}$Co$_{0.2}$O$_2$ | Aluminum foil | Graphite | Copper foil | Polyethylene microporous membrane |
| Comparative Example 124 | — | — | Layered laminate cell | LiNi$_{0.5}$Mn$_{0.3}$Co$_{0.2}$O$_2$ | Aluminum foil | Graphite | Copper foil | Polyethylene microporous membrane |

<Manufacturing of Battery>
<Fabrication of Positive Electrode>

A composite oxide (LiNi$_{0.5}$Mn$_{0.3}$Co$_{0.2}$O$_2$) or (LiNi$_{1/3}$Mn$_{1/3}$Co$_{1/3}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture.

N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to approximately 95.0 g/m². When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.50 g/cm³, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness. When the negative electrode mixture-containing slurry was coated on the copper foil, an uncoated region was formed so as to expose a part of the copper foil. Then, roll pressing was performed using a roll press machine until the negative-electrode active material layer has a density of 1.35 g/cm³, so that a negative electrode having the negative-electrode active material layer and the negative electrode current collector was obtained.

In the experiment, a battery voltage was measured after one hour from the injection. The experimental result is shown in the following Table 43.

TABLE 43

|  | Positive electrode potential [V vs. Li/Li⁺] | Negative electrode potential [V vs. Li/Li+] | Battery voltage [V] |
| --- | --- | --- | --- |
| Example 138 | 3.2 | 2.58 | 0.62 |
| Example 139 | 3.2 | 2.57 | 0.63 |
| Example 140 | 3.2 | 2.57 | 0.63 |
| Example 141 | 3.2 | 2.61 | 0.59 |

TABLE 43-continued

|  | Positive electrode potential [V vs. Li/Li⁺] | Negative electrode potential [V vs. Li/Li+] | Battery voltage [V] |
| --- | --- | --- | --- |
| Comparative Example 122 | 3.2 | 3.13 | 0.07 |
| Comparative Example 123 | 3.2 | 3.12 | 0.08 |
| Comparative Example 124 | 3.2 | 3.12 | 0.08 |

As shown in Table 43, in all of the examples, a difference of the negative electrode electric potential around the injection of the non-aqueous electrolyte solution was 0.3 V or higher.

On the basis of the experiments, it was preferable that the negative electrode contains at least one of metals having a standard electrode potential of 0 V or higher. Since the negative electrode of the non-aqueous secondary battery using the existing carbonate electrolyte solution has an electric potential close to 3.1 V vs. Li/Li⁺ after liquid injection, elution of a metal element having a high standard electrode potential gradually proceeds as it is stored for a long time. Meanwhile, the electrolyte solution using acetonitrile does not cause elution even when it is stored for a long time after liquid injection. Therefore, it is possible to extend a manufacturing control period including an impregnation time.

On the basis of the experimental results of Examples 138 to 141, the negative electrode current collector is preferably formed of copper. As a result, it is possible to suppress elution of copper without generating a charging/discharging history.

Next, an example of the forty second embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 44. Note that, in Table 44, "AcN" denotes acetonitrile, "DEC" denotes diethyl carbonate, "EMC" denotes ethyl methyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, "LiN(SO$_2$CF$_3$)$_2$" denotes lithium bis(trifluoromethane sulfonyl) imide, "SAH" denotes succinic anhydride, "MAH" denotes maleic anhydride, "PAH" denotes phthalic anhydride, and "LiPO$_2$F$_2$" denotes lithium difluorophosphate.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L.

TABLE 44

|  | Solvent | | | | | Lithium salt | | | | Additive |
|  | | | | | | | | Imide salt | | Cyclic |
|  | AcN (vol %) | DEC (vol %) | EMC (vol %) | EC (vol %) | VC (vol %) | LiPF$_6$ (mol/1 L solvent) | LiBOB (mol/1 L solvent) | Type | Content (mol/1 L solvent) | acid anhydride (mass %) |
| --- | --- | --- | --- | --- | --- | --- | --- | --- | --- | --- |
| Example 142 | 50 | 35 | 0 | 11 | 4 | 0.3 | 0 | LiN(SO$_2$F)$_2$ | 1.0 | SAH 0.2 |
| Example 143 | 35 | 0 | 40 | 21 | 4 | 0.5 | 0 | LiN(SO$_2$F)$_2$ | 0.7 | MAH 0.15 |

TABLE 44-continued

| Example 144 | 65 | 25 | 0 | 6 | 4 | 0.3 | 0 | LiN(SO$_2$CF$_3$)$_2$ | 1.2 | PAH 0.5 |
|---|---|---|---|---|---|---|---|---|---|---|
| Comparative Example 122 | 47 | 42 | 0 | 0 | 11 | 1.3 | 0.2 | — | — | MAH 0.01 |
| Comparative Example 123 | 85 | 11 | 0 | 0 | 4 | 1 | 0 | — | — | — |

| | Additive | | Battery type | Positive-electrode active material | Positive electrode current collector | Negative-electrode active material | Negative electrode current collector | Separator |
|---|---|---|---|---|---|---|---|---|
| | LiPO$_2$F$_2$ (ppm) | Acetic acid (ppm) | | | | | | |
| Example 142 | 5000 | 0.1 | Layered laminate | LiNi$_{1/3}$Mn$_{1/3}$Co$_{1/3}$O$_2$ | Aluminum foil | Graphite | Copper foil | Polyethylene microporous membrane |
| Example 143 | 1000 | 1 | Layered laminate | LiNi$_{1/3}$Mn$_{1/3}$Co$_{1/3}$O$_2$ | Aluminum foil | Graphite | Copper foil | Polyethylene microporous membrane |
| Example 144 | 5000 | 5 | Layered laminate | LiNi$_{1/3}$Mn$_{1/3}$Co$_{1/3}$O$_2$ | Aluminum foil | Graphite | Copper foil | Polyethylene microporous membrane |
| Comparative Example 122 | — | — | Layered laminate | LiNi$_{1/3}$Mn$_{1/3}$Co$_{1/3}$O$_2$ | Aluminum foil | Graphite | Copper foil | Polyethylene microporous membrane |
| Comparative Example 123 | — | 5 | Layered laminate | LiNi$_{1/3}$Mn$_{1/3}$Co$_{1/3}$O$_2$ | Aluminum foil | Graphite | Copper foil | Polyethylene microporous membrane |

<Manufacturing of Battery>
<Fabrication of Positive Electrode>

A composite oxide (LiNi$_{1/3}$Mn$_{1/3}$Co$_{1/3}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to approximately 95.0 g/m$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.50 g/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 60.0 g/m$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.35 g/cm$^3$, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, first, initial charging treatment was performed in the sequence of the following chapter (1-1). Then, each battery was evaluated in the sequence of the chapter (1-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for 1.5 hours. Then, the battery was discharged with a constant current of 6.9 mA corresponding to "0.3 C" to a voltage of 3.0 V. Initial efficiency was calculated by dividing the discharge capacity at this time by the charge capacity.

(1-2) 60° C. Storage Test for Single-Layered Laminate-Type Battery

In the experiment, the single-layered laminate-type battery was charged to a voltage of 4.2 V with a constant current of 0.05 C at a temperature of 25° C., and was then charged with a constant voltage of 4.2 V for 1.5 hours. In addition, this charged single-layered laminate-type battery was stored in a thermostatic oven of 60° C. After 200 hours, the single-layered laminate-type battery was removed from the thermostatic oven, and was recovered to the room temperature. Then, the 4.2 V storage characteristics of the single-layered laminate-type battery were evaluated using the technique of measuring a gas generation amount and a voltage of each laminated cell. The gas generation amount was measured using the Archimedes method, in which the single-layered laminate-type battery is put into the container filled with hyper-pure water, and the volume of the single-layered laminate-type battery is measured from a weight change around that time. As a device for measuring the volume from the weight change, a gravimeter MDS-300 produced by Alfa Mirage Co., Ltd. was employed.

TABLE 45

|  | Gas generation amount in 60° C. storage test (ml) | Equivalent value per 1 mAh (ml) | determination |
|---|---|---|---|
| Example 142 | 0.10 | 0.0043 | ○ |
| Example 143 | 0.12 | 0.0052 | ○ |
| Example 144 | 0.13 | 0.0057 | ○ |

TABLE 45-continued

|  | Gas generation amount in 60° C. storage test (ml) | Equivalent value per 1 mAh (ml) | determination |
|---|---|---|---|
| Comparative Example 122 | 0.47 | 0.0200 | x |
| Comparative Example 123 | Evaluation stop | Evaluation stop | x |

As shown in Table 45, in the examples, it was recognized that the gas generation amount in the storage test for 200 hours at 60° C. is 0.008 ml or less per 1 mAh. Preferably, the gas generation amount is 0.007 ml or less per 1 mAh.

In this example, the non-aqueous secondary battery contains acetonitrile, $LiPO_2F_2$, acetic acid, and cyclic acid anhydride. As a result, $LiPO_2F_2$, acetic acid, and cyclic acid anhydride function as a reduction resistance, and acetonitrile is reductively decomposed, so that it is possible to suppress generation of gas. In addition, the battery is preferably a pouch type non-aqueous secondary battery containing acetonitrile, $LiPO_2F_2$, acetic acid, and cyclic acid anhydride. As a result, an SEI is formed on the surface of the negative electrode due to $LiPO_2F_2$, acetic acid, and cyclic acid anhydride, so that it is possible to suppress promotion of reduction of acetonitrile.

On the basis of Examples 142 to 144, it is preferable that the content of acetic acid is set to 0.1 ppm or more and 5 ppm or less with respect to the non-aqueous electrolyte solution. The gas generation amount in the storage test for 200 hours at 60° C. can be more effectively set to 0.008 ml or less per 1 mAh.

Next, an example of the forty third embodiment will be described.

<Preparation of Electrolyte Solution>

An electrolyte solution was prepared by mixing various solvents and additives at a predetermined volume ratio. The compositions of each electrolyte solution used in the examples and the comparative examples are shown in Table 46. Note that, in Table 46, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis (trifluoromethane sulfonyl) imide, "MBTA" denotes 1-methyl-1H-benzotriazole, "SAH" denotes succinic anhydride, "MAH" denotes maleic anhydride, and "PAH" denotes phthalic anhydride, "MBTA" denotes 1-methyl-1H-benzotriazole, and "$LiPO_2F_2$" denotes lithium difluorophosphate.

Preparation was performed such that each component other than lithium salt and additives is a non-aqueous solvent, and a total amount of each non-aqueous solvent becomes "1 L". The content of lithium salt is a molar quantity with respect to the non-aqueous solvent of 1 L.

TABLE 46

|  | Solvent | | | | | | Lithium salt | | | Additive |
|---|---|---|---|---|---|---|---|---|---|---|
|  | | | | | | | $LiPF_6$ | Imide salt | | Nitrogen-containing compound (mass %) |
|  | AcN (vol %) | DEC (vol %) | EMC (vol %) | DMC (vol %) | EC (vol %) | VC (vol %) | (mol/1 L solvent) | Type | Content (mol/1 L solvent) | |
| Example 145 | 45 | 0 | 35 | 0 | 16 | 4 | 0.3 | $LiN(SO_2F)_2$ | 1.0 | — |
| Example 146 | 50 | 35 | 0 | 0 | 10 | 5 | 0.5 | $LiN(SO_2F)_2$ | 0.7 | MBTA 0.2 |

TABLE 46-continued

| | | | | | | | | | | |
|---|---|---|---|---|---|---|---|---|---|---|
| Example 147 | 65 | 0 | 0 | 6 | 22 | 7 | 0.5 | LiN(SO$_2$CF$_3$)$_2$ | 0.6 | MBTA 0.1 |
| Comparative Example 124 | 47 | 42 | 0 | 0 | 0 | 11 | 1.3 | LiN(SO$_2$F)$_2$ | 1 | — |
| Comparative Example 125 | 23 | 0 | 42 | 0 | 20 | 15 | 0.6 | LiN(SO$_2$CF$_3$)$_2$ | 0.6 | — |
| Comparative Example 126 | 100 | 0 | 0 | 0 | 0 | 0 | 0 | LiN(SO$_2$CF$_3$)$_2$ | 4.2 | — |

| | Additive | | | | | | | |
|---|---|---|---|---|---|---|---|---|
| | Cyclic acid anhydride (mass %) | LiPO$_2$F$_2$ (ppm) | Battery type | Positive-electrode active material | Positive electrode current collector | Negative-electrode active material | Negative electrode current collector | Separator |
| Example 145 | MAH 0.2 | 3000 | Coin (CR2032) | LiNi$_{1/3}$Mn$_{1/3}$Co$_{1/3}$O$_2$ | Aluminum foil | Graphite | Copper foil | Polyethylene microporous membrane |
| Example 146 | SAH 0.2 | 8000 | Coin (CR2032) | LiNi$_{1/3}$Mn$_{1/3}$Co$_{1/3}$O$_2$ | Aluminum foil | Graphite | Copper foil | Polyethylene microporous membrane |
| Example 147 | PAH 0.4 | 100 | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 124 | MAH 0.05 | — | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 125 | — | 5 | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 126 | — | — | Coin (CR2032) | LiNi$_{1/3}$Mn$_{1/3}$Co$_{1/3}$O$_2$ | Aluminum foil | Graphite | Copper foil | Polyethylene microporous membrane |

<Manufacturing of Battery>
<Fabrication of Positive Electrode>

A composite oxide (LiN$_{1/3}$Mn$_{1/3}$Co$_{1/3}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 95.0 g/m$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.74 g/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1: 1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 61.0 g/m$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.50 g/cm$^3$, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, initial charging treatment was performed in the sequence of the following chapter (1-1). Then, each battery was evaluated in the sequence of the chapters (1-2) and (1-3). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for 1.5 hours. Then, the battery was discharged with a constant current of 6.9 mA corresponding to "0.3 C" to a voltage of 3.0 V. Initial efficiency was calculated by dividing the discharge capacity at this time by the charge capacity.

(1-2) 60° C. Full-Charge Storage Test of Single-Layered Laminate-Type Battery

In the experiment, the single-layered laminate-type battery was charged with a constant current of 0.05 C to a voltage of 4.2 V at a temperature of 25° C. and was then charged with a constant voltage of 4.2 V for 1.5 hours. In addition, this charged single-layered laminate-type battery was stored in the thermostatic oven at a temperature of 60° C. After 720 hours, the single-layered laminate-type battery was removed from the thermostatic oven and was recovered to the room temperature.

(1-3) Measurement of Electrochemical Impedance Spectroscopy

The measurement of electrochemical impedance spectroscopy was performed using a frequency response analyzer 1400 (model name) produced by AMETEK, Inc. and potentio-galvanostat 1470E (model name) produced by AMETEK, Inc. An A.C. impedance value at 1 kHz was obtained as a required resistance value by measuring impedance from a voltage/current response signal by applying an AC signal while changing the frequency 1000 kHz to 0.01 Hz. An amplitude of the applied AC voltage was set to "±5 mV". Furthermore, the battery ambient temperature at the time of measurement of electrochemical impedance spectroscopy was set to 25° C. In addition, the following values were calculated from such results.

Resistance increase rate=(resistance value after 60° C. full-charge storage test/resistance value before 60° C. full-charge storage test)×100 [%]

As a non-aqueous secondary battery to be measured, a single-layered laminate-type battery not subjected to the 60° C. full-charge storage test and a single-layered laminate-type battery subjected to the 60° C. full-charge storage test were employed using the method described above in the chapter (1-2). The experimental result is shown in the following Table 47.

TABLE 47

| | A.C. impedance value at 1 kHz [Ω] | | Resistance | |
|---|---|---|---|---|
| | Before storage test | After storage test | increase rate [%] | Determination |
| Example 145 | 2.5 | 5.6 | 224 | ○ |
| Example 146 | 2.9 | 6.1 | 210 | ○ |
| Example 147 | 3.0 | 7.0 | 233 | ○ |
| Comparative Example 124 | 3.1 | 15.2 | 490 | x |
| Comparative Example 125 | 3.3 | 18.1 | 548 | x |
| Comparative Example 126 | 3.4 | 20.1 | 591 | x |

As shown in Table 47, in the examples, it was recognized that the resistance increase rate in the full-charge storage test for 720 hours at 60° C. is 400% or lower. Preferably, the resistance increase rate is 350% or lower, more preferably 300% or lower, and furthermore preferably 250% or lower.

It is preferable that a storage battery compatible with a cold region is configured by using the non-aqueous secondary battery using the electrolyte solution containing imide salt contains acetonitrile as the solvent and $LiPO_2F_2$ and cyclic acid anhydride as the additives. As a result, it is possible to suppress an increase of the internal resistance during high-temperature heating and obtain an excellent low-temperature characteristic.

On the basis of the examples and the comparative examples, it was recognized that, if the imide salt is contained in a molarity relationship of "$LiPF_6 \leq$ imide salt", it is possible to suppress reduction of the ionic conductivity at a low temperature and obtain an excellent low-temperature characteristic. The $LiPO_2F_2$ and cyclic acid anhydride contribute to suppression of an increase of the internal resistance during high-temperature heating. In addition, it is conceived that the imide salt contributes to improvement of the low-temperature characteristic.

On the basis of the experimental results of Example 145 to 147, it was preferable that an electrolyte solution containing acetonitrile and at least one selected from succinic anhydride, maleic anhydride, and phthalic anhydride is employed. As a result, it is possible to suppress an increase of internal resistance during high-temperature heating and obtain an excellent low-temperature characteristic. Therefore, using the non-aqueous secondary battery containing acetonitrile, it is possible to cope with a storage battery compatible with a cold region.

Figure 3A:
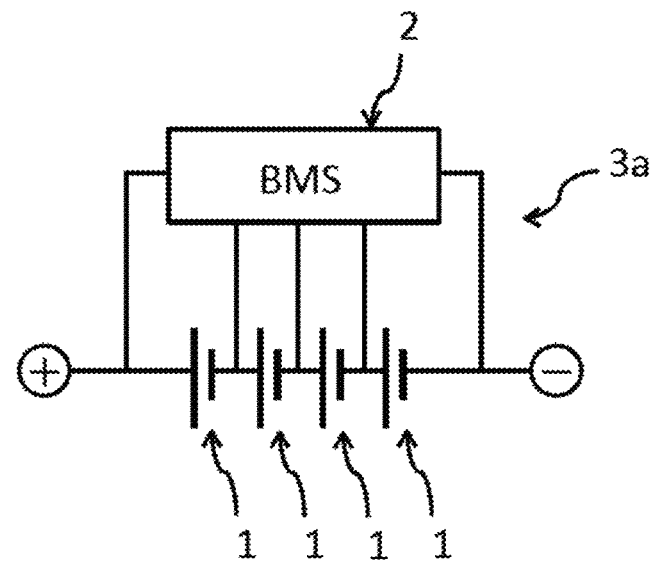
FIGS. 3(a) and (b) are a schematic explanatory diagram illustrating a cell pack according to a forty fourth embodiment.

An example of the specific configuration of the forty fourth embodiment will now be described. FIGS. 3(a) and (b) are a schematic explanatory diagram illustrating a cell pack according to the forty fourth embodiment.

In the cell pack (without parallel) of this example illustrated in FIG. 3(a), the reference numeral 1 refers to "non-aqueous secondary battery (LIB)", the reference numeral 2 refers to "voltage monitoring circuit (BMS)", and the reference numeral 3 refers to "cell pack (without parallel)". The cell pack 3a can be repeatedly charged and discharged, and a plurality of cell packs 3a may be connected in parallel.

Specifically, as illustrated in FIG. 3(a), this cell pack 3a includes non-aqueous secondary batteries (LIB) 1 in which four cells connected in series and a voltage monitoring circuit (BMS) 2 that individually monitors terminal voltages for each of the plurality of non-aqueous secondary batteries.

Figure 3B:
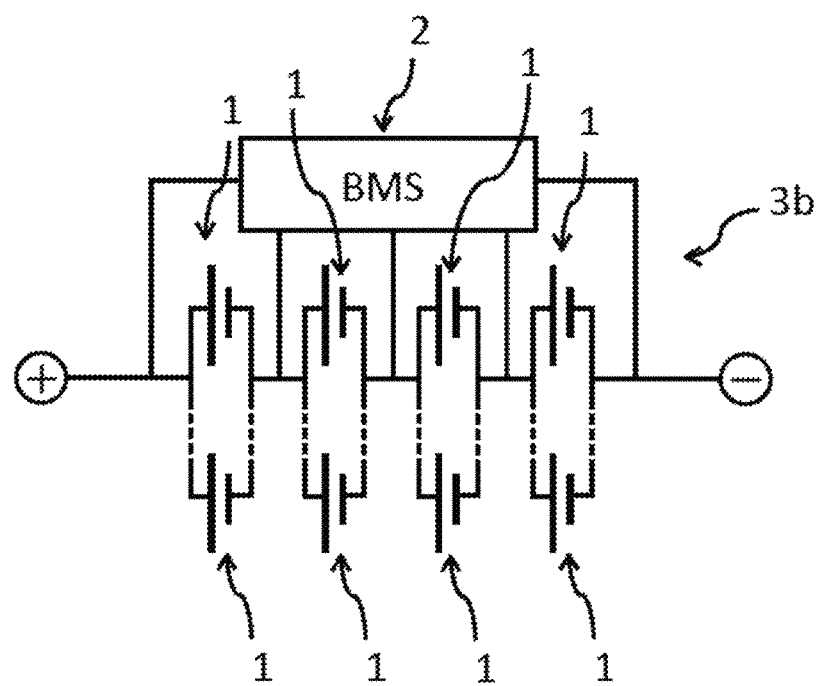

In the cell pack (parallel type) of this example illustrated in FIG. 3(b), the reference numeral 1 refers to "non-aqueous secondary battery (LIB)", the reference numeral 2 refers to "voltage monitoring circuit (BMS)", and the reference numeral 3 refers to "cell pack (parallel type)". The cell pack 3b can be repeatedly charged and discharged, and a plurality of cell packs 3b may be connected in parallel.

Specifically, as illustrated in FIG. 3(b), this cell pack 3b includes four non-aqueous secondary batteries (LIB) 1 connected in series in which a plurality of cells are connected in parallel, and a voltage monitoring circuit (BMS) 2 that individually monitors terminal voltages for each of the plurality of non-aqueous secondary batteries.

Here, in FIGS. 3(a) and 3(b), the non-aqueous secondary battery (LIB) 1 includes a positive electrode having a positive-electrode active material layer provided on one surface or both surfaces of the current collector, and a negative electrode having a negative-electrode active material layer provided on one surface or both surface of the current collector and the non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes within a range of 1.8 to 3.7 V, and the average operation voltage becomes 2.5 to 3.5 V, so that a 12V cell pack is obtained. As a result, it is possible to substitute an existing 12V lead acid battery. Since a specification of an electric system is defined on the basis of the operation voltage range of the lead acid battery, it is very important to determine the operation voltage range per cell. For this reason, the BMS 2 for appropriately managing the voltage is mounted.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. $Li/Li^+$) or higher has been used. However, since the electrolyte solution containing ethylene carbonate or vinylene carbonate and the positive electrode of iron phosphate lithium ($LiFePO_4$: LFP) or the negative electrode of graphite are employed, it is possible to obtain a 12V cell pack capable of improving a cycle life at a high temperature. Furthermore, this 12V cell pack has a high input/output characteristic over a wide temperature range.

Figure 4:
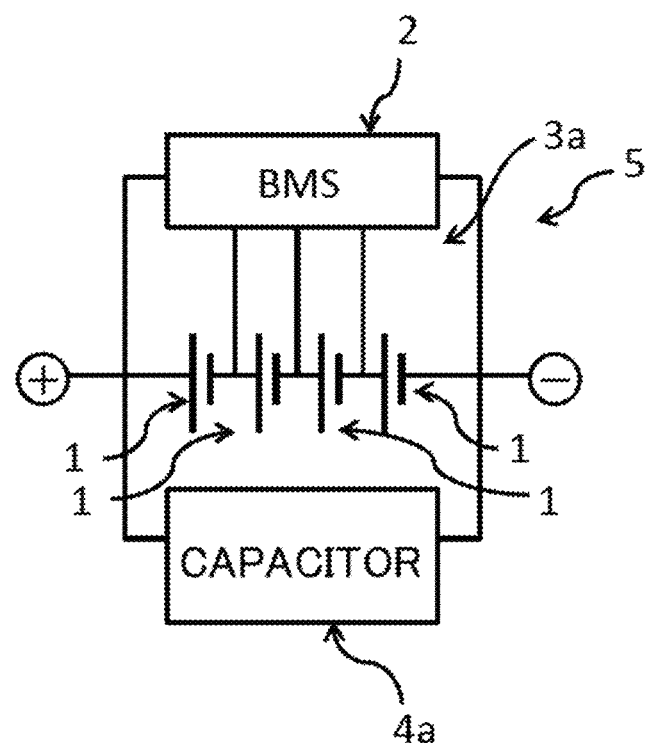
FIG. 4 is a schematic explanatory diagram illustrating a hybrid power system according to a forty fifth embodiment.

An example of a specific configuration of the forty fifth embodiment will now be described. FIG. 4 is a schematic explanatory diagram illustrating a hybrid power system according to the present invention. Here, the reference numeral 1 refers to a "non-aqueous secondary battery (LIB)", the reference numeral 2 refers to a voltage monitoring circuit (BMS), the reference numeral 4a refers to a "capacitor (secondary battery other than the LIB)", and the reference numeral 5 refers to a small-sized hybrid power system. This small-sized hybrid power system 5 can be repeatedly charged and discharged.

Specifically, as illustrated in FIG. 4, this small-sized hybrid power system 5 includes non-aqueous secondary batteries (LIB) 1 in which four cells are connected in series, and a voltage monitoring circuit (BMS) 2 that individually monitors terminal voltages of each of the plurality of non-aqueous secondary batteries. In addition, a capacitor 4a (as a secondary battery other than the LIB) is connected in parallel to the LIB 1. The capacitor preferably includes an electric double layer capacitor, a lithium ion capacitor, or the like.

Here, the non-aqueous secondary battery (LIB) 1 includes a positive electrode having a positive-electrode active material layer provided on one surface or both surfaces of the current collector, and a negative electrode having a negative-electrode active material layer provided on one surface or both surface of the current collector and the non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes within a range of 1.8 to 3.7 V, and the average operation voltage becomes 2.5 to 3.5 V, so that a 12V hybrid power system is obtained. As a result, it is possible to substitute an existing 12V lead acid battery. Since a specification of an electric system is defined on the basis of the operation voltage range of the lead acid battery, it is very important to determine the operation voltage range per cell. For this reason, the BMS for appropriately managing the voltage is mounted.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. $Li/Li^+$) or higher has been used. However, since the electrolyte solution containing ethylene carbonate or vinylene carbonate and the positive electrode of iron phosphate lithium ($LiFePO_4$: LFP) and the negative electrode of graphite are employed, it is possible to obtain a 12V hybrid power system capable of improving a cycle life at a high temperature. Furthermore, this 12V hybrid power system has a high input/output characteristic over a wide temperature range.

According to the forty fifth embodiment, the hybrid power system is a combinational hybrid power system in which the LIB module of the forty forth embodiment and the secondary battery other than the lead acid battery are combined. Here, the module is formed by connecting a plurality of cells, and the cell pack is formed by connecting a plurality of modules. However, the cell pack is a terminology including the module. In the LIB of the prior art, an organic solvent is used in the electrolyte solution. Therefore, viscosity of the electrolyte solution increases at a low temperature, and the internal resistance significantly increases. As a result, the low-temperature output power of the LIB is reduced, compared to the lead acid battery. Meanwhile, the lead acid battery has low output power at 25° C. but has high output power at −10° C.

In this regard, according to the forty fifth embodiment, a 12V vehicle power system is configured by connecting the LIB module of the forty forth embodiment to the secondary battery other than the lead acid battery in parallel, and a large current is supplemented to the LIB module of the forty forth embodiment capable of receiving a large current in the event of a charge operation caused by braking of vehicle deceleration or the like. As a result, it is possible to efficiently use energy generated in the event of braking of a traveling vehicle such as an automobile as regenerative energy.

According to the forty fifth embodiment, iron phosphate lithium ($LiFePO_4$) is used as the positive-electrode active material of the LIB, and graphite is used as the negative-electrode active material, so that the electrolyte solution preferably has a 20° C. ionic conductivity of 18 mS/cm or higher. Since iron phosphate lithium has lower electron conductivity, compared to NCM or LCO, it has a problem in charging/discharging. For this reason, its advantage may be degraded when it is combined with a secondary battery other than the LIB. In this regard, by using an electrolyte solution having high ionic conductivity, it is possible to cope with a wide temperature range from a low temperature to a room temperature in a large-current charging/discharging. Therefore, it is possible of extend a service life.

Figure 5:
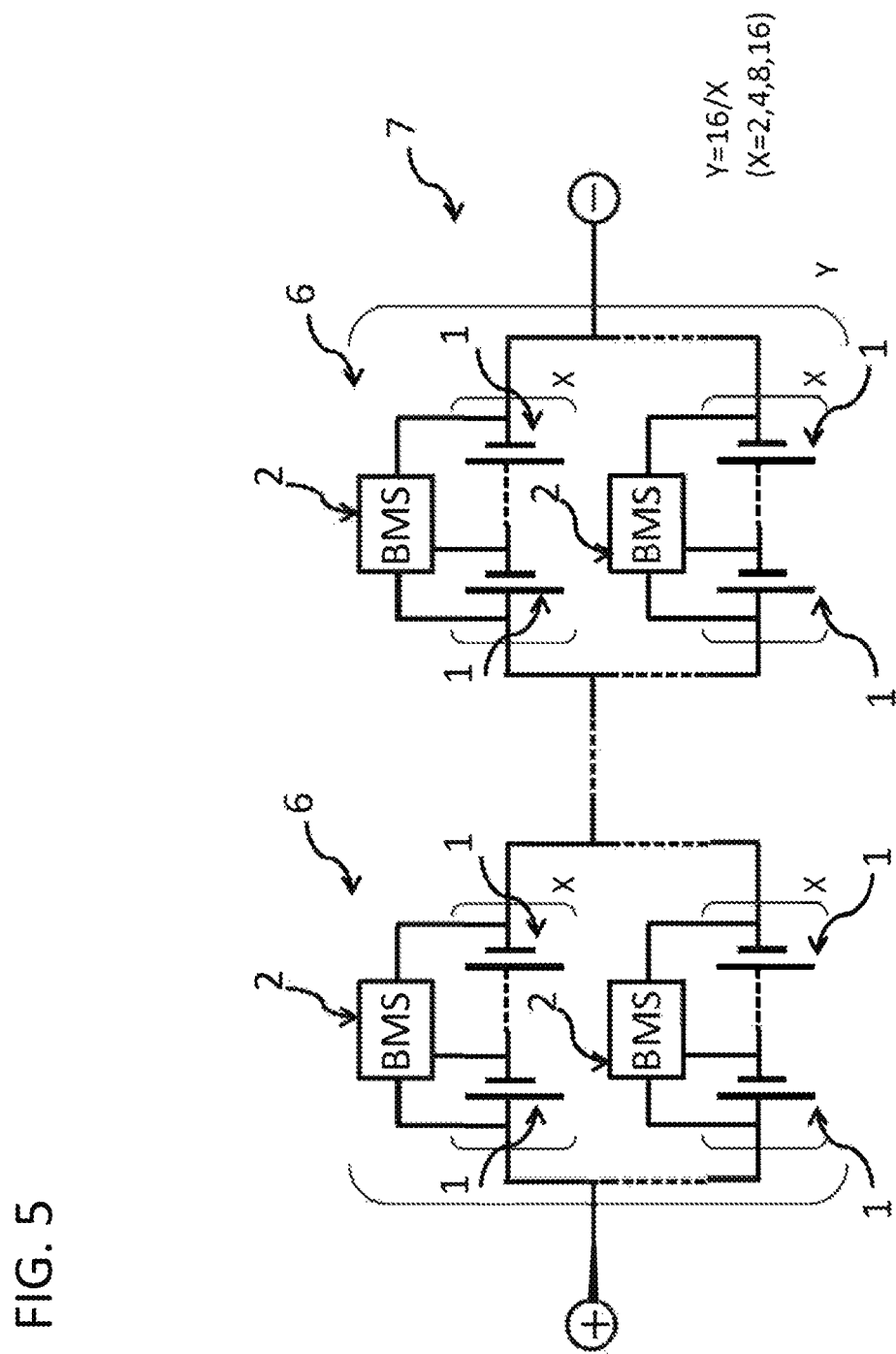
FIG. 5 is a schematic explanatory diagram illustrating a cell pack according to a forty sixth embodiment.

An example of the specific configuration of the forty sixth embodiment will now be described. FIG. 5 is a schematic explanatory diagram illustrating the cell pack according to the forty sixth embodiment. Here, the reference numeral 1 refers to a "non-aqueous secondary battery (LIB)", the reference numeral 2 refers to a "voltage monitoring circuit (BMS)", the reference numeral 6 refers to a "module", and the reference numeral 7 refers to a "cell pack". The cell pack 7 can be repeatedly charged and discharged, and a plurality of cell packs 7 may be connected in parallel.

This cell pack 7 is configured by connecting, in series, the modules 6 formed by connecting one or more cell packs in parallel on the basis of Formula (3), in which the number of cells in the non-aqueous secondary battery (LIB) 1 is defined on the basis of the following Formula (2). Note that the non-aqueous secondary battery 1 may be configured by connecting two or more cells in parallel.

Formula (2)
Number of cells connected in series per module (X): X=2, 4, 8, or 16
Formula (3)
Number of modules connected in series per cell pack (Y): Y=16/X Furthermore, the hybrid power system has the connected non-aqueous secondary batteries (LIB) 1 and a voltage monitoring circuit (BMS) 2 that individually monitors terminal voltages of each of the plurality of non-aqueous secondary batteries.

Here, the non-aqueous secondary battery (LIB) 1 includes a positive electrode having a positive-electrode active material layer provided on one surface or both surfaces of the current collector, and a negative electrode having a negative-electrode active material layer provided on one surface or both surface of the current collector and the non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes within a range of 1.8 to 3.7 V, and the average operation voltage becomes 2.5 to 3.5 V, so that a 48V cell pack is obtained.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. $Li/Li^+$) or higher has been used. However, since the electrolyte solution containing ethylene carbonate or vinylene carbonate and the positive electrode of iron phosphate lithium ($LiFePO_4$: LFP) and the negative electrode of graphite are employed, it is possible to obtain a 48V cell pack capable of improving a cycle life at a high temperature. Furthermore, this 48V cell pack has a high input/output characteristic over a wide temperature range.

Figure 6:
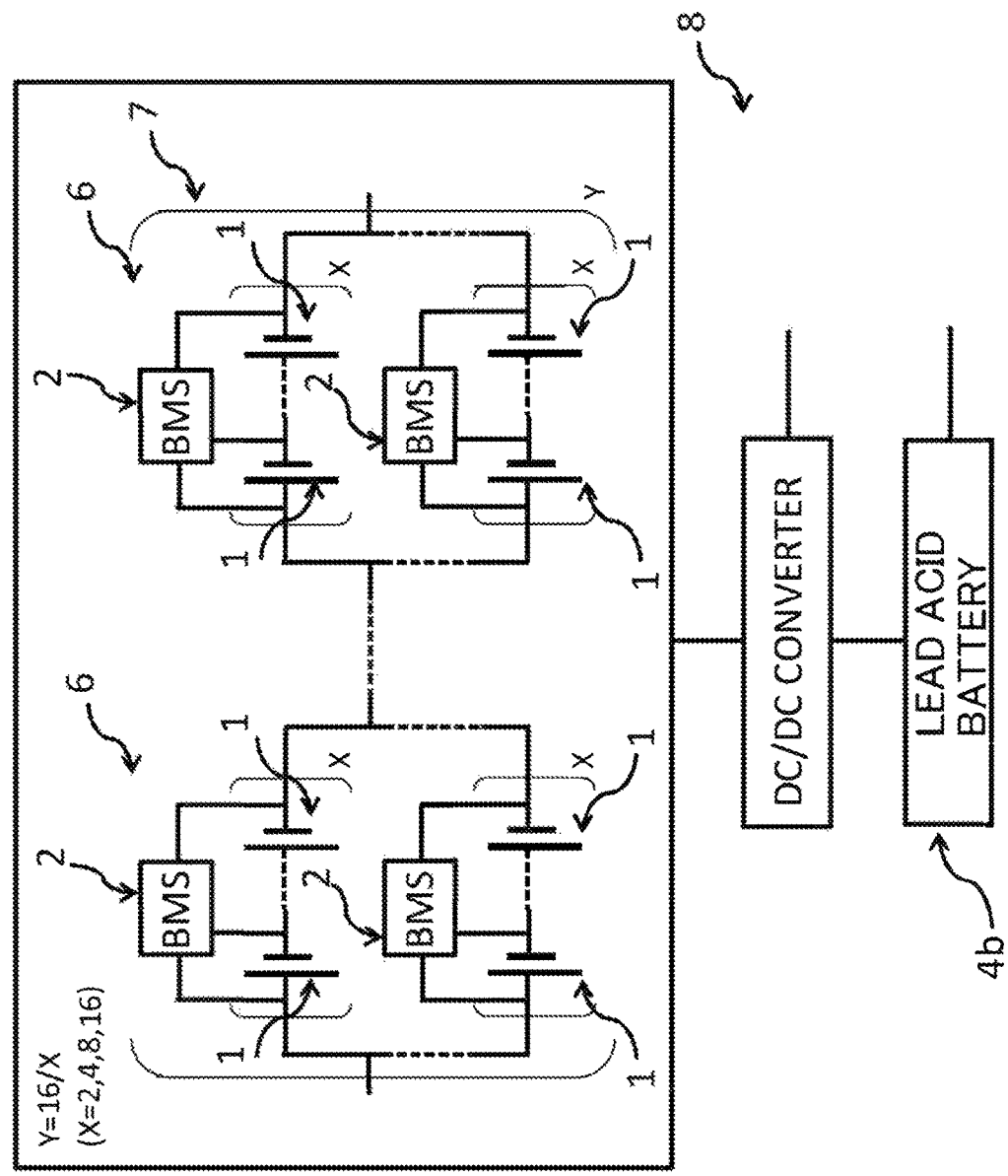
FIG. 6 is a schematic explanatory diagram illustrating a hybrid power system according to forty seventh embodiment.

An example of the specific configuration of the forty seventh embodiment will now be described. FIG. 6 is a schematic explanatory diagram illustrating the hybrid power system according to the forty seventh embodiment. Here, the reference numeral 1 refers to a "non-aqueous secondary battery (LIB)", the reference numeral 2 refers to a "voltage monitoring circuit (BMS)", the reference numeral 4b refers to a lead acid battery (second battery other than the lead acid battery (LIB)), the reference numeral 6 refers to a "module", the reference numeral 7 refers to a "cell pack", and the reference numeral 8 refers to a "large-sized hybrid power system". This large-sized hybrid power system 8 can be repeatedly charged and discharged. In addition, a plurality of cell packs 7 may be connected in parallel.

This cell pack 7 is configured by connecting, in series, the modules 6 formed by connecting one or more cell packs in parallel on the basis of Formula (3), in which the number of cells in the non-aqueous secondary battery (LIB) 1 is defined on the basis of the following Formula (2). Note that the non-aqueous secondary battery 1 may be configured by connecting two or more cells in parallel.

Formula (2)
Number of cells connected in series per module (X): X=2, 4, 8, or 16
Formula (3)
Number of modules connected in series per cell pack (Y): Y=16/X Furthermore, the hybrid power system has the connected non-aqueous secondary batteries (LIB) 1 and a voltage monitoring circuit (BMS) 2 that individually monitors terminal voltages of each of the plurality of non-aqueous secondary batteries.

This large-sized hybrid power system 8 includes lead acid batteries 4b (secondary batteries other than the LIB) connected to the cell pack 7 via a DC/DC converter.

According to the forty seventh embodiment, it is preferable that the positive-electrode active material of the LIB is iron phosphate lithium ($LiFePO_4$), the negative-electrode active material of the LIB is graphite, and the electrolyte solution has an 20° C. ionic conductivity of 15 mS/cm or higher. Since the iron phosphate lithium has a lower electron conductivity, compared to NCM or LCO, there may be a problem in charging/discharging, and advantages may be degraded when it is combined with the lead acid battery. Therefore, by using the electrolyte solution having a high ionic conductivity, it is possible to cope with large-current charging/discharging of the lead acid battery in the vicinity of the room temperature and extend the service life until replacement of the battery.

Here, the non-aqueous secondary battery (LIB) 1 includes a positive electrode having a positive-electrode active material layer provided on one surface or both surfaces of the current collector, and a negative electrode having a negative-electrode active material layer provided on one surface or both surface of the current collector and the non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes 1.8 to 3.7 V, and the average operation voltage becomes 2.5 to 3.5 V, so that a 48V hybrid power system is obtained. As a result, it is possible to easily use the 48V hybrid power system in combination with an existing 12V lead acid battery. Since a specification of an electric system is defined on the basis of the operation voltage range of the lead acid battery, it is very important to determine the operation voltage range per cell. For this reason, the BMS 2 for appropriately managing the voltage is mounted.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. Li/Li$^+$) or higher has been used. However, since the electrolyte solution containing ethylene carbonate or vinylene carbonate and the positive electrode of iron phosphate lithium (LiFePO$_4$: LFP) and the negative electrode of graphite are employed, it is possible to obtain a 48V hybrid power system capable of improving a cycle life at a high temperature. Furthermore, this 48V hybrid power system has a high input/output characteristic over a wide temperature range.

The non-aqueous secondary battery of the present invention is not particularly limited. For example, the non-aqueous secondary battery according to the present invention is applicable to a portable device such as a mobile phone, a portable audio device, a personal computer, and an integrated circuit (IC) tag, a rechargeable battery for vehicles such as a hybrid vehicle, a plug-in hybrid vehicle, and an electric vehicle, a storage system for home, IT equipment, or the like. For example, the non-aqueous secondary battery according to the present invention can be preferably applicable to a non-aqueous secondary battery having a pouch type cell structure. Moreover, when applied to a vehicle-mounted rechargeable battery, it is possible to improve the safety, compared to the prior art.

The non-aqueous secondary battery according to the present invention can be applicable to cold region applications, outdoor applications in summer, or the like.

This application is based upon Japanese Patent Application Nos. 2017-052399, 2017-052256, 2017-052259, 2017-052260, and 2017-052398, filed on Mar. 17, 2017, the entire contents of which are incorporated herein by reference.

The invention claimed is:

1. A non-aqueous secondary battery comprising:
a positive electrode having a positive-electrode active material layer formed on one surface or both surfaces of a positive electrode current collector;
a negative electrode having a negative-electrode active material layer formed on one surface or both surfaces of a negative electrode current collector; and
a non-aqueous electrolyte solution,
wherein the non-aqueous electrolyte solution contains acetonitrile and LiPO$_2$F$_2$, and
a value obtained by dividing a bulk resistance at a temperature of −30° C. by an internal resistance value in measurement of electrochemical impedance spectroscopy for the non-aqueous secondary battery is 0.05 to 0.7, and
wherein an impedance is measured from a voltage/current response signal by applying an AC signal while changing a frequency of the AC signal within a range of 1000 kHz to 0.01 Hz, and the bulk resistance is obtained from a value intersecting with an abscissa of a complex impedance plot (cole-cole plot) and the internal resistance is obtained by adding the bulk resistance to a width of an arc of a high frequency side.

2. The non-aqueous secondary battery according to claim 1, wherein the non-aqueous secondary battery contains a compound having at least one functional group selected from a group consisting of —N═, —NH$_4$, —N═O, —NH—NH—, and (NO$_3$).

3. The non-aqueous secondary battery according to claim 1, wherein the negative-electrode active material layer contains at least one compound selected from a group consisting of imide salt and (SO$_4$)$^{2-}$,
wherein the imide salt is at least one selected from a group consisting of lithium salt and onium salt, and
wherein a bulk resistance at a temperature of 25° C. in measurement of electrochemical impedance spectroscopy for the non-aqueous secondary battery is 0.025 ohm or smaller.

4. The non-aqueous secondary battery according to claim 1, wherein the non-aqueous secondary battery contains at least one compound selected from a group consisting of organic acid, salt thereof, acid anhydride, and Li$_2$O, and
the organic acid includes at least one of acetic acid, oxalic acid, and formic acid.

5. The non-aqueous secondary battery according to claim 1, wherein the negative-electrode active material layer contains at least one compound selected from a group consisting of imide salt and (SO$_4$)$^{2-}$,
wherein the imide salt is at least one selected from a group consisting of lithium salt and onium salt, and
wherein the bulk resistance at a temperature of −30° C. in measurement of electrochemical impedance spectroscopy for the non-aqueous secondary battery is 0.07 ohm or smaller.

6. The non-aqueous secondary battery according to claim 1, wherein the non-aqueous secondary battery contains a compound having at least one functional group selected from a group consisting of —N═, —NH$_4$, —N═O, —NH—NH—, and (NO$_3$),
wherein the non-aqueous secondary battery has a capacity retention rate of 70% or higher, the capacity retention rate being calculated by dividing a first capacity for a 5C discharge by a second capacity for a 1C discharge after a storage test for 4 hours at 85° C. and multiplying by 100%, and
wherein the 1C discharge is a current value at which a fully charged battery is discharged in one hour at a constant current to terminate the discharge and the 5C discharge is a current value at which a fully charged battery is discharged in twelve minutes at a constant current to terminate the discharge.

7. The non-aqueous secondary battery according to claim 1, wherein the non-aqueous secondary battery contains at least one compound selected from a group consisting of organic acid, salt thereof, acid anhydride, and Li$_2$O,
wherein the organic acid includes at least one of acetic acid, oxalic acid, and formic acid,
wherein the non-aqueous secondary battery has a capacity retention rate of 70% or higher, the capacity retention rate being calculated by dividing a first capacity for a 5C discharge by a second capacity for a 1C discharge after a storage test for 4 hours at 85° C. and multiplying by 100%, and
wherein the 1C discharge is a current value at which a fully charged battery is discharged in one hour at a constant current to terminate the discharge and the 5C discharge is a current value at which a fully charged battery is discharged in twelve minutes at a constant current to terminate the discharge.

8. The non-aqueous secondary battery according to claim 1, wherein the non-aqueous secondary battery contains a compound having at least one functional group selected from a group consisting of —N═, —NH$_4$, —N═O, —NH—NH—, and (NO$_3$), and
the non-aqueous secondary battery has a 0° C. ionic conductivity of 10 mS/cm or higher after a storage test for 4 hours at 85° C.

9. The non-aqueous secondary battery according to claim 1, wherein the non-aqueous secondary battery contains at least a compound selected from a group consisting of organic acid, salt thereof, acid anhydride, and $Li_2O$,
the organic acid includes at least one of acetic acid, oxalic acid, and formic acid, and
the non-aqueous secondary battery has a 0° C. ionic conductivity of 10 mS/cm or higher after a storage test for 4 hours at 85° C.

10. The non-aqueous secondary battery according to claim 1, wherein the positive-electrode active material is a lithium-containing composite metal oxide expressed as $Li_zMO_2$,
wherein M contains Ni and one or more metal elements selected from a group consisting of Mn, Co, Al, and Mg, a content ratio of the Ni element is more than 50%, and
z is a number greater than 0.9 and smaller than 1.2.

11. The non-aqueous secondary battery according to claim 1, wherein a gas generation amount in a storage test at 60° C. for 200 hours is 0.008 ml or less per 1 mAh.

12. The non-aqueous secondary battery according to claim 1, wherein a resistance increase rate in a full-charge storage test at 60° C. for 720 hours is 400% or lower.

13. A cell pack comprising the non-aqueous secondary battery according to claim 1,
wherein the positive-electrode active material layer contains a lithium-containing compound including Fe,
wherein the negative-electrode active material layer contains graphite or at least one or more elements selected from a group consisting of Ti, V, Sn, Cr, Mn, Fe, Co, Ni, Zn, Al, Si, and B,
wherein the non-aqueous electrolyte solution contains cyclic carbonate without saturated secondary carbon,
wherein the cyclic carbonate without saturated secondary carbon is at least one selected from a group consisting of ethylene carbonate and vinylene carbonate,
wherein the cell pack includes:
one module having four cells of the non-aqueous second battery connected in series, or
at least two modules, connected in parallel, each of the at least two modules having four cells of the non-aqueous second battery connected in series, or
four modules, connected in series, each of the four modules having at least two cells of the non-aqueous second battery connected in parallel,
wherein an operation voltage range per cell is within a range of 1.8 to 3.7 V,
wherein an average operation voltage range per cell is 2.5 to 3.5 V, and
wherein the module is mounted with a battery management system (BMS).

14. A hybrid power system obtained by combining the cell pack according to claim 13, and a module or cell pack having a secondary battery other than a lithium ion battery.

15. A cell pack comprising the non-aqueous secondary battery according to claim 1, wherein the positive-electrode active material layer contains a lithium-containing compound including Fe,
wherein the negative-electrode active material layer contains graphite or at least one or more elements selected from a group consisting of Ti, V, Sn, Cr, Mn, Fe, Co, Ni, Zn, Al, Si, and B,
wherein the non-aqueous electrolyte solution contains cyclic carbonate without saturated secondary carbon,
wherein the cyclic carbonate without saturated secondary carbon is at least one selected from a group consisting of ethylene carbonate and vinylene carbonate,
wherein the cell pack is configured by connecting modules on the basis of Formula (2) and Formula (3), the module being obtained by connecting two or more cells in parallel,
Formula (2)=Number of cells connected in series per module (X): X=2, 4, 8, or 16,
Formula (3)=Number of modules connected in series per cell pack (Y): Y=16/X,
wherein an operation voltage range per cell is within a range of 1.8 to 3.7 V,
wherein an average operation voltage range per cell is 2.5 to 3.5 V, and
wherein the module is mounted with a battery management system (BMS).

16. A hybrid power system comprising the cell pack according to claim 15, and a module or cell pack having a secondary battery other than a lithium ion battery in combination.

* * * * *